(12) United States Patent
Takahashi et al.

(10) Patent No.: US 9,411,101 B2
(45) Date of Patent: *Aug. 9, 2016

(54) OPTICAL FIBER CONNECTOR, OPTICAL FIBER CONNECTOR ASSEMBLING METHOD, OPTICAL FIBER CONNECTOR ASSEMBLING TOOL, AND OPTICAL FIBER CONNECTOR ASSEMBLING SET

(71) Applicant: FUJIKURA LTD., Kohtoh-ku, Tokyo (JP)

(72) Inventors: Shigeo Takahashi, Sakura (JP); Kazuhiro Takizawa, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/668,726

(22) Filed: Mar. 25, 2015

(65) Prior Publication Data
US 2015/0198766 A1 Jul. 16, 2015

Related U.S. Application Data

(60) Continuation-in-part of application No. 14/108,646, filed on Dec. 17, 2013, now Pat. No. 9,091,825, which is a division of application No. 13/548,927, filed on Jul. 13, 2012, now Pat. No. 8,678,670, which is a continuation of application No. PCT/JP2011/050560, filed on Jan. 14, 2011.

(30) Foreign Application Priority Data

Jan. 14, 2010  (JP) .................................. 2010-006290
Jan. 14, 2010  (JP) .................................. 2010-006292
Jan. 14, 2010  (JP) .................................. 2010-006331

(51) Int. Cl.
*G02B 6/36* (2006.01)
*G02B 6/255* (2006.01)
*G02B 6/38* (2006.01)

(52) U.S. Cl.
CPC ............ *G02B 6/2558* (2013.01); *G02B 6/3846* (2013.01); *G02B 6/3849* (2013.01);
(Continued)

(58) Field of Classification Search
CPC ........................... G02B 6/2558; G02B 6/3846
See application file for complete search history.

(56) References Cited

U.S. PATENT DOCUMENTS

| 4,534,616 A * | 8/1985 | Bowen .................. G02B 6/322 385/79 |
| 5,692,079 A | 11/1997 | Iso |

(Continued)

FOREIGN PATENT DOCUMENTS

| CN | 2582016 Y | 10/2003 |
| CN | 201007747 Y | 1/2008 |

(Continued)

OTHER PUBLICATIONS

Communication dated Jul. 17, 2015 from the State Intellectual Property Office of the People's Republic of China in counterpart application No. 201410333801.X.

(Continued)

*Primary Examiner* — Omar R Rojas
(74) *Attorney, Agent, or Firm* — Sughrue Mion, PLLC

(57) ABSTRACT

An optical fiber connector of the present invention includes: a ferrule; an inserted optical fiber of which one end portion is fixed to the ferrule and of which the other end portion protrudes from the ferrule; an external optical fiber of which a front end portion is fusion-spliced to the other end portion of the inserted optical fiber; and one or more reinforcing members configured to reinforce the fusion-spliced portion of the other end portion of the inserted optical fiber and the front end portion of the external optical fiber, wherein the ferrule comprises a lens located on an extension line of the inserted optical fiber.

17 Claims, 51 Drawing Sheets

(52) U.S. Cl.
CPC .......... *G02B6/3885* (2013.01); *G02B 6/3898* (2013.01); *G02B 6/3853* (2013.01); *G02B 6/3861* (2013.01); *G02B 6/3887* (2013.01); *Y10T 29/4989* (2015.01); *Y10T 29/49908* (2015.01); *Y10T 29/49948* (2015.01); *Y10T 29/49966* (2015.01); *Y10T 29/53687* (2015.01); *Y10T 156/10* (2015.01)

(56) References Cited

U.S. PATENT DOCUMENTS

| | | | |
|---|---|---|---|
| 5,748,819 | A | 5/1998 | Szentesi et al. |
| 6,439,780 | B1 | 8/2002 | Mudd et al. |
| 8,678,670 | B2 * | 3/2014 | Takahashi ............ G02B 6/3846 385/136 |
| 2004/0028341 | A1 | 2/2004 | Zhao et al. |
| 2008/0095504 | A1 | 4/2008 | Kawasaki |
| 2008/0279508 | A1 | 11/2008 | Fukui et al. |

FOREIGN PATENT DOCUMENTS

| | | | |
|---|---|---|---|
| CN | 101299086 | A | 11/2008 |
| EP | 0 800 100 | A1 | 10/1997 |
| JP | 58-123412 | U | 8/1983 |
| JP | 59-071010 | A | 4/1984 |
| JP | 60-051807 | A | 3/1985 |
| JP | 06-034845 | A | 2/1994 |
| JP | 09-105837 | A | 4/1997 |
| JP | 10-319275 | A | 12/1998 |
| JP | 2001-235656 | A | 8/2001 |
| JP | 2002-082257 | A | 3/2002 |
| JP | 2002-196189 | A | 7/2002 |
| JP | 2006-227560 | A | 8/2006 |
| JP | 2008-065315 | A | 3/2008 |

OTHER PUBLICATIONS

"F13 Type Multi_Core Optical Fiber Connector C 5982", JIS Handbook 8 Electronic Test Methods and Optoelectronics Edition, published by Japanese Standards Association, Apr. 24, 1998.
Office Action issued by the Japanese Patent Office in Japanese Patent Application No. 2013-008478 mailed Sep. 10, 2013.
Office Action issued by the Chinese Patent Office in Chinese Patent Application No. 201180006107.1 mailed Dec. 25, 2013.
International Search Report in International Application No. PCT/JP2011/050560 mailed Apr. 5, 2011.
Office Action issued by Japanese Patent Office in Japanese Application No. 2011-550022 mailed Nov. 20, 2012.
Notice of Allowance issued by Japanese Patent Office in Japanese Application No. 2011-550022 mailed Feb. 12, 2013.
Office Action issued by U.S. Patent Office in U.S. Appl. No. 13/548,927 mailed May 2, 2013.
Notice of Allowance issued by Japanese Patent Office in Japanese Application No. 2013-008478 mailed Jan. 21, 2014.
Office Action issued by U.S. Patent Office in U.S. Appl. No. 14/108,646 mailed Jan. 26, 2015.

* cited by examiner

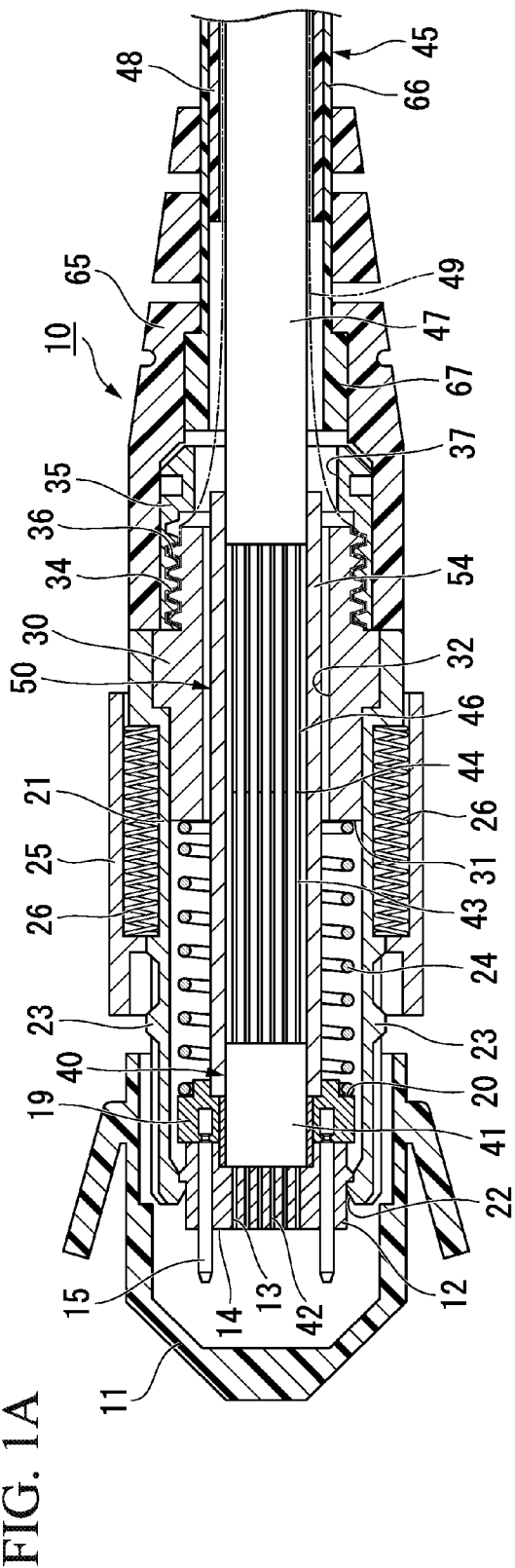
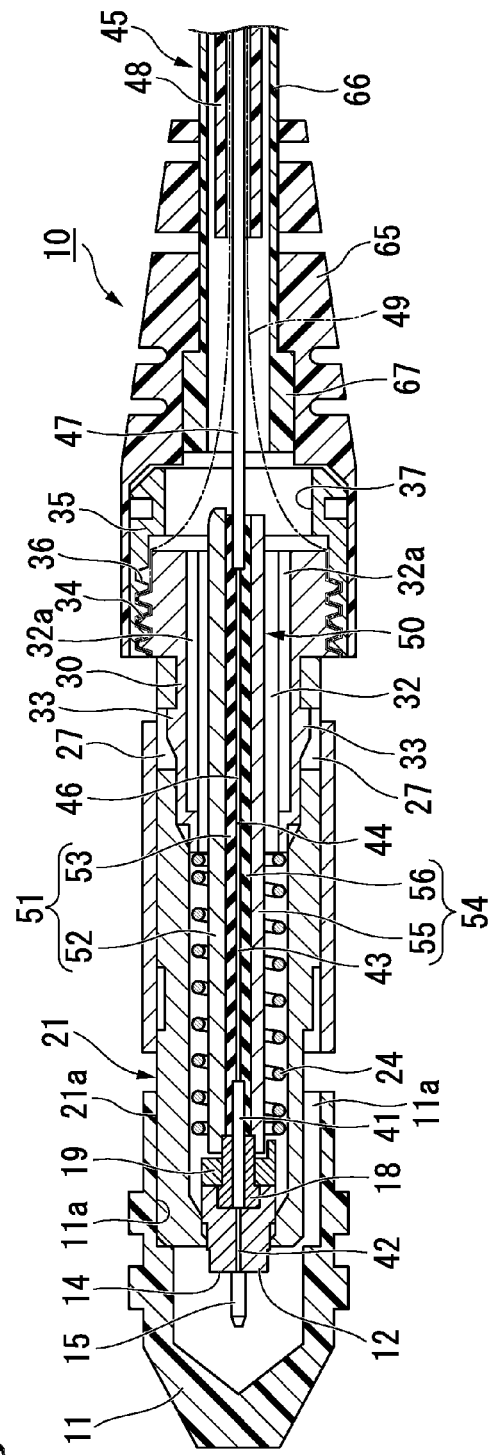
FIG. 1A
FIG. 1B

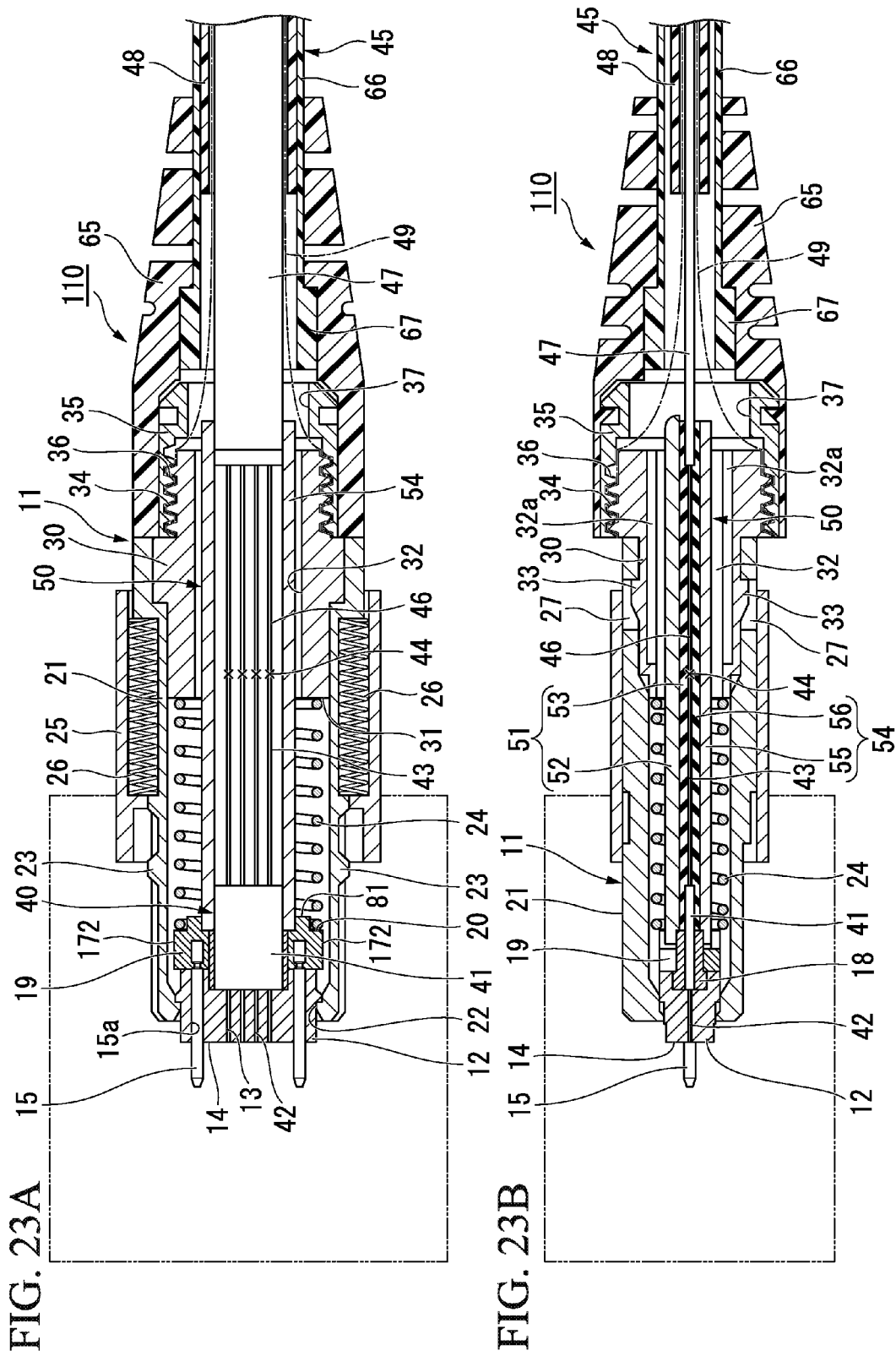

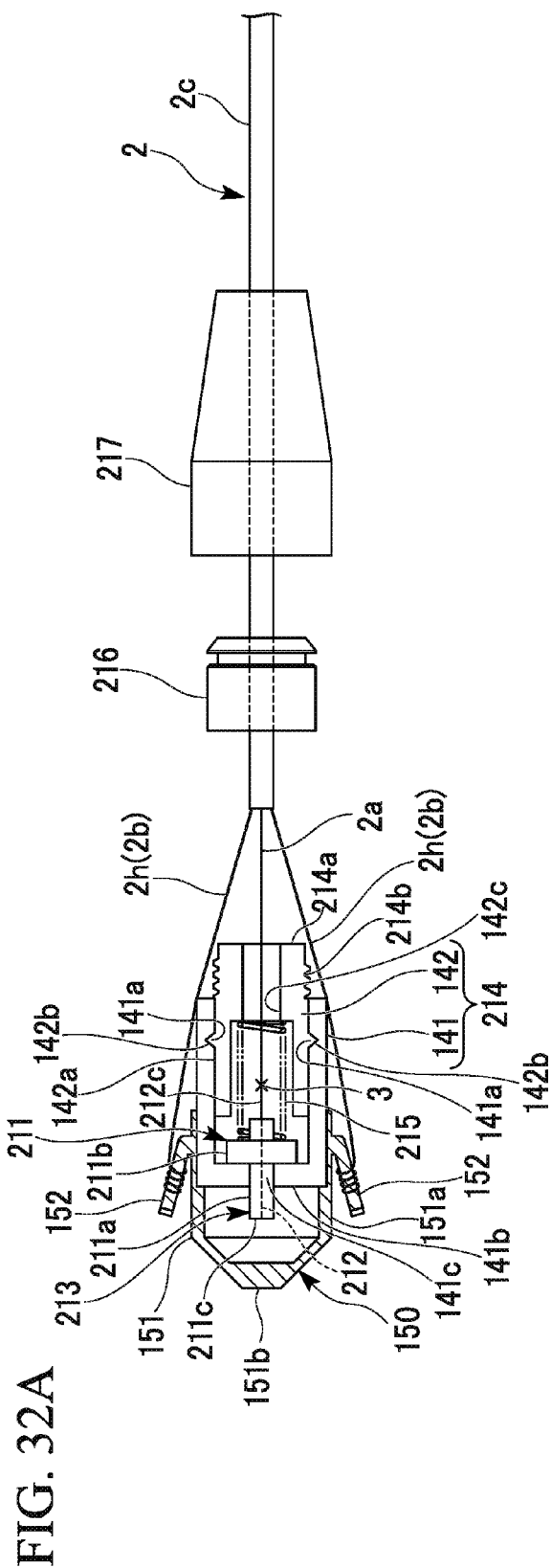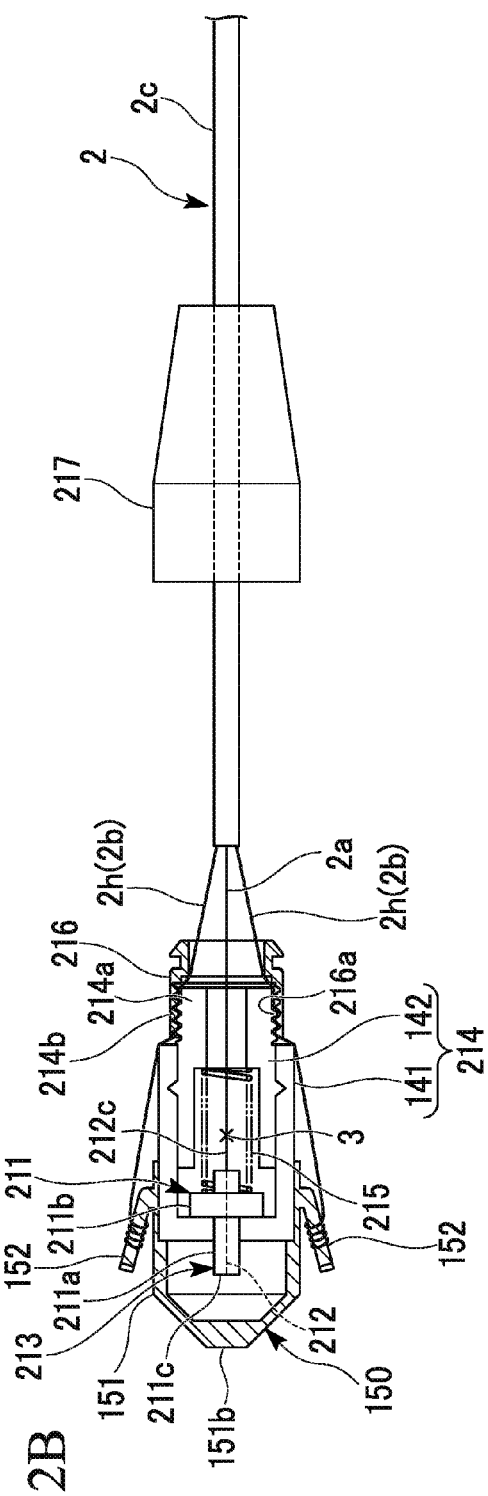

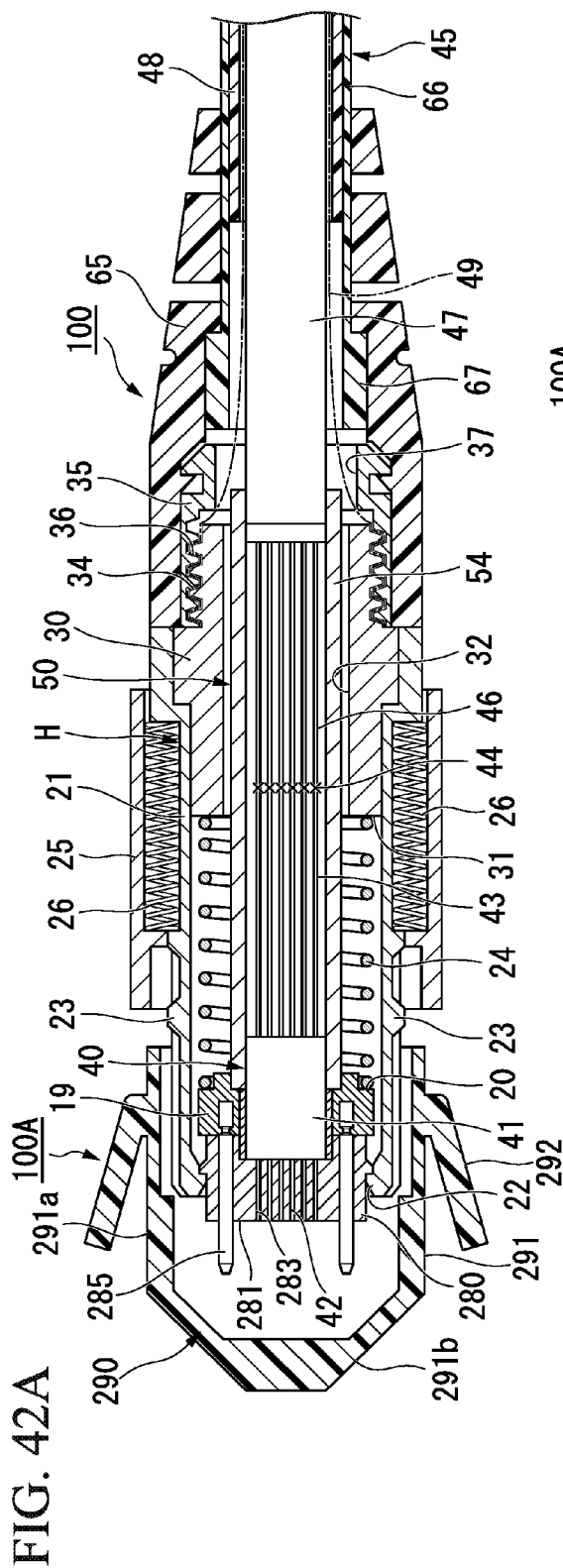
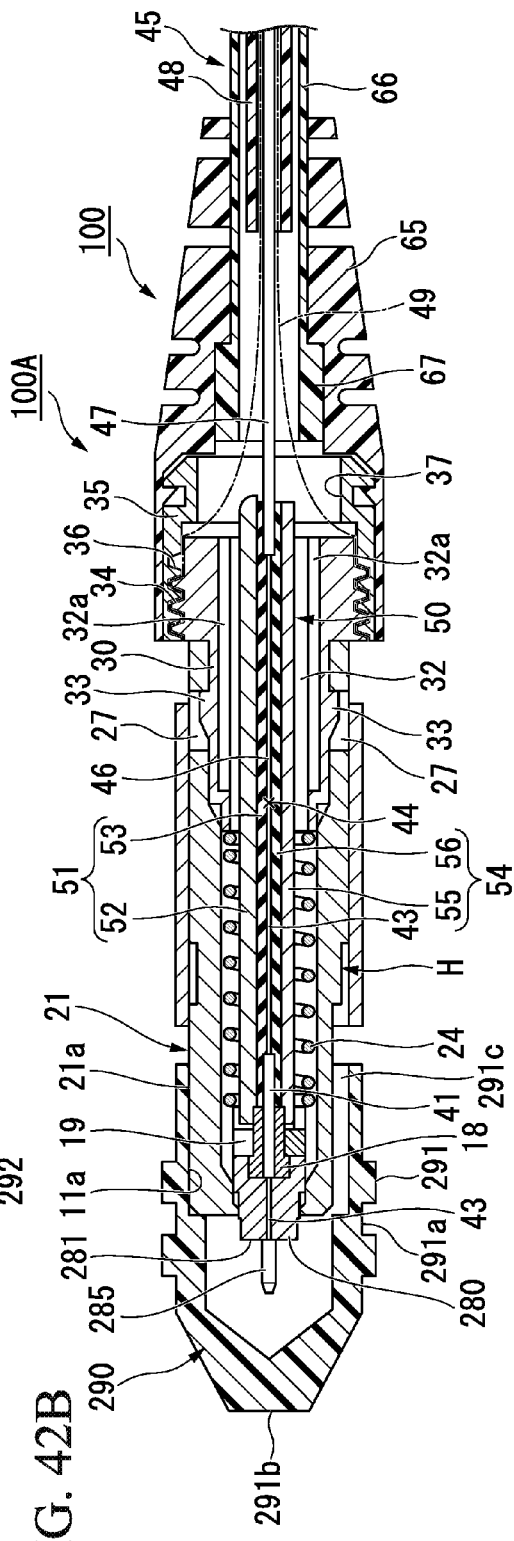
FIG. 42A
FIG. 42B

OPTICAL FIBER CONNECTOR, OPTICAL FIBER CONNECTOR ASSEMBLING METHOD, OPTICAL FIBER CONNECTOR ASSEMBLING TOOL, AND OPTICAL FIBER CONNECTOR ASSEMBLING SET

CROSS REFERENCE TO RELATED APPLICATIONS

This application is a continuation-in-part of application Ser. No. 14/108,646, filed Dec. 17, 2013 which is a continuation application Ser. No. 13/548,927, filed Jul. 13, 2012, now U.S. Pat. No. 8,678,670 which is based on a PCT Patent Application No. PCT/JP2011/050560, filed Jan. 14, 2011, whose priority is claimed on Japanese Patent Application No. 2010-6290 filed Jan. 14, 2010, Japanese Patent Application No. 2010-6292 filed Jan. 14, 2010, and Japanese Patent Application No. 2010-6331 filed Jan. 14, 2010, the contents of which are incorporated herein by reference.

BACKGROUND OF THE INVENTION

1. Field of the Invention

The present invention relates to an optical fiber connector assembled to a front end portion of an optical transmission medium such as an optical fiber cord or an optical fiber cable and a method of assembling the optical fiber connector, and more particularly, to an optical fiber connector in which a front end portion of an optical transmission medium is optically connected to an optical fiber (short optical fiber) inserted into a ferrule by fusion splice between optical fibers, a method of assembling an optical fiber connector, a method of reinforcing a fusion-spliced portion of optical fibers which can be suitably used for the optical fiber connector, an optical fiber connector assembling tool, and an optical fiber connector assembling set.

The present invention also relates to an optical fiber connector assembled to a front end portion of an optical transmission medium such as an optical fiber cord or an optical fiber cable, a pin clamp used therein, and a method of assembling the optical fiber connector.

The present invention also relates to an optical fiber connector cap which is detachably attached to the housing of an optical fiber connector when assembling the optical fiber connector to a terminal of an optical transmission medium such as an optical fiber cord or an optical fiber cable in which an optical fiber and a fiber-like tensile member extending along the optical fiber is covered with a sheath and which is used for assembly work of the optical fiber connector.

2. Background Art

In the past, an optical fiber connector having built therein a mechanical splice mechanism interposing an inserted optical fiber, one end of which is fixed to a ferrule and an optical fiber of an external optical transmission medium, between two divided parts in a state where they are butt-jointed to each other and maintaining the butt-jointed state was known as an example of an optical fiber connector enabling a work of assembling an optical fiber connector to an end portion of an optical transmission medium such as an optical fiber cord or an optical fiber cable to be carried out on a splicing site (for example, see Japanese Unexamined Patent Application, First Publication No. 2002-196189).

An optical fiber connector connecting an optical fiber of an optical transmission medium and an optical fiber built in a ferrule of the optical fiber connector to each other by fusion was also known (for example, see U.S. Pat. No. 5,748,819 and Japanese Unexamined Patent Application, First Publication No. 2008-65315). Japanese Unexamined Patent Application, First Publication No. 2002-196189 (particularly, paragraphs 0022 to 0024 and FIGS. 1 to 4) discloses an optical fiber connector precisely positioning optical fibers between two divided elements having an alignment groove (a V groove, a U groove, or the like) used to align optical fibers and butt-jointing the optical fibers.

U.S. Pat. No. 5,748,819 (particularly, FIGS. 1 to 3) discloses an optical fiber connector having a structure in which a fusion-spliced portion is disposed in a slot formed in a ferrule, a front end of a built-in optical fiber is located on an end face, and a rear end of the built-in optical fiber is exposed into the slot so as to be fusion-spliced to an end of an optical fiber of an optical transmission medium in the slot.

Japanese Unexamined Patent Application, First Publication No. 2008-65315 (particularly, paragraphs 0033 to 0036 and FIGS. 3 and 4) discloses an optical fiber connector in which an end of an optical fiber of which the other end is fixed to a ferrule is fusion-spliced to an end of an optical fiber core and the fusion-spliced portion is reinforced with a reinforcing member such as a heat-shrinkable sleeve or a metal sleeve.

An optical fiber connector configured to splice an inserted optical fiber of which an end portion is fixed to a ferrule and an optical fiber of an external optical transmission medium to each other by fusion or the like was known as an example of an optical fiber connector enabling a work of assembling an optical fiber connector to a front end portion of an optical transmission medium such as an optical fiber cord or an optical fiber cable to be carried out on a splicing site (for example, see Japanese Unexamined Patent Application, First Publication No. 2002-196189 and Japanese Unexamined Patent Application, First Publication No. H10-319275).

An example of such a type of optical fiber connector is a multi-core optical fiber connector (an MPO type optical fiber connector; MPO: Multi-fiber Push On) defined in the JIS C5982 or the like.

When butt-jointing the optical fiber connectors to each other, a guide pin protruding from a joint end face of a ferrule of one optical fiber connector is inserted into and locked to a guide pin insertion hole of a joint end face of a ferrule of the other optical fiber connector. Accordingly, the ferrules are positioned with a high precision.

One optical fiber connector is of a male type having a guide pin and the other optical fiber connector is of a female type not having a guide pin.

The guide pin is inserted into a guide pin insertion hole formed in the ferrule and then the rear end portion thereof is supported by a pin clamp formed in the back of the ferrule.

When assembling an optical fiber connector to an optical fiber cord terminal extending a tensile fiber has been carried out, which is longitudinally added to an optical fiber of an optical fiber cord and is received in a sheath along with the optical fiber, to a cord terminal and to fix the tensile fiber to the rear end of the body (housing) of the optical fiber connector with a metal ring by swaging so as to satisfactorily detain the optical fiber cord in the optical fiber connector (for example, see Japanese Unexamined Patent Application, First Publication No. 2001-235656).

The optical fiber connector disclosed in Japanese Unexamined Patent Application, First Publication No. 2002-196189 does not require an alignment groove to position optical fibers relative to each other before splicing. Accordingly, the decrease in cost is limited due to the presence of components to be machined by high-precision processing.

The optical fiber connector disclosed in U.S. Pat. No. 5,748,819 requires fusion work at a side surface position of a ferrule. Accordingly, when a general-purpose discharging electrode is used in the fusion work, the ferrule may be adversely affected and thus a general fusion splicer should not be used, thereby making the fusion work difficult.

In the optical fiber connector disclosed in Japanese Unexamined Patent Application, First Publication No. 2008-65315, the other end of the optical fiber fixed to the ferrule is drawn out from the ferrule, the adverse influence of the fusion work on the ferrule is reduced. However, since the reinforcing sleeve needs to pass the optical fiber core therethrough before the fusion work and to move to a position where it covers the outer circumference of the fusion-spliced portion after the fusion work, it takes much labor to form a splice reinforcing portion. The outer diameter of the optical fiber core needs to be smaller than the inner diameter of the sleeve (so that the outer circumferential shape of the sectional surface of the optical fiber core is included in the inner circumferential shape of the sectional surface of the sleeve). Accordingly, it is difficult to apply this technique to an optical transmission medium such as a drop cable or a multi-core optical fiber having a large outer diameter (outer circumferential shape).

In order to enhance the efficiency of the work on the splicing work site, there is a need for an optical fiber connector having a structure capable of selecting the presence or absence of a guide pin (male type or female type).

In the optical fiber connector, the guide pin can be attached and detached by inserting or pulling the guide pin, the rear end portion of which is fixed to a pin clamp, into or from the rear side thereof.

However, it is not possible to avoid the increase in size of the optical fiber connector, in that it is substantially difficult to attach and detach the guide pin in consideration of the adverse influence on an optical fiber spliced portion (for example, a fusion-spliced portion) and it is necessary to guarantee a space for movement of the pin clamp between the ferrule and the optical fiber spliced portion so as to avoid the adverse influence.

When the optical fiber connector is configured to weaken the fixing force in the rear end of the guide pin and to be able to easily insert or pull the guide pin into or from the front side of the ferrule, the space on the rear side of the ferrule is not necessary, but there is a problem in that the guide pin can easily fall out with this structure.

When performing the work of fixing the tensile fiber to the body of the optical fiber connector by swaging, it is necessary to swage a metal ring in a state where tension is applied to the tensile fiber. Accordingly, for example, as disclosed in Japanese Unexamined Patent Application, First Publication No. 2001-235656, a tool (hereinafter, also referred to as a swaging tool) capable of fixing the optical fiber connector and the optical fiber cord and fixing the tensile fiber extending from the cord terminal is necessary. The labor of fixing the optical fiber connector, the optical fiber cord, and the tensile fiber extending from the cord terminal by the use of the swaging tool is necessary.

SUMMARY OF THE INVENTION

The invention is made in consideration of the above-mentioned circumstances and has the following objects.

(1) An object of the invention is to provide an optical fiber connector and a method of assembling the optical fiber connector, which can facilitate the work of fusion-splicing optical fibers to each other and the work of reinforcing the fusion-spliced portion.

(2) Another object of the invention is to provide an optical fiber connector to and from which a guide pin can be attached and detached, which does not cause the guide pin to fall out, and which can suppress an increase in size, a pin clamp used therein, and a method of assembling the optical fiber connector.

(3) Still another object of the invention is to provide a cap-attached optical fiber connector which can simply perform the work of fixing a tensile member, which extends from the terminal of an optical transmission medium (an optical fiber cord or an optical fiber cable) in which an optical fiber and a fiber-like tensile member extending along the optical fiber are covered with a sheath, to a housing the optical fiber connector without using a tool for fixing the optical fiber connector, the optical fiber cord, the tensile member extending from the cord terminal and which can enhance the work efficiency of the connector assembling work, a method of assembling the optical fiber connector, and an optical fiber connector cap.

To achieve the above-mentioned objects, according to an aspect of the invention, there is provided an optical fiber connector including: a ferrule; an inserted optical fiber of which one end portion is fixed to the ferrule and of which the other end portion protrudes from the ferrule; an external optical fiber of which a front end portion is fusion-spliced to the other end portion of the inserted optical fiber; and a pair of reinforcing members that pinches and reinforces the fusion-spliced portion of the other end portion of the inserted optical fiber and the front end portion of the external optical fiber, wherein the reinforcing members include an adhesion layer on the inner surface thereof which comes in contact with the other end portion of the inserted optical fiber and the front end portion of the external optical fiber, and the adhesion layer is depressed at the position where the inserted optical fiber and the external optical fiber come in contact with each other so as to closely adhere to the outer circumferential surfaces of the optical fibers in the fusion-spliced portion.

The adhesion layer may be formed of rubber or an elastomer.

The adhesion layers of the pair of reinforcing members may closely adhere to each other at the position where the fusion-spliced portion is pinched between the pair of reinforcing members.

The pair of reinforcing members may include protuberance portions and recessed portions engaging with each other on both sides in the width direction perpendicular to the length direction of the inserted optical fiber and the external optical fiber, and the state where the adhesion layers of the pair of reinforcing members closely adhere to each other may be maintained by causing the protuberance portions and the recessed portions to engage with each other.

A ferrule boot covering the surrounding of the portion of the inserted optical fiber protruding from the ferrule may be attached to the ferrule, and the pair of reinforcing members may clamp the ferrule boot at end portions thereof close to the ferrule.

To achieve the above-mentioned objects, according to another aspect of the invention, there is provided a method of assembling an optical fiber connector, including the steps of: fusion-splicing the other end portion of an inserted optical fiber, of which one end portion is fixed to a ferrule and of which the other end portion protrudes from the ferrule, to a front end portion of an external optical fiber; and preparing a pair of reinforcing members including an adhesion layer, which can be depressed at the position where the inserted optical fiber and the external optical fiber come in contact with each other, on the inner surface thereof which comes in contact with the other end portion of the inserted optical fiber and the front end portion of the external optical fiber, pinching the fusion-spliced portion of the other end portion of the inserted optical fiber and the front end portion of the external optical fiber between the pair of reinforcing members, and causing the adhesion layers to closely adhere to the outer circumferential surfaces of the optical fibers in the fusion-spliced portion.

The adhesion layer may be formed of rubber or an elastomer.

When pinching the fusion-spliced portion between the pair of reinforcing members, the adhesion layers of the pair of reinforcing members may closely adhere to each other on both lateral sides of the optical fibers at the position where the fusion-spliced portion is pinched between the pair of reinforcing members.

The pair of reinforcing members may include protuberance portions and recessed portions engaging with each other on both sides in the width direction perpendicular to the length direction of the inserted optical fiber and the external optical fiber, and when pinching the fusion-spliced portion between the pair of reinforcing members, the pair of reinforcing members may be combined to maintain the state where the adhesion layers of the pair of reinforcing members closely adhere to each other by causing the protuberance portions and the recessed portions to engage with each other.

A ferrule to which a ferrule boot covering the surrounding of the portion of the inserted optical fiber protruding from the ferrule may be attached is used as the ferrule, and when pinching the fusion-spliced portion between the pair of reinforcing members, the ferrule boot may be clamped between the pair of reinforcing members at end portions of the pair of reinforcing members close to the ferrule.

A first reinforcing member having a shaft portion at an end portion opposite to the ferrule and a second reinforcing member opposed to the first reinforcing member may be used as the pair of reinforcing members, an assembling tool including a reinforcing member holding portion holding the second reinforcing member at a predetermined position and a bearing portion rotatably holding the shaft portion of the first reinforcing member when pinching the fusion-spliced portion between the pair of reinforcing members may be used. Before pinching the fusion-spliced portion between the pair of reinforcing members, a step of holding the second reinforcing member on the reinforcing member holding portion, a step of placing the fusion-spliced portion on the second reinforcing member, a step of holding the shaft portion of the first reinforcing member on the bearing portion, and a step of rotating the first reinforcing member toward the second reinforcing member about the shaft portion in the bearing portion until the fusion-spliced portion is pinched between the first reinforcing member and the second reinforcing member may be performed.

According to still another aspect of the invention, there is provided a reinforcement method of pinching and reinforcing a fusion-spliced portion, in which end portions of a first optical fiber and a second optical fiber are fusion-spliced to each other, between a pair of reinforcing members, including the steps of: preparing a first reinforcing member having a shaft portion at an end in the length direction of the first optical fiber and the second optical fiber and a second reinforcing member opposed to the first reinforcing member as a pair of reinforcing members including an adhesion layer, which can be depressed at a position where the first optical fiber and the second optical fiber come in contact with each other, on the inner surface which comes in contact with the first optical fiber and the second optical fiber; preparing an assembling tool including a reinforcing member holding portion holding the second reinforcing member at a predetermined position and a bearing portion rotatably holding the shaft portion of the first reinforcing member when pinching the fusion-spliced portion between the pair of reinforcing members; holding the second reinforcing member on the reinforcing member holding portion; placing the fusion-spliced portion on the second reinforcing member; holding the shaft portion of the first reinforcing member on the bearing portion; rotating the first reinforcing member toward the second reinforcing member about the shaft portion in the bearing portion until the fusion-spliced portion is pinched between the first reinforcing member and the second reinforcing member, and interposing the fusion-spliced portion between the pair of reinforcing members and causing the adhesion layers to closely adhere to the outer circumferential surface of the optical fibers in the fusion-spliced portion.

The adhesion layer may be formed of rubber or an elastomer.

When pinching the fusion-spliced portion between the pair of reinforcing members, the adhesion layers of the pair of reinforcing members may closely adhere to each other on both lateral sides of the optical fibers at the position where the fusion-spliced portion is pinched between the pair of reinforcing members.

The pair of reinforcing members may include protuberance portions and recessed portions engaging with each other on both sides in the width direction perpendicular to the length direction of the first optical fiber and the second optical fiber, and when pinching the fusion-spliced portion between the pair of reinforcing members, the pair of reinforcing members may be combined to maintain the state where the adhesion layers of the pair of reinforcing members closely adhere to each other by causing the protuberance portions and the recessed portions to engage with each other.

According to still another aspect of the invention, there is provided an optical fiber connector including: a ferrule that has a guide pin insertion hole into which a positioning guide pin of an opposite optical fiber connector can be inserted so as to be pulled out therefrom; an optical fiber of which one end portion reaching a joint end face of the ferrule is fixed to the ferrule and of which the other end portion extends from the ferrule; and a pin clamp that can be attached to a protrusion protruding from the opposite side to the joint end face of the ferrule in the guide pin inserted into the guide pin insertion hole so as to be detached therefrom in the direction crossing the guide pin insertion hole, wherein the pin clamp includes a fitting recessed portion that is fitted to the protruding portion of the guide pin to regulate the movement in the length direction of the guide pin, and the fitting recessed portion is formed to receive and put out the protrusion of the guide pin in the direction crossing the guide pin insertion hole.

The protrusion of the guide pin may have a large-diameter portion and a small-diameter portion having a diameter smaller than that of the large-diameter portion at the tip thereof, and the fitting recessed portion may be locked to the small-diameter portion to regulate the movement of the large-diameter portion toward the tip.

The ferrule may have two guide pin insertion holes, which are formed on both sides with the optical fiber pinched therebetween, the pin clamp may have a bottom portion and side wall portions formed on both sides thereof and a space surrounded with the bottom portion and the side wall portions on both sides thereof serves as an insertion space of the optical fiber, and the pin clamp may have two fitting recessed portions, which are formed in the side wall portions on both sides.

The optical fiber may be an inserted optical fiber, the other end portion of the inserted optical fiber may be spliced to an external optical fiber, a ferrule boot covering a portion of the inserted optical fiber extending from the ferrule may be attached to the portion, and the pin clamp may be formed to insert the ferrule boot into the insertion space.

A holding protrusion that protrudes to the inside and that regulates the movement of the ferrule boot in the insertion space to the outside may be formed in the side wall portions of the pin clamp.

According to still another aspect of the invention, there is provided a pin clamp used for an optical fiber connector including a ferrule that has a guide pin insertion hole into which a positioning guide pin of an opposite optical fiber connector can be inserted so as to be pulled out therefrom and an optical fiber of which one end portion reaching a joint end face of the ferrule is fixed to the ferrule and of which the other end portion extends from the ferrule, wherein the pin clamp can be attached to a protrusion protruding from the opposite side to the joint end face of the ferrule in the guide pin inserted into the guide pin insertion hole so as to be detached therefrom in the direction crossing the guide pin insertion hole, wherein the pin clamp includes a fitting recessed portion that is fitted to the protruding portion of the guide pin to regulate the movement in the length direction of the guide pin, and wherein the fitting recessed portion is formed to receive and put out the protrusion of the guide pin in the direction crossing the guide pin insertion hole.

According to still another aspect of the invention, there is provided a method of assembling an optical fiber connector including a ferrule that has a guide pin insertion hole into which a positioning guide pin of an opposite optical fiber connector can be inserted so as to be pulled out therefrom, an optical fiber of which one end portion reaching a joint end face of the ferrule is fixed to the ferrule and of which the other end portion extends from the ferrule, and a pin clamp that can be attached to a protrusion protruding from the opposite side to the joint end face of the ferrule in the guide pin inserted into the guide pin insertion hole so as to be detached therefrom in the direction crossing the guide pin insertion hole, wherein the pin clamp includes a fitting recessed portion that is fitted to the protruding portion of the guide pin to regulate the movement in the length direction of the guide pin, and the fitting recessed portion is formed to receive and put out the protrusion of the guide pin in the direction crossing the guide pin insertion hole, the method including the steps of: splicing the other end portion of the optical fiber to a front end portion of an external optical fiber; and attaching the pin clamp to the protrusion of the guide pin so that the protrusion of the guide pin is locked to the fitting recessed portion from the direction crossing the guide pin insertion hole.

According to still another aspect of the invention, there is provided a cap-attached optical fiber connector including: an optical fiber connector that is assembled (coupled) to a terminal of an optical transmission medium in which an optical fiber and a fiber-like tensile member extending along the optical fiber are covered with a sheath; and an optical fiber connector cap that is detachably attached to a front end portion which is an end portion of the optical fiber connector, wherein the optical fiber connector includes a ferrule, a housing having a sleeve shape for receiving the ferrule and having a ring member fixing portion fixing a ring member on the outer circumference thereof, and an inserted optical fiber which is inserted into and fixed to the ferrule and of which a portion extending rearward from the ferrule is optically connected to an optical fiber drawn out of the terminal of the optical transmission medium, wherein a tensile member detaining portion detaining the tensile member of the optical transmission medium is provided to the outer surface of the body of the optical fiber connector cap, and wherein the tensile member can be fixed to the housing by fixing the ring member to the ring member fixing portion in a state where the tensile member extending forward through the vicinity of the ring member fixing portion from the terminal of the optical transmission medium is detained in the tensile member detaining portion.

According to still another aspect of the invention, there is provide a cap-attached optical fiber connector including: an optical fiber connector that is assembled to a terminal of an optical transmission medium in which an optical fiber and a fiber-like tensile member extending along the optical fiber are covered with a sheath; and an optical fiber connector cap that is detachably attached to a front end portion which is an end portion of the optical fiber connector, wherein the optical fiber connector includes a ferrule into and to which an optical fiber drawn out of the terminal of the optical transmission medium is inserted and fixed and a housing having a sleeve shape for receiving the ferrule and having a ring member fixing portion fixing a ring member on the outer circumference thereof, wherein a tensile member detaining portion detaining the tensile member of the optical transmission medium is provided to the outer surface of the body of the optical fiber connector cap, and wherein the tensile member can be fixed to the housing by fixing the ring member to the ring member fixing portion in a state where the tensile member extending forward through the vicinity of the ring member fixing portion from the terminal of the optical transmission medium is detained in the tensile member detaining portion.

The ring member fixing portion may be a screw portion to which a screwed ring member can be screwed, and the tensile member may be fixed to the housing by screwing the screwed ring member to the screw portion in a state where the tensile member extending forward through the vicinity of the screw portion from the terminal of the optical transmission medium is detained in the tensile member detaining portion.

The ring member fixing portion may be a swage ring attachment portion to which a swage ring can be fixed by swaging, and the tensile member may be fixed to the housing by fixing the swage ring to the swage ring attachment portion in a state where the tensile member extending forward through the vicinity of the swage ring attachment portion from the terminal of the optical transmission medium is detained in the tensile member detaining portion.

The tensile member detaining portion of the optical fiber connector cap may be a hooking protrusion protruding from the outer surface of the body of the optical fiber connector cap and capable of hooking and detaining the tensile member.

The ferrule may be a multi-core ferrule of a pin-fitting positioning type which is positioned and butt-jointed by locking a pair of guide pins protruding from an end face of one of the ferrule and an opposite ferrule butt-jointed thereto to a pair of guide pin holes formed in the end face of the other and a plurality of the inserted optical fibers may be inserted into and fixed to the ferrule.

According to still another aspect of the invention, there is provided a method of assembling an optical fiber connector to a terminal of an optical transmission medium in which an optical fiber and a fiber-like tensile member extending along the optical fiber are covered with a sheath, including: a fiber connecting step of optically connecting the optical fiber drawn out of the terminal of the optical transmission medium to a rear extension which is a portion extending backward from a ferrule of an inserted optical fiber inserted into and fixed to the ferrule; a housing assembling step of assembling a housing of the optical fiber connector to the front side of the terminal of the optical transmission medium and receiving a spliced portion of the inserted optical fiber and the optical fiber of the optical transmission medium and the ferrule after the fiber connecting step; and a tensile member fixing step of detaining a tensile member extending forward through the vicinity of a ring member fixing portion formed on the outer circumference of the housing from the terminal of the optical transmission medium in a tensile member detaining portion formed on the outer surface of a body of an optical fiber connector cap in a state where the optical fiber connector cap is detachably attached to a front end portion of the housing and then fixing the tensile member to the housing by fixing a ring member to the ring member fixing portion.

The ring member fixing portion may be a screw portion to which a screwed ring member can be screwed, and the tensile member fixing step may include fixing the tensile member to the housing by screwing the screwed ring member to the screw portion in a state where the tensile member extending forward through the vicinity of the screw portion from the terminal of the optical transmission medium is detained in the tensile member detaining portion.

The ring member fixing portion may be a swage ring attachment portion to which a swage ring can be fixed by swaging, and the tensile member fixing step may include fixing the tensile member to the housing by fixing the swage ring to the swage ring attachment portion in a state where the tensile member extending forward through the vicinity of the swage ring attachment portion from the terminal of the optical transmission medium is detained in the tensile member detaining portion.

The tensile member detaining portion of the optical fiber connector cap may be a hooking protrusion protruding from the outer surface of the body of the optical fiber connector cap and capable of hooking and detaining the tensile member.

The fiber connecting step may include a fusion-splicing and reinforcing step of fusion-splicing the inserted optical fiber and the optical fiber of the optical transmission medium to each other and then reinforcing the fusion-spliced portion by the use of a reinforcing member.

The fusion-splicing and reinforcing step may include fusion-splicing the inserted optical fiber and the optical fiber of the optical transmission medium to each other, then pinching the fusion-spliced portion between a pair of pinch members, which is used as the reinforcing member, each having an adhesion layer which can be depressed at a position where the inserted optical fiber and the optical fiber of the optical transmission medium on the inner surface which comes in contact with a rear extension of the inserted optical fiber and the optical fiber of the optical transmission medium, and closely adhering the adhesion layers to the outer circumferential surfaces of the optical fibers in the fusion-spliced portion.

The pair of pinch members may include pinching engagement portions that pinch the fusion-spliced portion by engaging with each other and that maintain a pressing force for closely adhering the adhesion layers to the outer circumferential surfaces in the fusion-spliced portion the inserted optical fiber and the optical fiber of the optical transmission medium.

The adhesion layers may be formed of rubber or elastomer.

The ferrule may be a multi-core ferrule of a pin-fitting positioning type which is positioned and butt-jointed by locking a pair of guide pins protruding from an end face of one of the ferrule and an opposite ferrule butt-jointed thereto to a pair of guide pin holes formed in the end face of the other and a plurality of the inserted optical fibers are inserted into and fixed to the ferrule.

According to still another aspect of the invention, there is provided an optical fiber connector cap which is detachably attached to an end portion of an optical fiber connector and in which a tensile member detaining portion that fixes a tensile member extending from a terminal of an optical transmission medium when assembling the optical fiber connector to the terminal of the optical transmission medium in which an optical fiber and a fiber-like tensile member extending along the optical fiber are covered with a sheath is provided to the outer surface of the optical fiber connector cap.

The tensile member detaining portion may be a hooking protrusion capable of hooking and detaining the tensile member.

According to still another aspect of the invention, there is provided an optical fiber connector assembling tool used to assemble an optical fiber connector, the optical fiber connector including a ferrule, an inserted optical fiber of which one end portion is fixed to the ferrule and of which the other end portion protrudes from the ferrule, an external optical fiber of which a front end portion is fusion-spliced to the other end portion of the inserted optical fiber, and a pair of reinforcing members that pinches and reinforces the fusion-spliced portion of the other end portion of the inserted optical fiber and the front end portion of the external optical fiber, the pair of reinforcing members including a first reinforcing member having a shaft portion at an end opposite to the ferrule and a second reinforcing member opposed to the first reinforcing member, the optical fiber connector assembling tool including a bearing supporting portion which includes a reinforcing member holding portion holding the second reinforcing member at a predetermined position and a bearing portion rotatably holding the shaft portion of the first reinforcing member, wherein the bearing supporting portion enables the first reinforcing member to rotationally move toward the second reinforcing member held by the reinforcing member holding portion until the first reinforcing members pinch the fusion-spliced portion.

The optical fiber connector assembling tool may further include: a core holding portion that holds the external optical fiber; and a pressing cover that presses the external optical fiber on the core holding portion.

The shaft portion may protrude to one side and the other side of the first reinforcing member, the bearing supporting portion may include a pair of support members opposed to each other, and the bearing portion may be formed in each of the pair of support members and supports the shaft portion protruding on one side and the other side of the first reinforcing member.

According to still another aspect of the invention, there is provided an optical fiber connector assembling set including the above-mentioned optical fiber connector assembling tool and the optical fiber connector.

According to still another aspect of the invention, there is provided a method of assembling an optical fiber connector using the above-mentioned optical fiber connector assembling tool, including: before pinching the fusion-spliced portion between the pair of reinforcing members, a step of holding the second reinforcing member on the reinforcing member holding portion, a step of placing the fusion-spliced portion on the second reinforcing member, a step of holding the shaft portion of the first reinforcing member on the bearing portion, and a step of rotating the first reinforcing member toward the second reinforcing member about the shaft portion in the bearing portion until the fusion-spliced portion is pinched between the first reinforcing member and the second reinforcing member.

An optical fiber connector of the invention includes: a ferrule; an inserted optical fiber of which one end portion is fixed to the ferrule and an other end portion protrudes from the ferrule; an external optical fiber of which a front end portion is fusion-spliced to the other end portion of the inserted optical fiber; and one or more reinforcing members that reinforce the fusion-spliced portion of the other end portion of the inserted optical fiber and the front end portion of the external optical fiber It is preferable that the optical fiber connector of the invention further include an adhesion layer applied on the inner surface of the reinforcing members. The adhesion layer covers an area where the inserted optical fiber and the external optical fiber come in contact with each other, and adheres to the outer surfaces of the other end portion of the inserted optical fiber and the front end portion of the external optical fiber.

In the optical fiber connector of the invention, it is preferable that the adhesion layer include rubber or an elastomer.

In the optical fiber connector of the invention, it is preferable that the one or more reinforcing members include a pair of reinforcing members having protuberance portions and recessed portions engaging with each other. The adhesion layer maintains the engaging of the protuberance portions and the recessed portions with each other.

It is preferable that the optical fiber connector of the invention further include a ferrule boot which covers the surrounding of the other end portion of the inserted optical fiber. The ferrule boot is attached to the ferrule. The one or more reinforcing members further secure the ferrule boot to the ferrule.

A method of assembling an optical fiber connector of the invention, includes: fusion-splicing an other end portion of an inserted optical fiber to a front end portion of an external optical fiber, one end portion of the inserted optical fiber being fixed to a ferrule and the other end portion being protruded from the ferrule; and applying one or more reinforcing members to secure the fusion-spliced portion of the other end portion of the inserted optical fiber and the front end portion of the external optical fiber to the ferrule.

It is preferable that the method of assembling an optical fiber connector of the invention further include applying an adhesion layer on the inner surface of the reinforcing members. The adhesion layer covers an area where the inserted optical fiber and the external optical fiber come in contact with each other, and adheres to the outer surfaces of the other end portion of the inserted optical fiber and the front end portion of the external optical fiber.

In the method of assembling an optical fiber connector of the invention, it is preferable that the adhesion layer include rubber or an elastomer.

In the method of assembling an optical fiber connector of the invention, it is preferable that the one or more reinforcing members include a pair of reinforcing members having protuberance portions and recessed portions engaging with each other. The adhesion layer maintains the engaging of the protuberance portions and the recessed portions with each other.

It is preferable that the method of assembling an optical fiber connector of the invention further include applying a ferrule boot to cover the surrounding of the other end portion of the inserted optical fiber, the ferrule boot being attached to the ferrule. The ferrule boot is secured to the ferrule by the one or more reinforcing members.

In the method of assembling an optical fiber connector of the invention, it is preferable that the one or more reinforcing members include a first reinforcing member having a shaft portion and a second reinforcing member. The securing of the fusion-spliced portion between the first and second reinforcing members is performed using an assembling tool including a reinforcing member holding portion and a bearing portion. The method includes: holding the second reinforcing member on the reinforcing member holding portion at a predetermined position, placing the fusion-spliced portion on the second reinforcing member, holding the shaft portion of the first reinforcing member on the bearing portion, and rotating the first reinforcing member toward the second reinforcing member about the shaft portion in the bearing portion until the fusion-spliced portion is pinched between the first reinforcing member and the second reinforcing member.

It is preferable that the method of assembling an optical fiber connector of the invention further include arranging the first reinforcing member having the shaft portion at an end in the length direction of the inserted optical fiber and the external optical fiber; arranging the second reinforcing member opposed to the first reinforcing member as a pair of reinforcing members; and applying an adhesion layer on the inner surface of the pair of reinforcing members, covering an area where the inserted optical fiber and the external optical fiber come in contact with each other, and adhering to the outer surfaces of the other end portion of the inserted optical fiber and the front end portion of the external optical fiber.

It is preferable that the method of assembling an optical fiber connector of the invention further include interposing the fusion-spliced portion between the pair of reinforcing members to cause the adhesion layer to adhere to the outer circumferential surface of the inserted and external optical fibers in the fusion-spliced portion.

A pin clamp used of the invention for an optical fiber connector includes a ferrule that has a guide pin insertion hole being formed to receive a positioning guide pin of an opposite optical fiber connector and an optical fiber of which one end portion reaching a joint end face of the ferrule is fixed to the ferrule and of which an other end portion extends from the ferrule. The pin clamp, which can be attached to a protrusion protruding from the opposite side to the joint end face of the ferrule, is formed to secure the positioning guide pin in the guide pin insertion hole, and can be detached from the ferrule in the direction crossing the guide pin insertion hole The pin clamp includes a fitting recessed portion being formed to fit the protruding portion of the positioning guide pin to regulate the movement in the length direction of the positioning guide pin. The fitting recessed portion is formed to receive the protrusion of the guide pin in the direction crossing the guide pin insertion hole.

A method of assembling an optical fiber connector of the invention including a ferrule that has a guide pin insertion hole being formed to receive a positioning guide pin of an opposite optical fiber connector, an optical fiber of which one end portion reaching a joint end face of the ferrule is fixed to the ferrule and of which an other end portion extends from the ferrule, and a pin clamp that can be attached to a protrusion protruding from the opposite side to the joint end face of the ferrule being formed to secure the guide pin in the guide pin insertion hole, and can be detached from the ferrule in the direction crossing the guide pin insertion hole, the pin clamp includes a fitting recessed portion being formed to fit the protruding portion of the guide pin to regulate the movement in the length direction of the guide pin, and the fitting recessed portion being formed to receive and put out the protrusion of the guide pin in the direction crossing the guide pin insertion hole. The method includes the steps of: splicing the other end portion of the optical fiber to a front end portion of an external optical fiber; and attaching the pin clamp to the protrusion of the guide pin so that the protrusion of the guide pin is locked to the fitting recessed portion from the direction crossing the guide pin insertion hole.

An optical fiber connector of the invention includes: a ferrule that has a guide pin insertion hole being formed to receive a positioning guide pin of an opposite optical fiber connector; an optical fiber of which one end portion reaching a joint end face of the ferrule is fixed to the ferrule and of which an other end portion extends from the ferrule; and a pin clamp that can be attached to a protrusion protruding from the opposite side to the joint end face of the ferrule being formed to secure the positioning guide pin in the guide pin insertion hole, and can be detached from the ferrule in the direction crossing the guide pin insertion hole. The pin clamp includes a fitting recessed portion is formed to fit the protruding portion of the positioning guide pin to regulate the movement in the length direction of the positioning guide pin. The fitting recessed portion is formed to receive the protrusion of the guide pin in the direction crossing the guide pin insertion hole.

In the optical fiber connector of the invention, it is preferable that the fitting recessed portion is formed to receive the protrusion of the guide pin that has a large-diameter portion and a small-diameter portion having a diameter smaller than that of the large-diameter portion at the tip thereof. The fitting recessed portion is locked to the small-diameter portion to regulate the movement of the large-diameter portion toward the tip.

In the optical fiber connector of the invention, it is preferable that the ferrule have two guide pin insertion holes including the guide pin insertion hole, and the two guide pin insertion holes be formed on both sides with the optical fiber pinched there between, The pin clamp has a bottom portion and side wall portions formed on both sides thereof and a space surrounded with the bottom portion and the side wall portions on both sides thereof serves as an insertion space of the optical fiber. The pin clamp has two fitting recessed portions, which are formed in the side wall portions on both sides.

An optical fiber connector cap of the invention which is detachably attached to an end portion of an optical fiber connector and in which a tensile member detaining portion that fixes a tensile member extending from a terminal of an optical transmission medium when assembling the optical fiber connector to the terminal of the optical transmission medium in which an optical fiber and a fiber-like tensile member extending along the optical fiber are covered with a sheath is provided to the outer surface of the optical fiber connector cap.

In the optical fiber connector cap of the invention, it is preferable that the tensile member detaining portion include a hooking protrusion capable of hooking and detaining the tensile member.

An optical fiber connector assembling tool of the invention includes: a bearing supporting portion which includes a reinforcing member holding portion being formed to hold a second reinforcing member at a predetermined position, and a bearing portion being formed to rotatably hold a shaft portion of a first reinforcing member. The bearing portion enables the first reinforcing member to rotationally move toward the second reinforcing member held by the reinforcing member holding portion until the first reinforcing member pinch the fusion-spliced portion. The shaft portion of the first reinforcing member is positioned at an end opposite to a ferrule, and the second reinforcing member being opposed to the first reinforcing member. The ferrule is part of an optical fiber connector having an inserted optical fiber of which one end portion is fixed to the ferrule and an other end portion protrudes from the ferrule, and has an external optical fiber of which a front end portion is fusion-spliced to the other end portion of the inserted optical fiber. The first and second reinforcing members pinch and reinforce the fusion-spliced portion of the other end portion of the inserted optical fiber and the front end portion of the external optical fiber.

A method of assembling an optical fiber connector using the above-described optical fiber connector assembling tool, includes: before pinching the fusion-spliced portion between the first and second reinforcing members, holding the second reinforcing member on the reinforcing member holding portion, placing the fusion-spliced portion on the second reinforcing member, holding the shaft portion of the first reinforcing member on the bearing portion, and rotating the first reinforcing member toward the second reinforcing member about the shaft portion in the bearing portion until the fusion-spliced portion is pinched between the first reinforcing member and the second reinforcing member.

Furthermore, an optical fiber connector of an aspect of the invention includes: a ferrule; an inserted optical fiber of which one end portion is fixed to the ferrule and of which the other end portion protrudes from the ferrule; an external optical fiber of which a front end portion is fusion-spliced to the other end portion of the inserted optical fiber; and one or more reinforcing members configured to reinforce the fusion-spliced portion of the other end portion of the inserted optical fiber and the front end portion of the external optical fiber, wherein the ferrule includes a lens located on an extension line of the inserted optical fiber.

In the optical fiber connector of the aspect of the invention, it is preferable that the ferrule include an optical fiber stop plane, and that the optical fiber stop plane be located between one end portion of the inserted optical fiber and the lens and on a focal point defined by the lens.

Furthermore, a method of assembling an optical fiber connector of an aspect of the invention, includes the steps of: fusion-splicing an other end portion of an inserted optical fiber to a front end portion of an external optical fiber, one end portion of the inserted optical fiber being fixed to a ferrule and the other end portion being protruded from the ferrule, said one end portion including a lens; and applying one or more reinforcing members to secure the fusion-spliced portion of the other end portion of the inserted optical fiber and the front end portion of the external optical fiber to the ferrule.

Furthermore, an optical fiber connector assembling tool of an aspect of the invention includes: a bearing supporting portion which includes a reinforcing member holding portion being formed to hold a second reinforcing member at a predetermined position, and a bearing portion being formed to rotatably hold a shaft portion of a first reinforcing member, wherein the bearing portion enables the first reinforcing member to rotationally move toward the second reinforcing member held by the reinforcing member holding portion until the first reinforcing member pinch the fusion-spliced portion, wherein the shaft portion of the first reinforcing member being positioned at an end opposite to a ferrule, the ferrule includes a lens, and the second reinforcing member being opposed to the first reinforcing member, wherein the ferrule being part of an optical fiber connector having an inserted optical fiber of which one end portion is fixed to the ferrule and an other end portion protrudes from the ferrule, and having an external optical fiber of which a front end portion is fusion-spliced to the other end portion of the inserted optical fiber, wherein the first and second reinforcing members pinch and reinforce the fusion-spliced portion of the other end portion of the inserted optical fiber and the front end portion of the external optical fiber.

Advantageous Effects of the Invention

According to the invention, after one end portion of an inserted optical fiber of which the other end is fixed to the ferrule and an end portion of an external optical fiber are fusion-spliced to each other outside the ferrule, the fusion-spliced portion can be pinched and maintained between a pair of reinforcing members and it is not necessary to pass the external optical fiber through the reinforcing members before the fusion splicing, thereby facilitating the work of fusion-splicing the optical fibers and the work of reinforcing the fusion-spliced portion. Since the adhesion layers that are depressed by the contact with the optical fibers to closely adhere to the outer circumferential surfaces are provided to the inner surface of the reinforcing members, it is not necessary to provide a mechanism such as a V groove or a U groove for aligning the optical fibers to the inner surfaces of the reinforcing members.

According to the invention, since the pin clamp includes the fitting recessed portion receiving and putting out the protrusion of the guide pin in the direction crossing the guide pin insertion hole, it is possible to release the movement regulation in the length direction of the guide pin and to detach the guide pin, by moving the pin clamp in the direction.

Accordingly, the shape (male form) having a guide pin and the shape (female form) not having a guide pin can be easily switched to each other, thereby improving the workability on the splicing site.

Since it is not necessary to move the pin clamp backward when detaching the guide pin, the spliced portion of the optical fibers is not adversely influenced. Accordingly, since it is not necessary to guarantee a space for movement of the pin clamp between the ferrule and the spliced portion, it is possible to reduce the size of the optical fiber connector in the length direction.

Since the pin clamp includes the fitting recessed portion to which the protrusion of the guide pin is locked, it is possible to prevent the guide pin from falling out toward the front end.

According to the invention, in the work of assembling an optical fiber connector to a terminal of an optical transmission medium, a tensile member extending from the terminal of the optical transmission medium can be detained in the tensile member detaining portion of an optical fiber connector cap attached to the housing of the optical fiber connector. Accordingly, it is possible to simply achieve a state where tension acts on the tensile member extending from the terminal of the optical transmission medium, by only detaining the tensile member extending from the terminal of the optical transmission medium in the tensile member detaining portion of the optical fiber connector cap without using a tool for fixing an optical fiber connector, an optical fiber cord, and a tensile member extending from a terminal of the cord as in the background art. As a result, it is possible to reduce the labor for the work of assembling the optical fiber connector to the terminal of the optical transmission medium and to improve the work efficiency of the assembling work.

Since the optical fiber connector cap has a constitution simpler than that of the swaging tool in the background art and is available at a cost lower than that of the swaging tool, it is possible to reduce the cost for assembling the optical fiber connector.

BRIEF DESCRIPTION OF THE DRAWINGS

FIG. 1A is a sectional view illustrating an optical fiber connector according to a first embodiment of the invention and is a sectional view taken along a plane in which a multi-core optical fiber is arranged.

FIG. 1B is a sectional view illustrating the optical fiber connector shown in FIG. 1A and is a sectional view taken along a plane perpendicular to the plane shown in FIG. 1A and parallel to the length direction of the optical fiber.

FIG. 23A is a sectional view illustrating an optical fiber connector and is a sectional view taken along a plane in which a multi-core optical fiber is arranged.

FIG. 23B is a sectional view illustrating the optical fiber connector shown in FIG. 23A and is a sectional view taken along a plane perpendicular to the plane shown in FIG. 23A and parallel to the length direction of the optical fiber.

FIG. 32A is a diagram illustrating a method of assembling the optical fiber connector shown in FIG. 31.

FIG. 32B is a diagram illustrating the optical fiber connector assembling method subsequent to FIG. 32A.

FIG. 42A is a sectional view illustrating an optical fiber connector and a cap-attached optical fiber connector according to a fifth embodiment of the invention and is a sectional view taken along a plane in which a multi-core optical fiber is arranged.

FIG. 42B is a sectional view illustrating the optical fiber connector and the cap-attached optical fiber connector shown in FIG. 42A and is a sectional view taken along a plane perpendicular to the plane shown in FIG. 23A and parallel to the length direction of the optical fiber.

DETAILED DESCRIPTION OF THE INVENTION

First Embodiment

Hereinafter, the invention will be described on the basis of an exemplary embodiment with reference to the accompanying drawings.

Figure 2A:
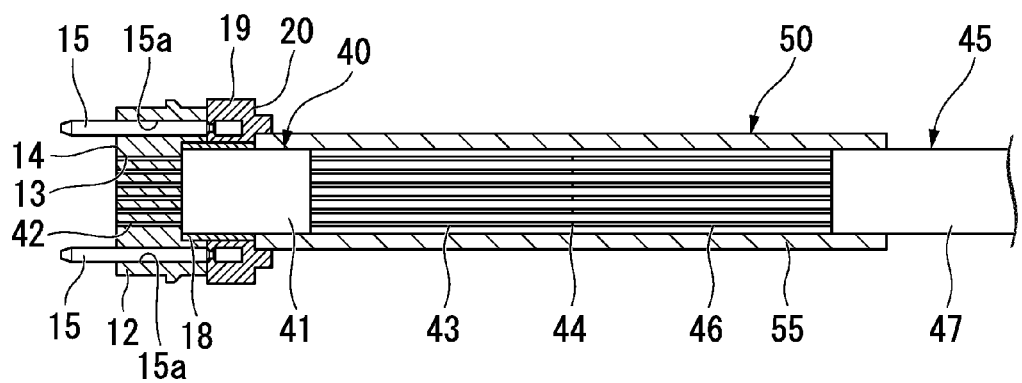
FIG. 2A is a sectional view illustrating a ferrule and a slice reinforcing portion of the optical fiber connector shown in FIGS. 1A and 1B and is a sectional view taken along the plane in which the multi-core optical fiber is arranged.
Figure 2B:
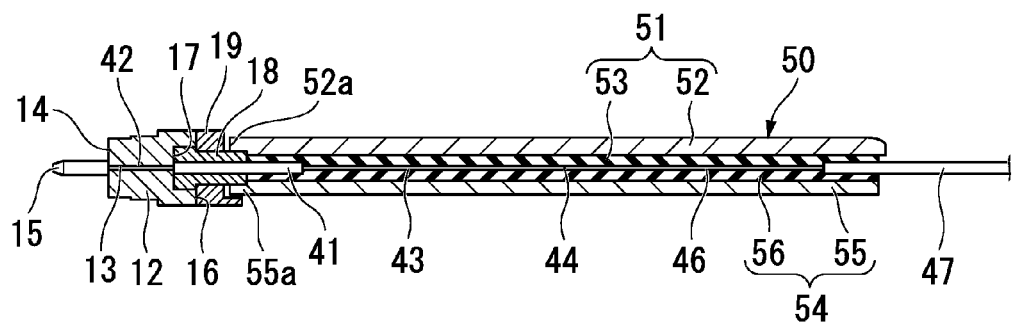
FIG. 2B is a sectional view illustrating the ferrule and the slice reinforcing portion of the optical fiber connector shown in FIGS. 1A and 1B and is a sectional view taken along a plane perpendicular to the plane shown in FIG. 2A and parallel to the length direction of the optical fiber.

FIGS. 1A and 1B show an optical fiber connector 10 according to a first embodiment of the invention and FIGS. 2A and 2B show an important part of the optical fiber connector 10. The optical fiber connector 10 receives a splice reinforcing portion 50, in which the other end portion 43 of an inserted optical fiber 40 of which one end portion 42 is fixed to a ferrule 12 is fusion-spliced to a front end portion 46 of an external optical fiber 45 and the fusion-spliced portion 44 is pinched between a pair of reinforcing members 51 and 54 to reinforce the fusion-spliced portion, in a housing or the like. FIGS. 1A and 1B may be comprehensively referred to as "FIG. 1".

Figure 4A:
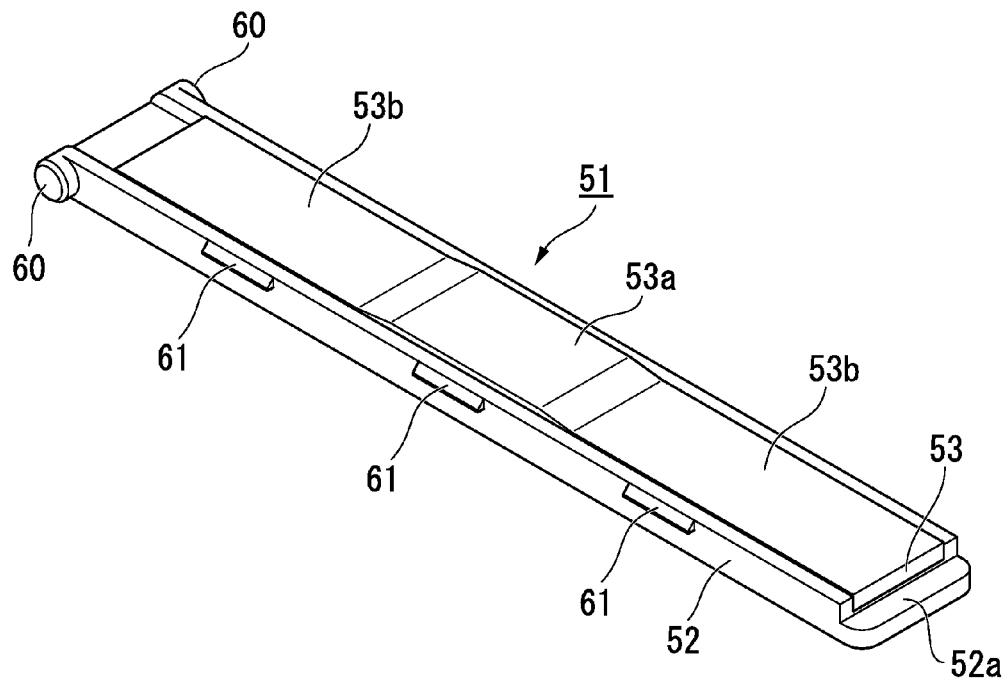
FIG. 4A is a perspective view illustrating a first reinforcing member of the slice reinforcing portion shown in FIGS. 2A and 2B.

In the following description, in order to distinguish both sides in the length direction (the lateral direction in FIG. 1) of an optical fiber, the side which a joint end face 14 of the ferrule 12 faces (the left side in FIG. 1) may be referred to as "front" and the opposite side (the right side in FIG. 1) may be referred to as "rear". FIGS. 2A and 2B may be comprehensively referred to as "FIG. 2" and FIGS. 4A and 4B may be comprehensively referred to as "FIG. 4".

An external optical fiber 45 is formed of an optical transmission medium such as an optical fiber cord or an optical fiber cable having an optical fiber. In this embodiment, the external optical fiber 45 is an optical fiber cord including a multi-core optical fiber core 47 including an optical fiber tape core in which a plurality optical fibers (optical fiber wires, which are not shown) are arranged in parallel in the lateral direction perpendicular to the length direction thereof, a tubular sheath 48 surrounding the multi-core optical fiber core 47, and a tensile fiber 49 received between the optical fiber core 47 and the sheath 48. In the front end portion 46 of the external optical fiber 45, the resin coating of the optical fiber core 47 and the resin coating of the optical fiber wires are removed and each of a plurality of bare optical fibers (parts of core and clad) are separated.

Examples of the number of bare optical fibers 46 (the number of cores) included in the optical fiber core 47 include 2, 4, 8, and 12. In FIG. 1A, the 12-core constitution is simplified and only 6 cores are shown. The optical fiber cord in this embodiment has a constitution in which a single optical fiber tape core is received in a sheath, but is not particularly to this constitution. For example, a constitution in which a plurality of single-core optical fiber cores are received in a single sheath, a constitution in which a plurality of optical fiber tape cores are received in a single sheath, and a constitution in which one or more optical fiber tape cores and signal-core optical fiber cores are received in a single sheath can be employed as the constitution of the external optical fiber.

Since an alignment mechanism such as a V groove is not necessary for a pair of reinforcing members 51 and 54 to be described later, the number of cores of the optical fiber which are held between a pair of reinforcing members 51 and 54 is not specified depending on the structure of a pair of reinforcing members 51 and 54, as long as it can be received within the width range of adhesion layers 53 and 56. The specification of a pair of reinforcing members 51 and 54 applied to optical fiber connectors with different numbers of cores such as 2 cores, 4 cores, 8 cores, and 12 cores can be used in common. That is, by changing only the ferrule to a ferrule having a suitable number of cores, an optical fiber connector having a different number of cores can be constructed, thereby contributing to a decrease in cost.

The sheath 48 is formed of a resin such as polyethylene and preferably has flexibility. A plurality of tensile fibers 49 extend along the length direction of the optical fiber and functions as a tensile member accepting a tensile force (tension) to the optical transmission medium. The fiber material used for the tensile fiber 49 is not particularly limited as long as it can provide a necessary tensile strength, and examples thereof include aramid fiber, glass fiber, and carbon fiber.

The tensile member or the sheath is not essential to the invention. For example, an optical fiber core or an optical fiber tape core not having a sheath may be used as the external optical fiber. In some structures of an optical fiber cable or the like, metal wires such as steel wires or various wires such as fiber-reinforced plastic (FRP) may be used as the tensile member. Examples of the optical fiber cable include an optical drop cable and an optical indoor cable.

The inserted optical fiber 40 is an optical fiber of which one end portion 42 is fixed to the ferrule 12 and of which the other end portion 43 protrudes (extends) backward from the ferrule 12. In this embodiment, the inserted optical fiber 40 includes a multi-core optical fiber core 41 which is an optical fiber tape core, and the resin coating of the optical fiber core 41 and the resin coating of the optical fiber wires are removed in one end portion 42 and the other end portion 43 of the optical fiber core 41 so as to separate into a plurality of bare optical fibers (parts of core and clad).

The optical fiber used as the inserted optical fiber 40 is not limited to the multi-core optical fiber, but a structure in which one or more short single-core optical fibers are inserted into a single ferrule, a structure in which one or more optical fiber tape cores and single-core optical fiber cores are received in a single ferrule, or the like may be employed.

Figure 3:
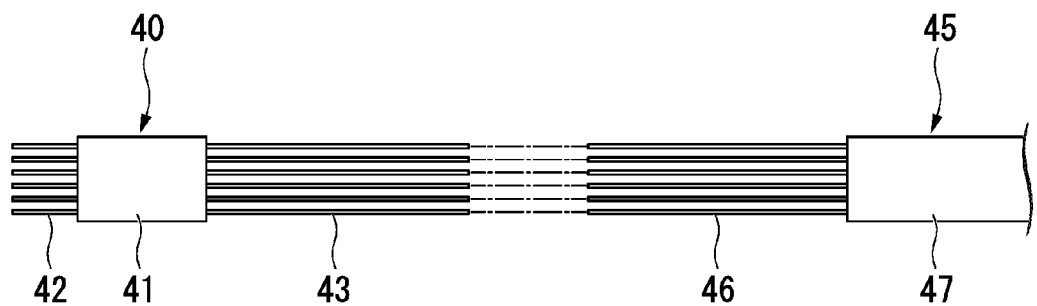
FIG. 3 is a plan view illustrating an inserted optical fiber and an external optical fiber of the optical fiber connector shown in FIGS. 1A and 1B.

As shown in FIG. 3, the other end portion 43 of the inserted optical fiber 40 and the front end portion 46 of the external optical fiber 45 correspond to each other in a one-to-one manner and are fusion-spliced to each other. As shown in FIG. 2, the fusion-spliced portion 44 of the other end portion 43 of the inserted optical fiber 40 and the front end portion 46 of the external optical fiber 45 is pinched between a pair of reinforcing members 51 and 54 to reinforce the fusion-spliced portion. The ferrule 12 around the inserted optical fiber 40 is not shown in FIG. 3, but one end portion 42 of the inserted optical fiber 40 is preferably fixed into an optical fiber insertion hole 13 of the ferrule 12 before the fusion-splice to the external optical fiber 45.

As shown in FIG. 2, the ferrule 12 includes a front end face (joint end face) 14 butt-jointed to a ferrule (not shown) of another optical fiber connector, a rear end face 16 which is the opposite end face of the joint end face 14, optical fiber insertion holes (micro holes) 13 opened in the joint end face 14, and a boot-receiving hole 17 opened in the rear end face 16. The ferrule 12 can be formed, for example, as an integrated molded product formed of plastic. The joint end face 14 of the ferrule 12 may be a vertical face perpendicular to the central axis (substantially matched with the optical axis of the optical fiber 42) of the optical fiber insertion holes 13, or may be an inclined face inclined in a predetermined direction corresponding to a ferrule of another optical fiber connector.

The optical fiber insertion holes 13 are formed in the same number as the number of optical fibers in one end portion 42 of the inserted optical fiber 40. For example, a method of injecting an adhesive into the optical fiber insertion holes 13 to adhere to the bare optical fibers can be simply used as the method of fixing the bare optical fibers which are one end portion 42 of the inserted optical fiber 40 to the ferrule 12. The optical fiber insertion holes 13 are connected to the boot-receiving hole 17. A ferrule boot 18 is attached around the optical fiber core 41 and is received in the boot-receiving hole 17. The ferrule boot 18 is preferably formed of a flexible material such as rubber or elastomer, but the ferrule boot 18 may be formed of a material such as a resin or a metal having low flexibility.

Examples of the number of optical fiber insertion holes 13 (the number of cores) formed in the ferrule 12 include 2, 4, 8, and 12. In FIG. 1A, the structure of 12 cores is simplified and only 6 cores are shown. In the optical fiber connector 10 according to this embodiment, a single-core ferrule may be used as the ferrule 12.

The optical fiber insertion holes 13 on the joint end face 14 of the multi-core ferrule 12 are arranged in a line to match with the arrangement of optical fibers pinched between the reinforcing members 51 and 54 to be described later. The invention is not limited to the constitution in which the arrangement of optical fibers in the ferrule 12 are set to be the same as the arrangement of optical fibers in the splice reinforcing portion 50, but the arrangement of optical fibers separated for each core between the ferrule 12 and the splice reinforcing portion 50 may be changed.

For the purpose of alignment when coupling the ferrule 12 to another ferrule of another optical fiber connector, a guide pin 15 passing through the joint end face 14 and the rear end face 16 may be provided. The tip of the guide pin 15 protrudes from the joint end face 14 and the guide pin is inserted into a guide pin insertion hole (not shown) formed in the ferrule of another optical fiber connector to suppress the shaking in the direction along the joint end face 14 (such as the vertical direction in FIG. 2A, the vertical direction in FIG. 2B, or an inclined direction obtained by combining the directions). When a guide pin is provided to a ferrule of another optical fiber connector, a guide pine insertion hole is provided to the ferrule 12. A hole 15a formed as a trace of pulling out the guide pin 15 from the ferrule 12 may be used as the guide pin insertion hole 15a. Alternatively, the ferrule 12 having a guide pin insertion hole formed thereon instead of the guide pin 15 may be used at the first time.

Preferably, the guide pin 15 can be attached and detached by the insertion and the pulling-out into and from the guide pin insertion hole 15a, since it can be easily determined on the splicing site with which of the optical fiber connector 10 and another optical fiber connector to provide the guide pin. For example, when the jointed state of the optical fiber connector 10 and another optical fiber connector is released, a pin clamp 19 is disposed on the rear end face 16 of the ferrule 12 so as to prevent the guide pin 15 from being unintentionally pulled out. In this embodiment shown in FIG. 1, the pin clamp 19 fills a gap between the ferrule 12 and the splice reinforcing portion 50 and includes a spring seat 20 for accepting an impelling force (pressing force based on elasticity) from a ferrule spring 24. Accordingly, even when the guide pin 15 is not installed in the ferrule 12, the pin clamp 19 is attached to the ferrule 12. The pin clamp 19 can be inserted into and fixed to the ferrule 12 by, for example, irregularity or the like (not shown).

The guide pin 15 may be fixed to the guide pin insertion hole 15a (for example, by adhesion or embedment through insert molding) for use.

An example of the reinforcing members 51 and 54 used in this embodiment is shown in FIGS. 4 to 7. The first reinforcing member 51 used in the upper side of FIG. 2B is shown in FIG. 4A and the second reinforcing member 54 used in the lower side of FIG. 2B is shown in FIG. 4B. In this embodiment, the reinforcing members 51 and 54 includes reinforcing member bodies 52 and 55 formed of a hard material such as a resin or a metal and adhesion layers 53 and 56 disposed on the inner surfaces coming in contact with the other end portion 43 of the inserted optical fiber 40 and the front end portion 46 of the external optical fiber 45, respectively.

Figure 16:
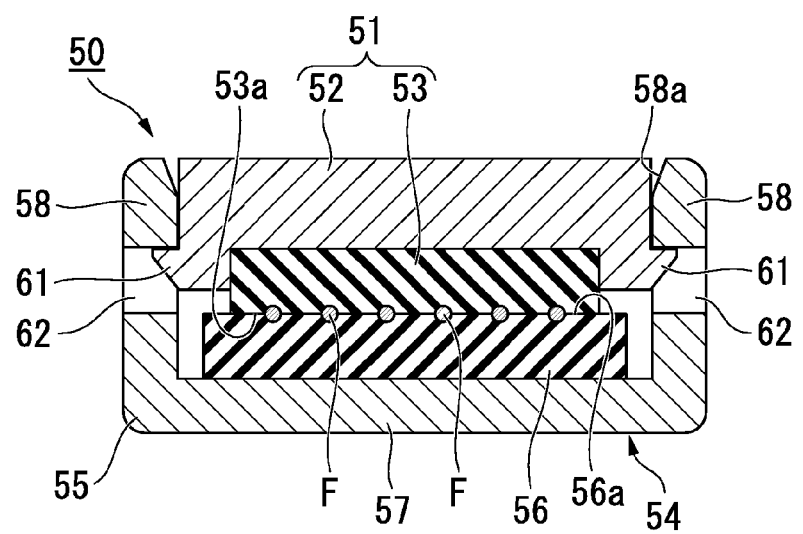
FIG. 16 is a sectional view illustrating a state where an optical fiber is held in the slice reinforcing portion.

As shown in FIG. 16, the adhesion layers 53 and 56 are depressed at the position where the inserted optical fiber and the external optical fiber (which are comprehensively represented by the optical fibers F in FIG. 16) come in contact with each other to closely adhere to the outer circumferential surfaces of the optical fibers F in the vicinity of the fusion-spliced portion 44. Accordingly, a mechanism such as a V groove or a U groove used to align the optical fibers is not necessary to form in the inner surfaces of the reinforcing members. In this embodiment, since the other end portion 43 of the inserted optical fiber 40 and the front end portion 46 of the external optical fiber 45 are fusion-spliced in advance, the splice loss is small and the loss is not increased due to the axial misalignment (misalignment of the optical axes) of both optical fibers or the separation of the end faces.

In the case of the groove-like mechanism such as a V groove or a U groove, when the outer diameter in the vicinity of the fusion-spliced portion 44 is greater than the original outer diameter of the optical fibers (before the fusion splice), an excessive pressing force acts on the fusion-spliced portion 44, thereby shortening the lifetime. On the other hand, when the outer diameter in the vicinity of the fusion-spliced portion 44 is smaller, the positioning of the optical fibers is not stabilized and the positions of the optical fibers may be misaligned in the lateral direction in the grooved mechanism. On the contrary, when the adhesion layers 53 and 56 have deformability following the outer circumferential surface of the optical fibers F, the positioning of the optical fibers F is stabilized, thereby suppressing the warp of the optical fibers F with the lapse of time or the increase in loss.

In this embodiment, as shown in FIG. 16, at the position where the optical fibers F in the fusion-spliced portion 44 are pinched between a pair of reinforcing members 51 and 54, the adhesion layers 53 and 56 of the pair of reinforcing members 51 and 54 closely adhere to each other on both sides (on both sides in the width direction perpendicular to the length direction) of the optical fibers F. Accordingly, it is possible to suppress the warp of the optical fibers F with the lapse of time or the increase in loss. Since there is no gap between the opposed adhesion layers 53 and 56, it is possible to prevent the permeation of moisture or the like which may adversely influence the lifetime of bare optical fibers (particularly, in the case of quartz optical fibers). When an opaque material is used for the adhesion layers 53 and 56, it is possible to prevent the leakage of light (leaking light) from the gap between the adhesion layers 53 and 56.

The adhesion layers 53 and 56 are preferably formed of a flexible elastic material such as rubber or elastomer. Accordingly, when the optical fibers F are pinched between the adhesion layers 53 and 56 with a pressing force, the adhesion layers are depressed at the position where they come in contact with the optical fibers F and thus more closely adhere to the outer circumferential surfaces of the optical fibers F with the elastic force of the adhesion layers 53 and 56. The elastic force of the adhesion layers 53 and 56 has such a magnitude that the original flat surface is restored, when the pressing force is released after the depression.

When a foamed material is used for the adhesion layers 53 and 56, it is preferable that bubbles be small and the bubbles be independent of each other (the bubbles be not connected). An adhesive (pressure-sensitive adhesive) may be used as the adhesion layers 53 and 56, but it is preferable that the adhesion layers 53 and 56 be non-adhesive (the adhesive force is small or zero to such an extent that the bare optical fibers 43 and 46 can be easily detached after the temporary disposing) so as to dispose the bare optical fibers 43 and 46 again after temporarily disposing them. When the adhesive force of the surfaces of the adhesion layers 53 and 56 is weak, it is difficult to cause the adhesion layers 53 and 56 to closely adhere to the bare optical fibers 43 and 46. Accordingly, it is preferable that the positional relationship between the first reinforcing member 51 and the second reinforcing member 54 be fixed to maintain appropriate pressing forces from both sides.

Figure 4B:
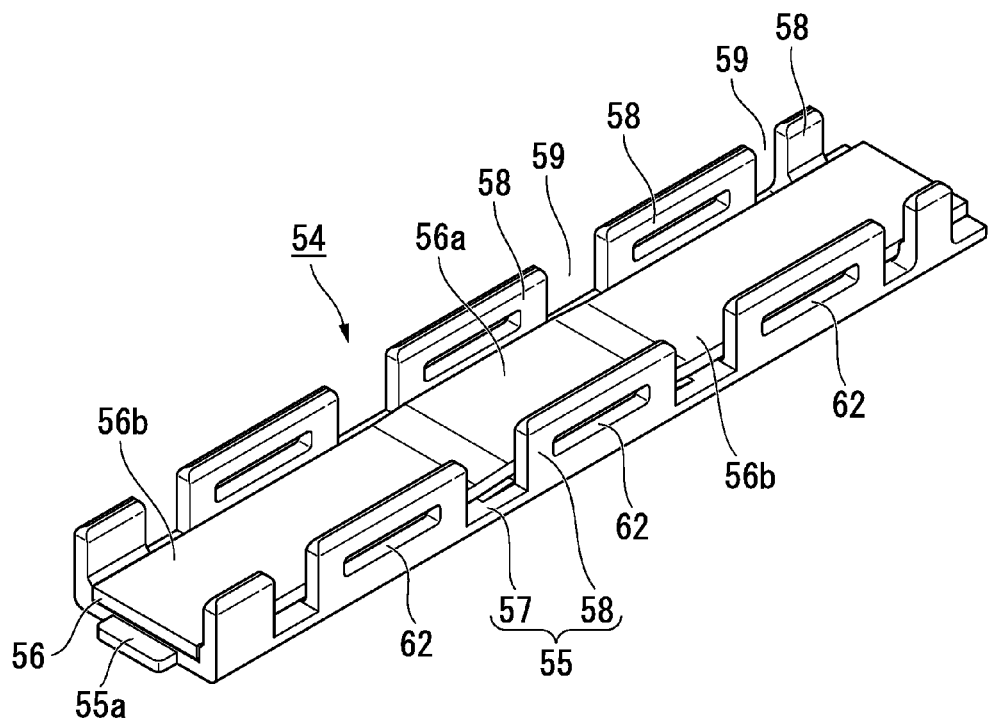
FIG. 4B is a perspective view illustrating a second reinforcing member of the slice reinforcing portion shown in FIGS. 2A and 2B.
Figure 5:
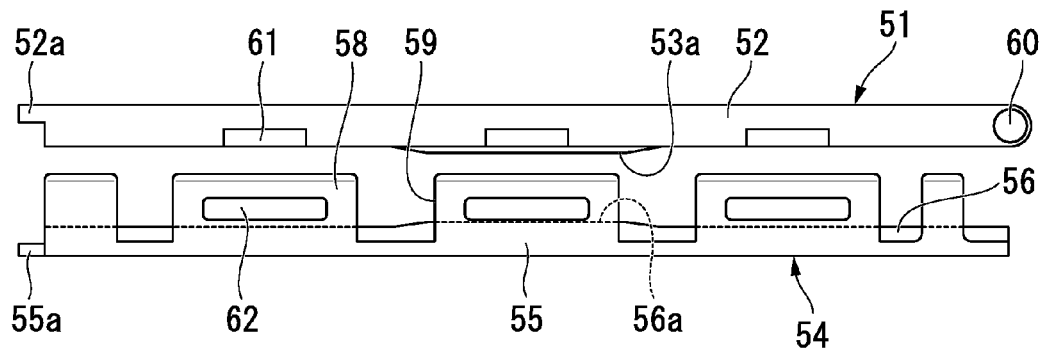
FIG. 5 is a side view illustrating a state where the first reinforcing member and the second reinforcing member shown in FIGS. 4A and 4B are opposed to each other with a gap therebetween.
Figure 6:
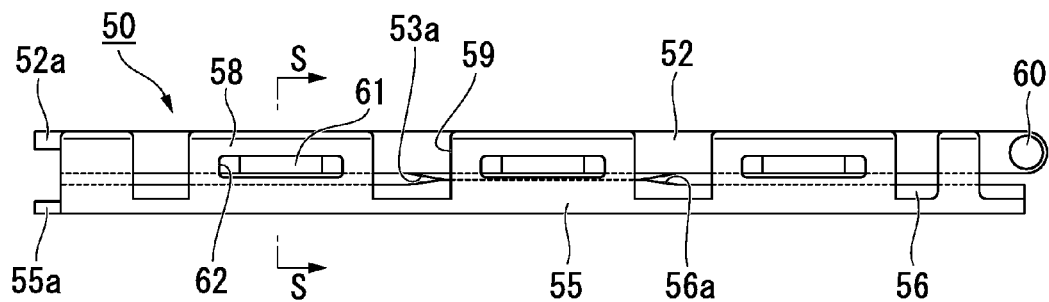
FIG. 6 is a side view illustrating a state where the first reinforcing member and the second reinforcing member shown in FIGS. 4A and 4B are combined.

As shown in FIGS. 4 to 6, a pair of reinforcing members 51 and 54 includes protuberance portions 61 and recessed portions 62, respectively, engaging with each other on both sides in the width direction (the direction perpendicular to the paper surface of FIGS. 5 and 6) which is the direction perpendicular to the length direction of the inserted optical fiber 40 and the external optical fiber 45. By causing the protuberance portions (engaging protuberance portions) 61 and the recessed portions (engaging recessed portions) 62 to engage with each other, the state where the adhesion layers 53 and 56 of the pair of reinforcing members 51 and 54 closely adhere to each other is maintained. Accordingly, even when the adhesion therebetween is not maintained with only the adhesive force between the adhesion layers 53 and 56, it is possible to cause the adhesion layers 53 and 56 to satisfactorily closely adhere to each other and thus to prevent the first reinforcing member 51 and the second reinforcing member 54 from being separated from each other.

In this embodiment, as shown in FIG. 4B, the body 55 of the second reinforcing member 54 includes a bottom portion 57 and side wall portions 58 and 58 formed on both sides in the width direction thereof and the engaging recessed portion 62 is a through-hole formed in the side wall portions 58. Accordingly, it is possible to easily confirm the engagement state of the engaging recessed portions 61 from the outside with the naked eye or a magnifier. From the viewpoint of the incorporation of the reinforcing members 51 and 54, only the inner surfaces of the side wall portions 58 to form holes (blind holes) not penetrating the outer surface as the engaging recessed portions. Instead of forming the engaging protuberance portions in the first reinforcing member and forming the engaging recessed portions in the second reinforcing member 54, the engaging protuberance portions may be formed in the second reinforcing member and the engaging recessed portions may be formed in the first reinforcing member 54. Various combinations such as a combination of alternately forming the engaging protuberance portion and the engaging recessed portion in the first reinforcing member and alternately forming the engaging recessed portion and the engaging protuberance portion in the second reinforcing member so as to be complementary thereto may be employed.

Figure 7:
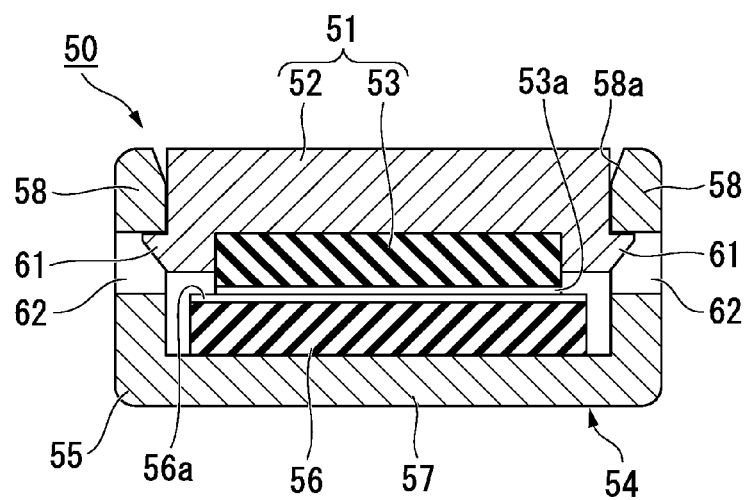
FIG. 7 is a sectional view taken along line S-S of FIG. 6.

The side wall portion 58 of the second reinforcing member 54 is divided into a plurality of parts (tongue-shaped parts) by cutouts 59 and one or more engaging recessed portions 62 are disposed on one side. Accordingly, as shown in FIG. 7, when the first reinforcing member 51 is interposed between the pair of side wall portions 58 opposed to each other in the width direction, the side wall portions 58 having the engaging recessed portions 62 can be independently opened and closed. Even when a set of engaging portions is loosened, the other engaging portions are not loosened therewith. In the front end portions (the upside in FIG. 7) of the side wall portions 58 protruding from the bottom wall portion 57, an inclined surface 58a is formed on the inner surface side of the side wall portions 58. Accordingly, it is possible to easily interpose the first reinforcing member 51 between the pair of side walls 58 opposed to each other in the width direction. When the engaging protuberance portions 61 and the engaging recessed portions 62 are disengaged from each other after the pair of reinforcing members 51 and 54 are combined, a tool may be inserted into the clearance between the inclined surface 58a of the side wall portion 58 and the first reinforcing member body 52 to easily push and open the side wall portion 58 to the outside in the width direction.

The adhesion layers 53 and 56 in this embodiment include swelled portions 53a and 56a of which the surface is raised higher in the vicinity of the fusion-spliced portion 44 and thus the pressing force can be kept higher between the swelled portions 53a and 56a. Alleviated portions 53b and 56b which are lower in height than the swelled portions 53a and 56a and which are alleviated in pressing force are disposed on both sides of the swelled portions 53a and 56a (on both sides in the length direction of the bare optical fibers 43 and 46). Examples of a method of forming the swelled portions 53a and 56a include a method of forming protrusions in the reinforcing member bodies 52 and 55 in the back of the adhesion layers 53 and 56 and a method of partially increasing the thicknesses of the adhesion layers 53 and 56.

The sets of engaging portions including the sets of the engaging protuberance portions 61 and the engaging recessed portions 62 are disposed in the length direction of the optical fibers. Specifically, one set (or two or more sets) is disposed at the position of the swelled portions 53a and 56a, one set (or two or more sets) is disposed at the position of the alleviated portions 53b and 56b on the side of the inserted optical fiber 40, and one set (or two or more sets) is disposed at the position of the alleviated portions 53b and 56b on the side of the external optical fiber 45. Accordingly, the pressing force applied to the fusion-spliced portion 44 from the swelled portions 53a and 56a can be adjusted by adjusting the positional relationship of the engaging portions in the swelled portions 53a and 56a. Even when the pressing force of the swelled portions 53a and 56a is excessively strong and the engaging portions are loosened due to the repulsive force between the swelled portions 53a and 56a, the engaging portions in the alleviated portions 53b and 56b are not loosened well, thereby preventing the first reinforcing member 51 and the second reinforcing member 54 from being separated from each other.

As shown in FIG. 2B, a ferrule boot 18 covering the part of the inserted optical fiber 40 extending from the ferrule 12 is attached to the ferrule 12. The pair of reinforcing members 51 and 54 (specifically, the bodies 52 and 55 thereof) include protrusions serving as boot clamping portions 52a and 55a at ends close to the ferrule 12 and the ferrule boot 18 is clamped between the boot clamping portions 52a and 55a. Accordingly, both ends of the ferrule boot 18 is tightly held between the ferrule 12 and the pair of reinforcing members 51 and 54, thereby satisfactorily preventing the warp or damage of the inserted optical fiber 40.

The method of assembling the optical fiber connector 10 according to this embodiment includes a step of fusion-splicing the other end portion 43 of the inserted optical fiber 40, of which one end portion 42 is fixed to the ferrule 12 and of which the other end portion 43 protrudes from the ferrule 12, to the front end portion 46 of the external optical fiber 45 and then pinching the fusion-spliced portion 44 between the pair of reinforcing members 51 and 54 to integrate them into a body. Accordingly, the adhesion layers 53 and 56 disposed on the inner surfaces of the reinforcing members 51 and 54 can be caused to closely adhere to the outer circumferential surfaces of the bare optical fibers 43 and 46 in the fusion-spliced portion 44.

Figure 12:
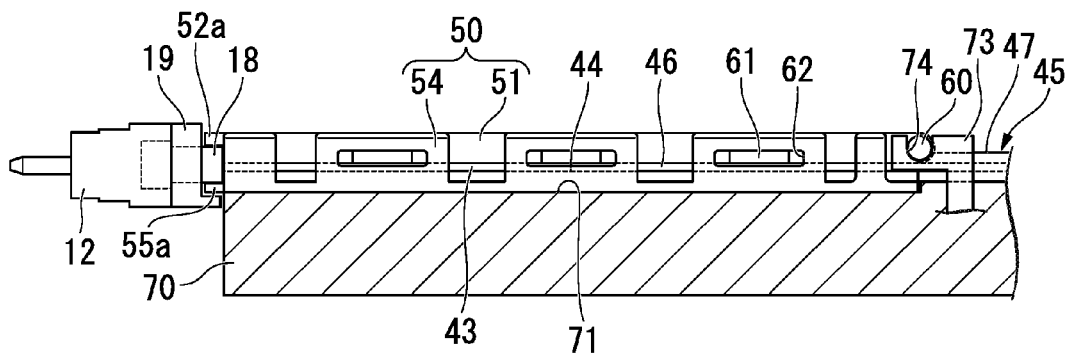
FIG. 12 is a schematic diagram illustrating an example of a state where the fusion-sliced portion is held between the first reinforcing member and the second reinforcing member.
Figure 13:
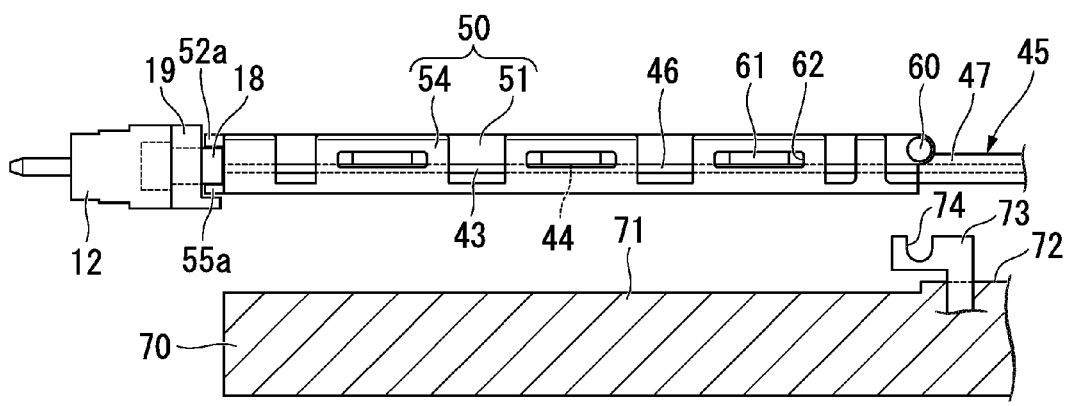
FIG. 13 is a schematic diagram illustrating an example of a state where the slice reinforcing portion is detached from the assembling tool.

The reinforcing members 51 and 54 in this embodiment include a first reinforcing member 51 having a shaft portion 60 at an end opposite to the ferrule 12 and a second reinforcing member 54 opposed to the first reinforcing member 51. A suitable assembling method in this case will be described below with reference to FIGS. 8 to 13. In FIGS. 12 and 13, the bare optical fibers 43 and 46 are shown to be visible so as to easily see the positions of the bare optical fibers 43 and 46 between the adhesion layers 53 and 56. However, it is preferable that the bare optical fibers 43 and 46 be sealed between the adhesion layers 53 and 56 after closing the reinforcing members 51 and 54, as shown in FIG. 16.

Figure 8:
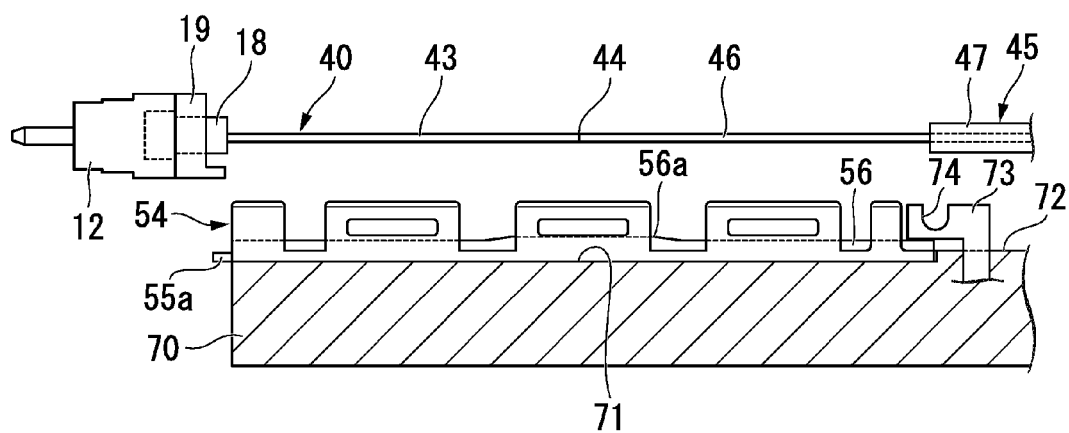
FIG. 8 is a schematic diagram illustrating an example of a state where the second reinforcing member is placed on an assembling tool.

First, as shown on the upper side of FIG. 8, a structure in which the other end portion 43 of the inserted optical fiber 40 protruding from the ferrule 12 is fusion-spliced to the front end portion 46 of the external optical fiber 45 is prepared. In this embodiment, a ferrule to which the guide pin 15, the ferrule boot 18, the pin clamp 19, and the internal optical fiber 40 are attached in advance is used as the ferrule 12 and the other end portion 43 of the inserted optical fiber 40 has only to be fusion spliced to the front end portion 46 of the external optical fiber 45 on the splicing site. When the pin clamp 19 can be attached and detached after assembling the splice reinforcing portion 50, the steps shown in FIGS. 8 to 13 may be performed in a state where the guide pin 15 or the pin clamp 19 is detached from the ferrule 12.

As shown on the lower side of FIG. 8, the second reinforcing member 54 is held on the assembling tool 70. The assembling tool 70 includes a reinforcing member holding portion 71 holding the second reinforcing member 54 at a predetermined position, a core holding portion 72 holding a part of the optical fiber core 47 of the external optical fiber 45, an arm portion 73 (see FIG. 10) having a bearing portion 74 rotatably holding the shaft portion 60 of the first reinforcing member 51, and a pressing cover 75 (see FIG. 11) pressing the part of the optical fiber core 47 of the external optical fiber 45 against the core holding portion 72.

The reinforcing member holding portion 71 preferably has a grooved structure to holding the second reinforcing member 54 from both sides in the width direction (the lateral direction in FIG. 7) of the bottom wall portion 57 so as for the second reinforcing member 54 not to move in the width direction. In this embodiment, the side wall portions 58 protrude upward from the bottom wall portion 57. Accordingly, when the first reinforcing member 51 is pushed between both side wall portions 58, both side wall portions 58 may be opened until the protuberance portions 61 of the first reinforcing member 51 reach the engaging recessed portions 62 from the upside.

Figure 9:
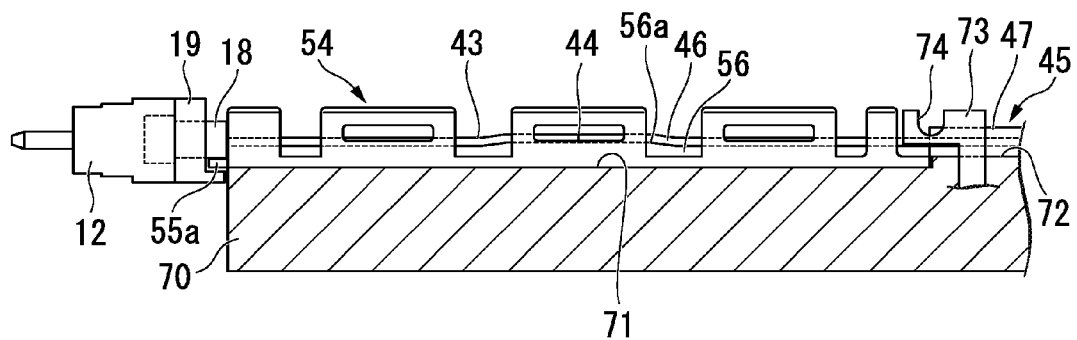
FIG. 9 is a schematic diagram illustrating an example of a state where a fusion-sliced portion is placed on the second reinforcing member.

As shown in FIG. 9, the fusion-spliced portion 44 of the bare optical fibers 43 and 46 is placed on the second reinforcing member 54. The adhesion layer 56 formed on the inner surface of the second reinforcing member 54 faces the upside and the fusion-spliced portion 44 is placed on the swelled portion 56a of the adhesion layer 56. Since the bare optical fibers 43 and 46 are thin (generally in the diameter range of about 60 to about 150 μm, for example, 125 μm more or less) and is not desirable to directly touch with a hand, it is preferable that a holder not shown be provided under the ferrule 12 and a thick part of the holder and the external optical fiber 45 be picked up for work.

Figure 10:
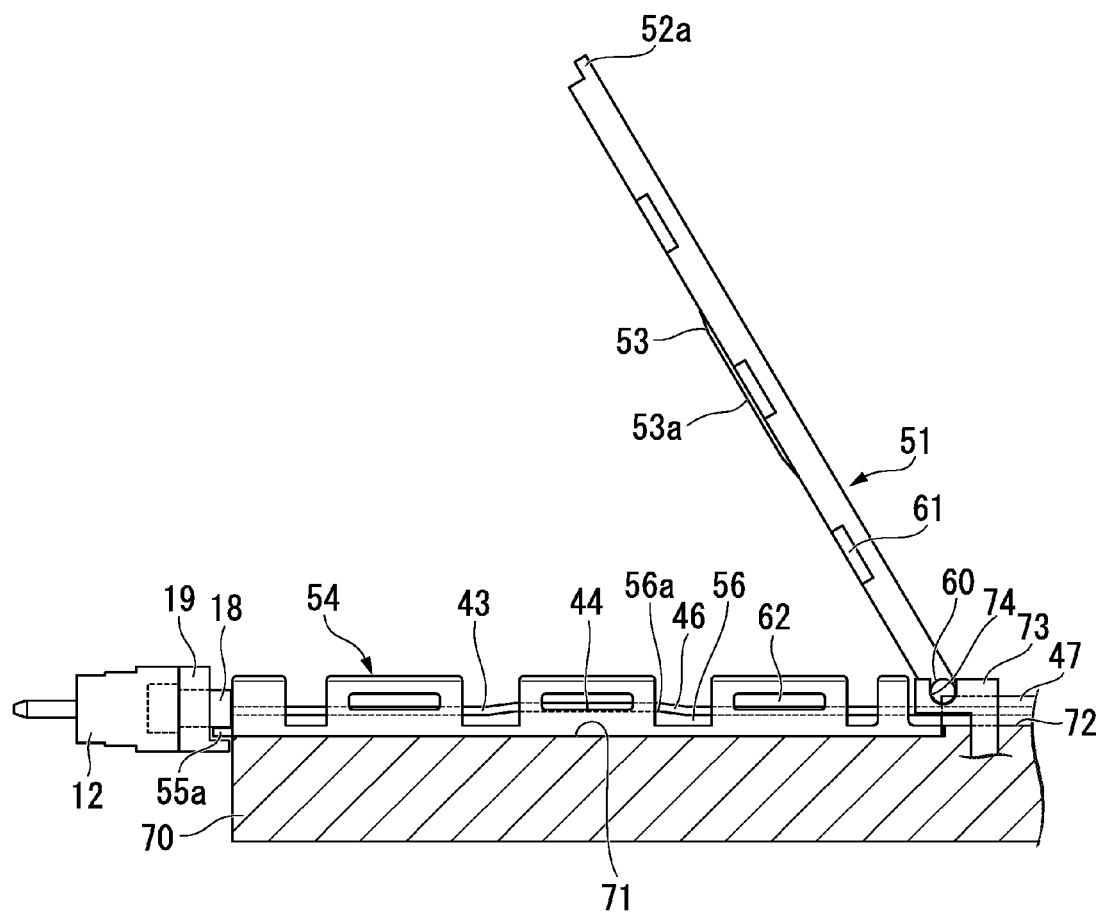
FIG. 10 is a schematic diagram illustrating an example of a state where a shaft portion of the first reinforcing member is held in a bearing portion of the assembling tool.

As shown in FIG. 10, the shaft portion 60 of the first reinforcing member 51 is held in the bearing portion 74.

At this time, the adhesion layer 53 formed on the inner surface of the first reinforcing member 51 is disposed to face the second reinforcing member 54.

Figure 11:
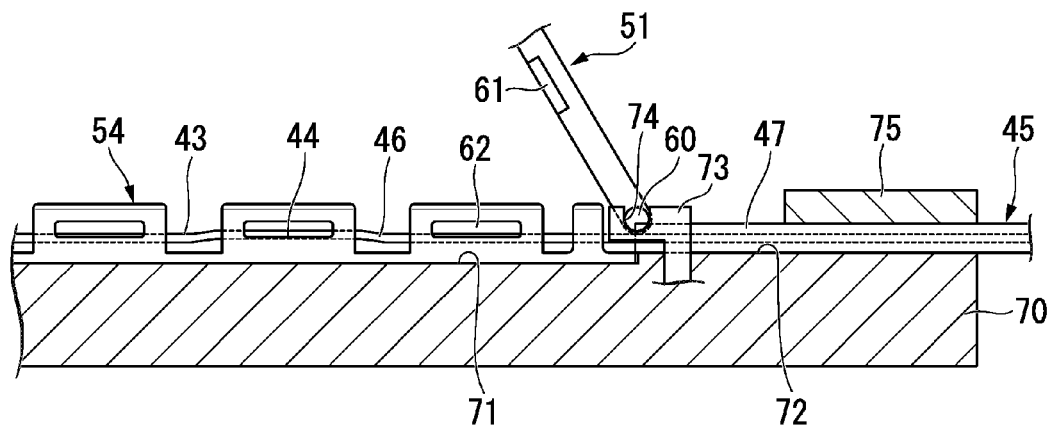
FIG. 11 is a schematic diagram illustrating an example of a state where a pressing cover of the assembling tool is closed.

As shown in FIG. 11, the pressing cover 75 is closed from the upside of the optical fiber core 47 of the external optical fiber 45 to pinch the optical fiber core 47 between the core holding portion 72 and the pressing cover 75. Before closing the pressing cover 75, the external optical fiber 45 is preferably attracted in the direction (to the right side in FIG. 11) in which it goes apart from the ferrule 12 with a hand to remove the loosening of the bare optical fibers 43 and 46 or the optical fiber cores 41 and 47 before and after. When attracting the external optical fiber 45, the end portion (specifically, the boot clamping portion 55a) of the second reinforcing member 54 on the side of the ferrule 12 comes in contact with the rear end of the ferrule 12 (specifically, the pin clamp 19) and the movement to the side of the inserted optical fiber 40 is stopped, whereby it is not necessary to particularly press the ferrule 12 with a hand or the like.

In the above-mentioned steps, the time of performing the step of holding the shaft portion 60 of the first reinforcing member 51 in the bearing portion 74 is not particularly limited as long as it is before the fusion-spliced portion 44 is pinched between the pair of reinforcing members 51 and 54. For example, the step may be performed after the pressing cover 75 is closed. By providing the pressing cover 75, the state where tension is applied to the optical fiber 45 can be maintained without pressing the optical fiber, thereby improving the workability. Examples of the method of opening and closing the pressing cover 75 include methods using a magnet, a screw, a spring, or the like in addition to a method using a latch having an engaging claw or protrusion.

In this embodiment, the optical fiber core 47 is pinched between the core holding portion 72 and the pressing cover 75, but a part of the optical fiber cord or the optical fiber cable may be pinched therebetween.

As shown in FIG. 12, the first reinforcing member 51 is rotationally moved to the second reinforcing member 54 about the shaft portion 60 in the bearing portion 74 to pinch the fusion-spliced portion 44 between the pair of reinforcing members 51 and 54. Accordingly, the splice reinforcing portion 50 can be assembled to the rear side of the ferrule 12 and the bare optical fibers 43 and 46 are sealed between the adhesion layers 53 and 56.

When pinching the fusion-spliced portion 44 between the pair of reinforcing members 51 and 54, the engaging protuberance portions 61 are made to engage with the engaging recessed portions 62, as shown in FIG. 16. The ferrule boot 18 is clamped between t boot clamping portions 52a and 55a formed at the ends of the pair of reinforcing members 51 and 54 on the side of the ferrule 12.

Then, as shown in FIG. 13, the structure (see FIG. 2 for the sectional structure) in which the splice reinforcing portion 50 is assembled to the rear side of the ferrule 12 is detached from the assembling tool 70. Since the bearing portion 74 has a U shape in which the bottom is a semicircular shape and the top is horizontally opened, the shaft portion 60 can be easily detached from the bearing portion 74 by raising the splice reinforcing portion 50 with a hand or the like.

In this way, by using the first reinforcing member 51 having the shaft portion 60 of which the central axis line is perpendicular to the length direction of the optical fibers and the assembling tool 70 having the bearing portion 74, the first reinforcing member 51 falls out in the direction parallel to the length direction of the optical fibers with respect to the second reinforcing member 54 and it is thus possible to suppress a rotational (twisting) force about the axis of the optical fibers when the first reinforcing member 51 comes in contact with the optical fibers.

Since the positional relationship between the reinforcing member holding portion 71 and the bearing portion 74 are appropriately determined in advance, the bearing portion 74 supporting the shaft portion 60 can be used as a reference for positioning the first reinforcing member 51 with respect to the second reinforcing member 54. That is, since the second reinforcing member 54 is not erroneously moved when attaching the shaft portion 60 to the bearing portion 74, the work is facilitated even with the small size of the reinforcing members 51 and 54.

By assembling the housing receiving the ferrule 12 and the splice reinforcing portion 50 after assembling the splice reinforcing portion 50 to the rear side of the ferrule 12, the optical fiber connector 10 shown in FIG. 1 can be completed.

The optical fiber connector 10 described in this embodiment is a multi-core optical fiber connector and the example shown in the drawings is an MPO type optical fiber connector (F13 type multi-core optical fiber connector defined in the JIS C5982, MPO: Multi-fiber Push On). The optical fiber connector applicable to the invention is not limited to the single-core type or the multi-core type.

The housing of the optical fiber connector 10 includes a sleeve-like (tubular) plug frame 21 and a sleeve-like (tubular) stop ring 30 attached to the rear end of the plug frame 21. The side surface of the ferrule 12 is held from the surrounding by the front opening 22 of the plug frame 21. An engaging claw 33 which can engage with an engaging window 27 formed in the side wall portion of the plug frame 21 is formed in the outer surface of the stop ring 30 so as to integrate the plug frame 21 and the stop ring 30 into a body. The ferrule spring 24 is disposed around the splice reinforcing portion 50, the front end of the spring 24 is brought into contact with the spring seat 20 at the rear end of the pin clamp 19, and the rear end of the spring 24 is brought into contact with the spring seat 31 at the front end of the stop ring 30.

When the joint end face 14 of the ferrule 12 is jointed to a ferrule of another optical fiber connector, the ferrule 12 is guided in the opening 22 and pushed backward to contract the ferrule spring 24, an appropriate force acts between the joint end face 14 of the ferrule 12 and a joint end face of a ferrule of another optical fiber connector, thereby bringing the joint end faces into close contact with each other. When the joint between the ferrule 12 and the ferrule of another optical fiber connector is released, the ferrule spring 24 is stretched and the ferrule 12 moves in the opening 22 and is restored to the original position.

An engaging portion 23 used for the MPO type connector plug to engage with an engaging claw (not shown) of an MPO type connector adaptor or a receptacle is disposed on both sides (both side in the vertical direction in FIG. 1A) in the width direction of the plug frame 21. A coupling 25 is disposed on the outer circumference of the plug frame 21, and a pair of coupling springs 26 and 26 is received between the outer circumferential surface of the plug frame 21 and the inner circumferential surface of the coupling 25. Accordingly, the coupling 25 can move forward and backward relative to the plug frame 21 with the stretching and contracting of the coupling springs 26 and 26. The engaging portion 23 or the coupling 25 has the same constitution as defined in the JIS or the like as the MPO type connector plug.

When the invention is applied to different types of optical fiber connectors, the constituents required for the joint (connector joint) of the optical fiber connectors are installed in the ferrule or the housing.

In the optical fiber connector 10 shown in FIG. 1, a cap 11 is provided to protect the front end portion of the ferrule 12 of the optical fiber connector plug or the like. The cap 11 is detached in use (at the time of jointing to another optical fiber connector). A key groove 11a locked to a key 21a formed on one of the side surfaces of the plug frame 21 is formed in the inner surface of the cap 11. The key 21a of the plug frame 21 is conventionally installed to prevent the vertically-reverse use (of the top and bottom in FIG. 1B) of an optical fiber connector plug, and the key groove 11a of the cap 11 is installed on both sides in the vertical direction. Accordingly, it is possible to attach the cap 11 to the optical fiber connector 10 without distinguishing the upside and downside of the cap 11.

A through-hole 32 passing in the front-rear direction (the lateral direction in FIG. 1) along the length direction of the optical fiber is formed in the stop ring 30. The cross-sectional shape (the sectional shape in the plane perpendicular to the length direction of the optical fiber) of the through-hole 32 has at least a size which can receive the shape of the cross-sectional shape of the splice reinforcing portion 50. Accordingly, when the stop ring 30 is pushed in toward the plug frame 21 from the rear side of the splice reinforcing portion 50 in a state where the ferrule 12 is inserted into the opening 22 of the plug frame 21, the stop ring 30 is prevented from interfering with the splice reinforcing portion 50 (hindering the push thereof). When the stop ring 30 is pushed in toward the plug frame 21 from the rear side of the splice reinforcing portion 50, the engaging claw 33 is drawn into the splice reinforcing portion 50 just before the engaging claw 33 reaches the engaging window 27. Accordingly, on the back surface side of the engaging claw 33, a groove 32a is formed in the inner surface of the through-hole 32, thereby avoiding the interference of the splice reinforcing portion 50 with the back surface of the engaging claw 33.

An external screw 34 is formed on the outer circumferential surface of the rear end portion of the stop ring 30. An internal screw 36 formed on the inner circumferential surface of the screw ring 35 can be fastened to the external screw 34. The front end portion of the tensile fiber 49 of the external optical fiber 45 can be pinched and fixed between the external screw 34 and the internal screw 36. The screw ring 35 includes an opening 37 at the rear end thereof, and a part of the tensile fiber 49 of the external optical fiber 45 and the optical fiber core 47 is inserted into the opening 37. The cross-sectional shape (the sectional shape in the plane perpendicular to the length direction of the optical fiber) of the opening 37 preferably has a certain opening size so as to avoid the contact of the tensile fiber 49 with the splice reinforcing portion 50.

A boot 65 for an external optical fiber for protecting the external optical fiber 45 is attached to the outer circumferential surface of the screw ring 35. The boot 65 is generally formed of a flexible material such as rubber or elastomer. In this embodiment, a protective tube 66 is attached around the sheath 48 of the external optical fiber 45 and an annular locking portion 67 having a large diameter at the front end portion of the tube 66 is inserted into the boot 65.

The sequence of assembling the housing or the like is not particularly limited, but the following sequence can be employed as an example.

As an advance preparation before the fusion splice, the ferrule spring 24, the stop ring 30, the screw ring 35, the external optical fiber boot 65, and the protective tube 66 are made to pass around the external optical fiber 45. These components are preferably arranged on the rear side (the right side in FIG. 1) so as not to interfere with the fusion splice.

As described above, the bare optical fibers 43 and 46 are fusion-spliced, the splice reinforcing portion 50 is assembled thereto (see FIGS. 8 to 13), the plug frame 21 is attached thereto from the front side (the left side in FIG. 1) of the ferrule 12 to dispose the ferrule 12 in the opening 22 of the plug frame 21, the stop ring 30 is pushed into the plug frame 21 to cause the engaging claw 33 to engage with the engaging window 27, and the ferrule spring 24 is received along with the ferrule 12 and the splice reinforcing portion 50. The cap 11 and the coupling 25 may be attached to the plug frame 21 in advance or may be attached thereto after the cap 11 and the coupling 25 are attached to the stop ring 30.

The front end portion of the tensile fiber 49 is placed on the external screw 34 of the stop ring 30 and the internal screw 36 of the screw ring 35 is fastened to the external screw 34 to fix the front end portion of the tensile fiber 49. When the front end portion of the tensile fiber 49 extends over the outer circumference of the plug frame 21, the tensile fiber is cut out if necessary. The boot 65 is attached to the stop ring 30. The optical fiber connector 10 shown in FIG. 1 can be assembled through this sequence.

When the external optical fiber does not include a tensile fiber, the internal screw 36 of the screw ring 35 is fastened to the external screw 34 of the stop ring 30 to integrate the housing into a body, without pinching the tensile fiber.

(Method of Reinforcing Fusion-Spliced Portion of Optical Fiber)

Figure 14:
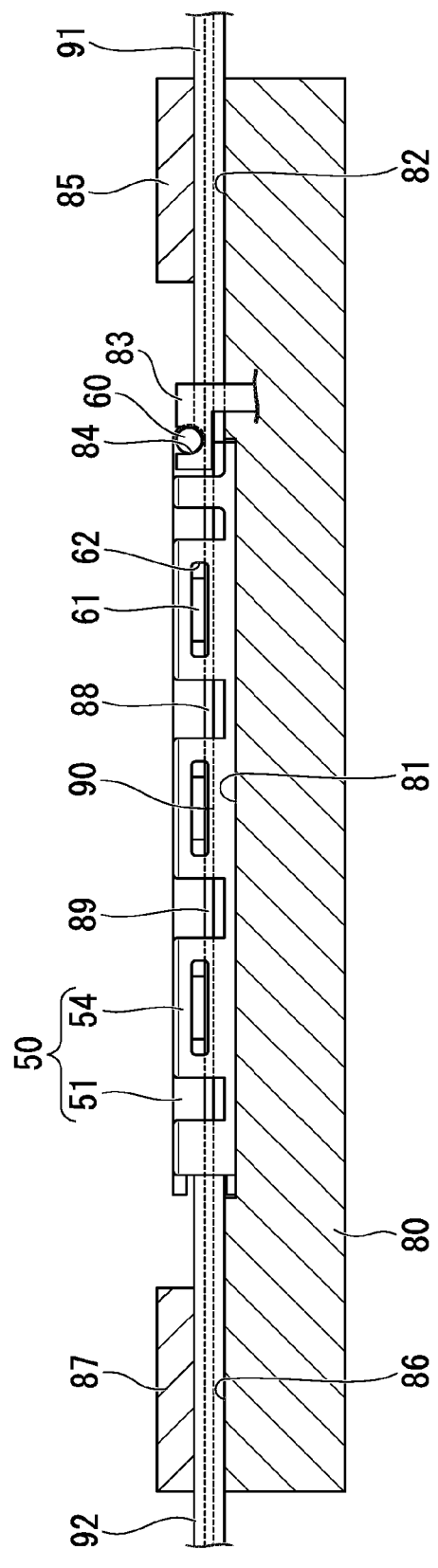
FIG. 14 is a schematic diagram illustrating an example of a state where the fusion-sliced portion is held between the first reinforcing member and the second reinforcing member using the assembling tool having a pressing cover on both sides of the reinforcing members.
Figure 15:
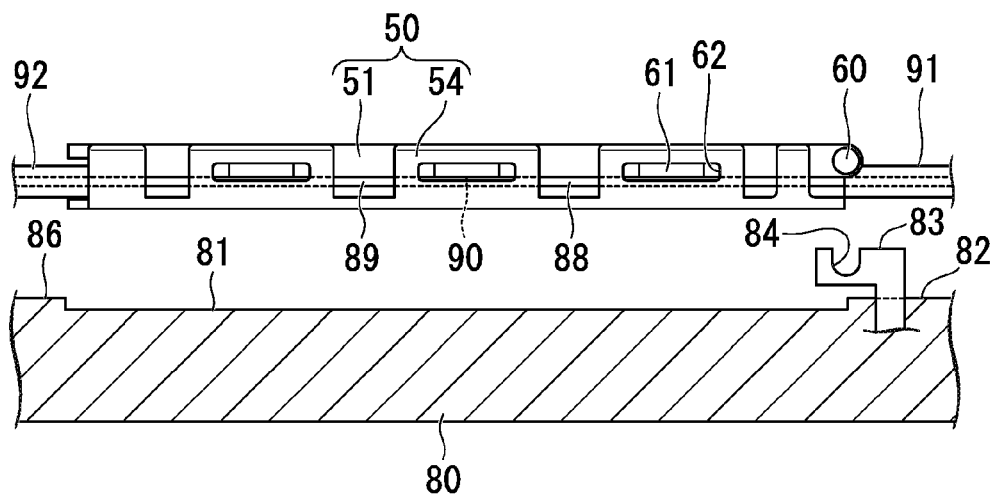
FIG. 15 is a schematic diagram illustrating an example of a state where the slice reinforcing portion assembled using the assembling tool having a pressing cover on both sides of the reinforcing members is detached from the assembling tool.

The splice reinforcing portion 50 in this embodiment is not limited to the reinforcement of the fusion-spliced portion 44 in the optical fiber connector, but can be used for a reinforcement method of pinching and reinforcing a fusion-spliced portion 90, in which end portions 88 and 89 of a first optical fiber 91 and a second optical fiber 92 are fusion-spliced to each other, between a pair of reinforcing members 51 and 54 as shown in FIGS. 14 and 15.

The assembling tool 80 shown in FIG. 14 includes a reinforcing member holding portion 81 holding the second reinforcing member 54 at a predetermined position, a first core holding portion 82 holding a part of the optical fiber core of the first optical fiber 91, an arm portion 83 having a bearing portion 84 rotatably holding the shaft portion 60 of the first reinforcing member 51, a first pressing cover 85 pressing the part of the optical fiber core of the first optical fiber 91 against the first core holding portion 82 from upside of the first core holding portion 82, a second core holding portion 86 holding a part of the optical fiber core of the second optical fiber 92, and a second pressing cover 87 pressing the part of the optical fiber core of the second optical fiber 92 against the second core holding portion 86 from upside of the second core holding portion 86.

A pair of reinforcing members 51 and 54 include adhesion layers 53 and 56 which can be depressed at the position where the first optical fiber 91 and the second optical fiber 92 come in contact with each other on the inner surface which comes in contact with the ends portions 88 and 89 of the first optical fiber 91 and the second optical fiber 92, as shown in FIGS. 4 to 7. The first reinforcing member 51 includes a shaft portion 60 at one end in the length direction (in the lateral direction in FIG. 14) of the first optical fiber 91 and the second optical fiber 92.

The sequence of assembling the splice reinforcing portion 50 by pinching the fusion-spliced portion 90 between the pair of reinforcing members 51 and 54 is the same as the sequence shown in FIGS. 8 to 12. The result is shown in FIG. 14. The state where the assembled splice reinforcing portion 50 is detached from the assembling tool 80 is shown in FIG. 15.

In this embodiment, the optical fiber cores 91 and 92 are pinched between the core holding portions 82 and 86 and the pressing covers 85 and 87, but a part of an optical fiber cord or an optical fiber cable may be pinched therebetween.

In this way, by using the first reinforcing member 51 having the shaft portion 60 of which the central axis line is perpendicular to the length direction of the optical fibers 91 and 92 and the assembling tool 80 having the bearing portion 84, the first reinforcing member 51 falls out in the direction parallel to the length direction of the optical fibers 91 and 92 with respect to the second reinforcing member 54 and it is thus possible to suppress a rotational (twisting) force about the axis of the optical fibers when the first reinforcing member 51 comes in contact with the end portions 88 and 89 of the optical fibers 91 and 92.

Since the positional relationship between the reinforcing member holding portion 81 and the bearing portion 84 are appropriately determined in advance, the bearing portion 74 supporting the shaft portion 60 can be used as a reference for positioning the first reinforcing member 51 with respect to the second reinforcing member 54. That is, since the second reinforcing member 54 is not erroneously moved when attaching the shaft portion 60 to the bearing portion 74, the work is easily carried out even with the small sizes of the reinforcing members 51 and 54.

While the invention has been described on the basis of an exemplary embodiment, the invention is not limited to the above-mentioned embodiment, but may be modified in various forms without departing from the concept of the invention.

Modification of Optical Fiber Connector

Figure 17A:
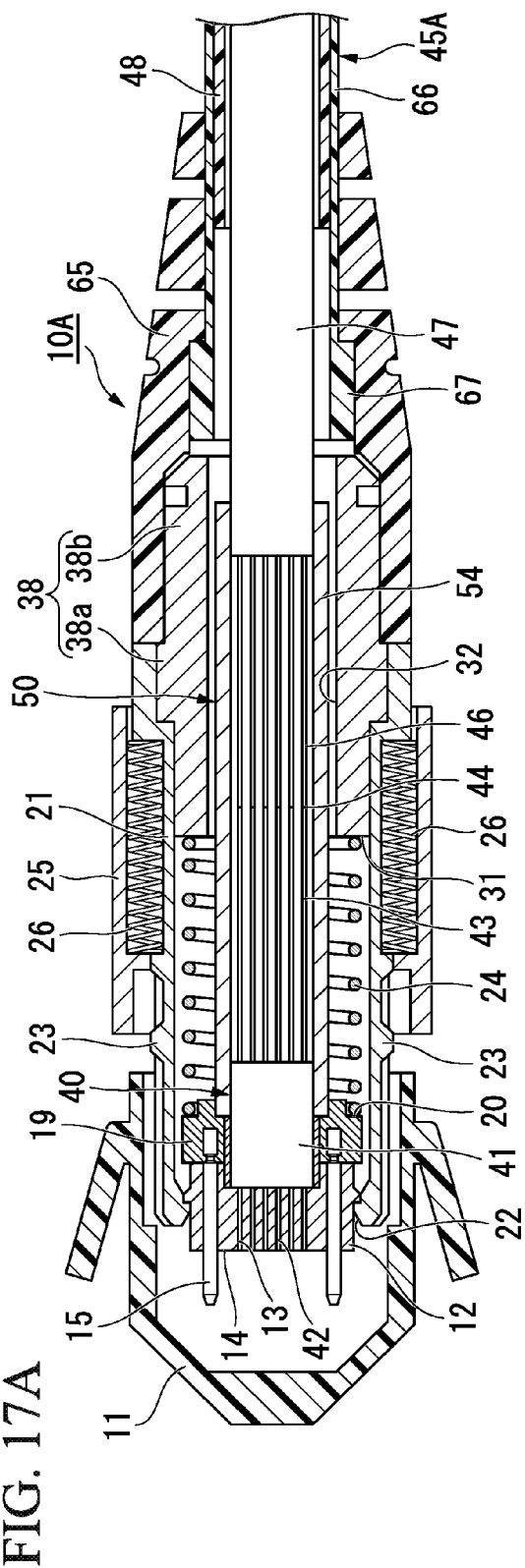
FIG. 17A is a sectional view illustrating a modification of the optical fiber connector according to the invention and is a sectional view taken along the plane in which a multi-core optical fiber is arranged.
Figure 17B:
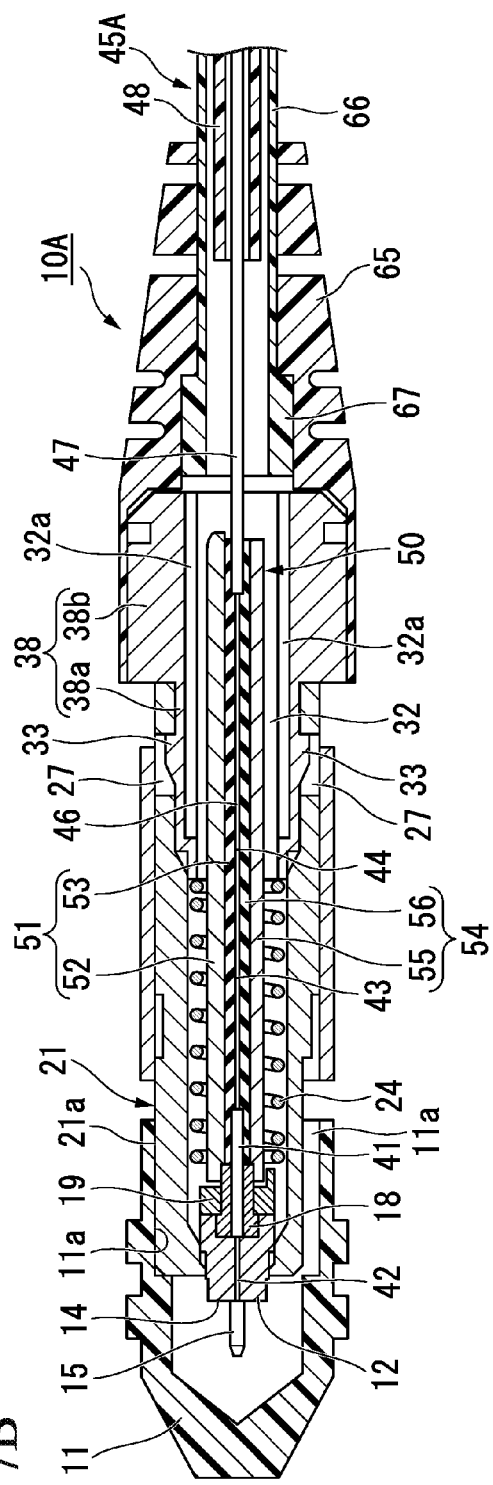
FIG. 17B is a sectional view illustrating a modification of the optical fiber connector shown in FIG. 17A and is a sectional view taken along a plane perpendicular to the plane shown in FIG. 17A and parallel to the length direction of the optical fiber.

As described above, the external optical fiber to which the optical fiber connector is applied may not have a tensile fiber. An example of an optical fiber connector 10A which can be used in this case and which has a more simplified constitution is shown in FIGS. 17A and 17B. Hereinafter, FIGS. 17A and 17B are comprehensively referred to as "FIG. 17".

The optical fiber connector 10A can be a tip of an external optical fiber 45A not having a tensile fiber. The stop ring 38 includes a first half portion 38a inserted into the plug frame 21 and a second half portion 38b to which the boot 65 is attached, and an engaging claw 33 which can engage with the engaging window 27 of the plug frame 21 is formed on the outer circumferential surface of the first half portion 38a of the stop ring 38. That is, the stop ring 38 having this constitution has a structure in which the stop ring 30 and the screw ring 35 shown in FIG. 1 are integrated into a body.

The sequence of assembling the housing or the like is not particularly limited, but the following sequence may be employed as an example.

As an advance preparation before the fusion splice, the ferrule spring 24, the stop ring 38, the external optical fiber boot 65, and the protective tube 66 are made to pass around the external optical fiber 45. These components are preferably arranged on the rear side (the right side in FIG. 17) so as not to interfere with the fusion splice. The cap 11 and the coupling 25 may be attached to the plug frame 21 in advance or may be attached thereto after the cap 11 and the coupling 25 are attached to the stop ring 38.

As described above, the bare optical fibers 43 and 46 are fusion-spliced, the splice reinforcing portion 50 is assembled thereto (see FIGS. 8 to 13), the plug frame 21 is attached thereto from the front side (the left side in FIG. 17) of the ferrule 12 to dispose the ferrule 12 in the opening 22 of the plug frame 21, the stop ring 38 is pushed into the plug frame 21 to cause the engaging claw 33 to engage with the engaging window 27, and the ferrule spring 24 is received along with the ferrule 12 and the splice reinforcing portion 50. The boot 65 is attached to the second half portion 38b of the stop ring 38. The optical fiber connector 10A shown in FIG. 17 can be assembled through this sequence.

In this way, in the optical fiber connector 10A according to this modification, since the external optical fiber 45A does not include a tensile fiber, the assembling sequence is more simplified than the optical fiber connector 10 shown in FIG. 1.

Modified Example of Ferrule

Next, a ferrule 412 of a modified example which is applicable to the optical connector 10 (optical connector 10A) according to the first embodiment will be described. The ferrule 412 of the modified example is different from the above-described ferrule 12 in that the ferrule 412 includes a lens 406. Identical reference numerals are used for the elements which are identical to those of the first embodiment, and the explanations thereof are omitted or simplified here.

Figure 72:
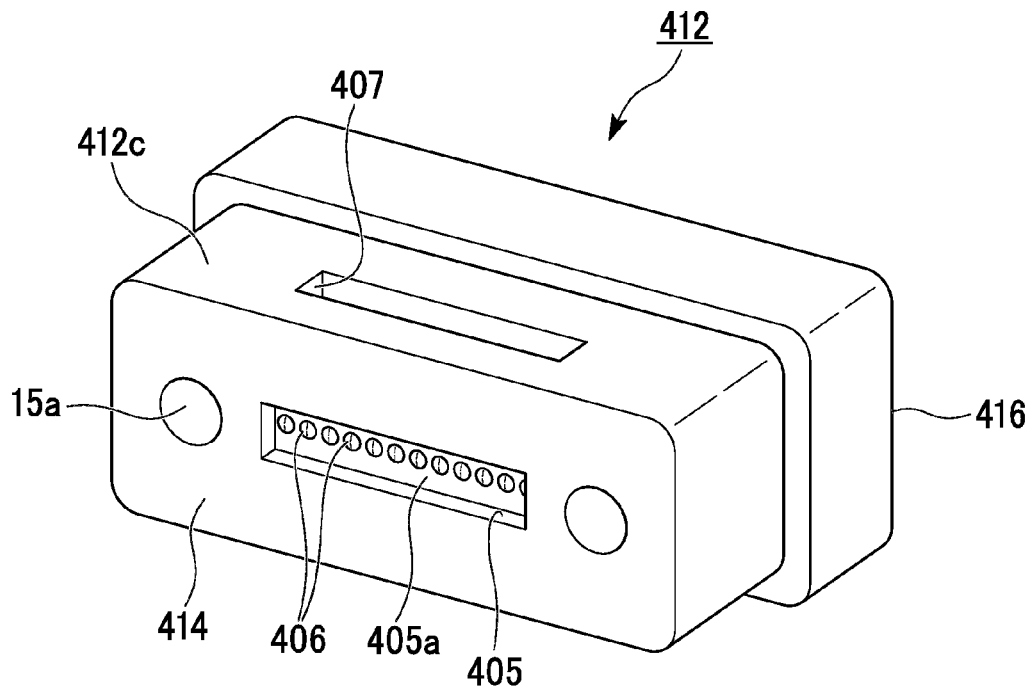
FIG. 72 is a perspective view showing a ferrule which is applicable to the optical connector according to the first embodiment.
Figure 73:
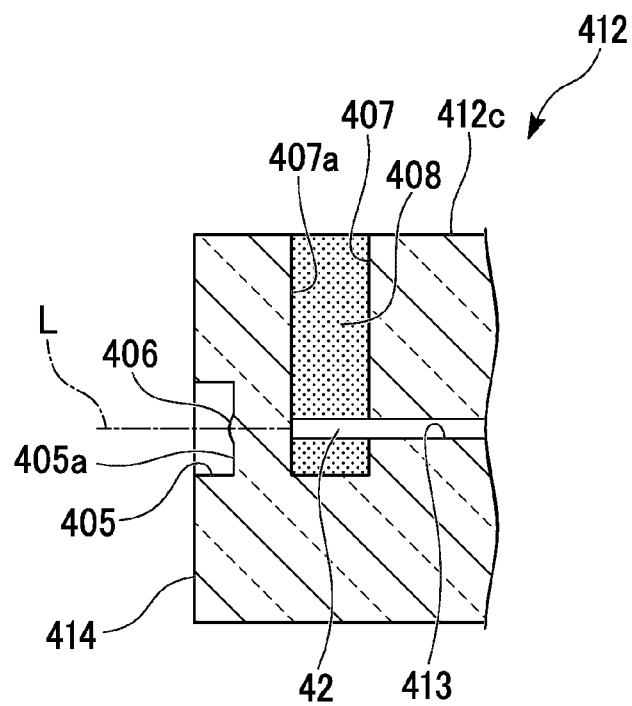
FIG. 73 is a cross-sectional view partially showing a ferrule into which the inserted optical fiber is inserted.

FIG. 72 is a perspective view showing the ferrule 412. FIG. 73 is a cross-sectional view partially showing the ferrule 412 into which the inserted optical fiber 40 is inserted.

The ferrule 412 is formed of a transparent member. The ferrule 412 is a single member made of a resin material. As a resin material used to form the ferrule 412, polyetherimide, polycarbonate, cyclic olefin copolymer, cyclic olefin polymer, or other transparent polymers may be adopted. Part of the ferrule 412 which serves as an optical path from the inserted optical fiber 40 to the lens 406 may be only formed of a transparent member.

As shown in FIG. 72, the ferrule 412 includes a front-end face 414 (connection edge face), a rear-end face 416, and a side surface 412c. The front-end face 414 is to be butt-jointed to a ferrule of the other optical connector (not shown in the figure). The rear-end face 416 is located on the opposite side of the front-end face 414. The front-end face 414 is located close to one end portion 42 of the inserted optical fiber 40. The rear-end face 416 is located close to the other end portion 43 of the inserted optical fiber 40. The side surface 412c is located between the front-end face 414 and the rear-end face 416 of the ferrule 412.

A boot housing hole (not shown in the figure) is provided on the rear-end face 416 of the ferrule 412. The boot housing hole is configured to accommodate the ferrule boot 18 (refer to FIG. 1B) therein. An optical fiber insertion hole 413 (micro hole) is opened on the rear-end face 416. As shown in FIG. 73, one end portion 42 of the inserted optical fiber 40 is inserted into the optical fiber insertion hole 413. The inserted optical fiber 40 is fixed to the optical fiber insertion hole 413 by, for example, an adhesive.

A side surface recess 407 is provided on the side surface 412c of the ferrule 412. The side surface recess 407 is opened on the side surface 412c. The side surface recess 407 is communicated with the optical fiber insertion hole 413. The side surface recess 407 is formed in a rectangular shape in a plan view. An optical fiber stop plane 407a that faces rearward is formed in the side surface recess 407. The optical fiber stop plane 407a is positioned between the inserted optical fiber 40 and the lens 406. The front end of one end portion 42 of the inserted optical fiber 40 is brought into contact with the optical fiber stop plane 407a.

As shown in FIG. 73, the side surface recess 407 is filled with a refractive index matching material 408. Consequently, it is possible to control a refractive index in the optical path of light emitted from the front end of the inserted optical fiber 40. By use of, for example, a refractive index matching epoxy resin as the refractive index matching material 408, it is possible to fix the optical fiber inside the side surface recess 407. As a result, it is possible to prevent the front-end position of the inserted optical fiber 40 from being displaced during use.

A recess 405 is provided on the front-end face 414 of the ferrule 412. The recess 405 is depressed with respect to the front-end face 414. A plurality of lenses 406 are formed on the surface 405a that faces forward of the recess 405. The lenses 406 are accommodated in the recess 405 and do not protrude forward from the front-end face 414. The lenses 406 are located on the extension lines L of the inserted optical fibers 40. The lenses 406 are arranged to be optically aligned with corresponding optical fiber insertion holes (optical alignment).

The lenses 406 are molded integrally in one body which serves as part of the ferrule 412. The lenses 406 collimate light emitted from the front ends of the inserted optical fibers 40. The lenses 406 condenses, on the front end of the inserted optical fiber 40, light emitted from the other ferrule that is butt-jointed to the ferrule 412. It is preferable that the focal point of the lens 406 be located on the optical fiber stop plane 407a.

Even in the case of using the ferrule 412 of the modified example in the optical connector 10 (the optical connector 10A) according to the first embodiment, the same effect can be obtained.

Second Embodiment

An optical fiber connector 110 according to a second embodiment of the invention will be described below.

Figure 24A:
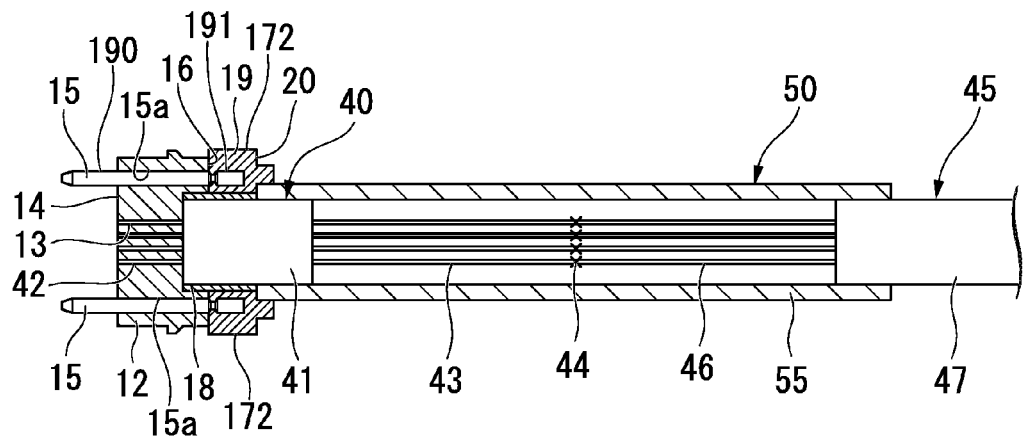
FIG. 24A is a sectional view illustrating a ferrule and a slice reinforcing portion of the optical fiber connector shown in FIGS. 23A and 23B and is a sectional view taken along the plane in which the multi-core optical fiber is arranged.
Figure 24B:
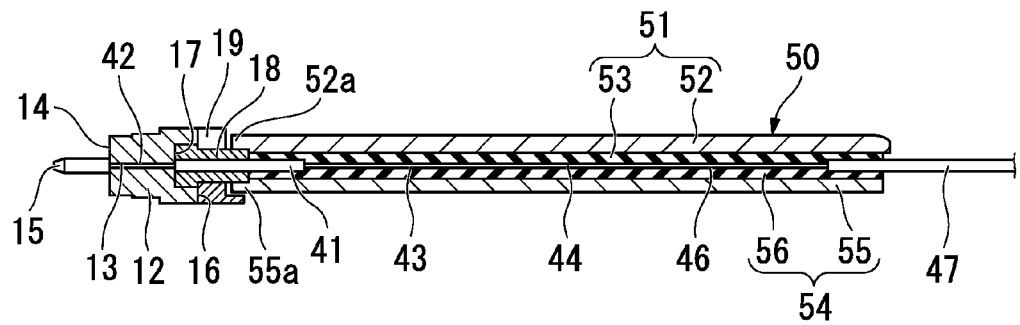
FIG. 24B is a sectional view illustrating the ferrule and the slice reinforcing portion of the optical fiber connector shown in FIGS. 23A and 23B and is a sectional view taken along a plane perpendicular to the plane shown in FIG. 24A and parallel to the length direction of the optical fiber.

FIGS. 23A and 23B show an optical fiber connector 110 according to the second embodiment of the invention and FIGS. 24A and 24B show an important part of the optical fiber connector 110. The optical fiber connector 110 has a constitution in which the other end portion 43 of an inserted optical fiber 40 of which one end portion 42 is fixed to a ferrule 12 (optical fiber connector ferrule) is fusion-spliced to a front end portion 46 of an external optical fiber 45 and a splice reinforcing portion 50 in which the fusion-spliced portion 44 is pinched and reinforced between a pair of reinforcing members 51 and 54 is received in a housing or the like. FIGS. 23A and 23B may be comprehensively referred to as "FIG. 23". Similarly, FIGS. 24A and 24B may be comprehensively referred to as "FIG. 24".

In the following description, in order to distinguish both sides in the length direction (the lateral direction in FIG. 23) of an optical fiber, the side which a joint end face 14 of the ferrule 12 faces (the left side in FIG. 23) may be referred to as "forward" or "front" and the opposite side (the right side in FIG. 23) may be referred to as "backward", "rear", or "toward a base end". The front-rear direction is the length direction at one end portion 42 of the inserted optical fiber 40 and is also a joint direction when the optical fiber connector 110 is jointed to the opposite optical fiber connector.

An external optical fiber 45 is formed of an optical transmission medium such as an optical fiber cord or an optical fiber cable having an optical fiber. In this embodiment, the external optical fiber 45 is an optical fiber cord including a multi-core optical fiber core 47 including an optical fiber tape core in which a plurality optical fibers (optical fiber wires, which are not shown) are arranged in parallel in the lateral direction perpendicular to the length direction thereof, a tubular sheath 48 surrounding the multi-core optical fiber core 47, and a tensile fiber 49 received between the optical fiber core 47 and the sheath 48. In the front end portion 46 of the external optical fiber 45, the resin coating of the optical fiber core 47 and the resin coating of the optical fiber wires are removed and each of a plurality of bare optical fibers (parts of core and clad) are separated.

Figure 25:
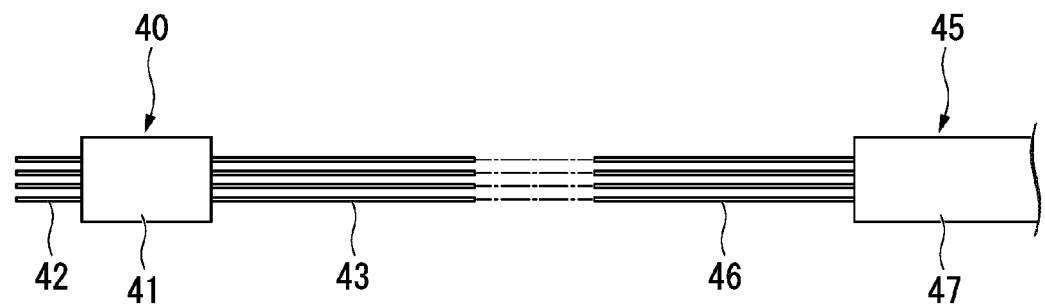
FIG. 25 is a plan view illustrating an inserted optical fiber and an external optical fiber of the optical fiber connector.

Examples of the number of bare optical fibers 46 (the number of cores) included in the optical fiber core 47 include 2, 4, 8, and 12. In FIGS. 23A, 24A, and 25, the 12-core constitution is simplified and only 4 cores are shown. The optical fiber cord in this embodiment has a constitution in which a single optical fiber tape core is received in a sheath, but is not particularly to this constitution. For example, a constitution in which a plurality of single-core optical fiber cores are received in a single sheath, a constitution in which a plurality of optical fiber tape cores are received in a single sheath, and a constitution in which one or more optical fiber tape cores and signal-core optical fiber cores are received in a single sheath can be employed as the constitution of the external optical fiber.

The sheath 48 is formed of a resin such as polyethylene and preferably has flexibility. A plurality of tensile fibers 49 extend along the length direction of the optical fiber and functions as a tensile member accepting a tensile force (tension) to the optical transmission medium. The fiber material used for the tensile fiber 49 is not particularly limited as long as it can provide a necessary tensile strength, and examples thereof include aramid fiber, glass fiber, and carbon fiber.

The tensile member or the sheath is not essential to the invention. For example, an optical fiber core or an optical fiber tape core not having a sheath may be used as the external optical fiber. In some structures of an optical fiber cable or the like, metal wires such as steel wires or various wires such as fiber-reinforced plastics (FRP) may be used as the tensile member. Examples of the optical fiber cable include an optical drop cable and an optical indoor cable.

The inserted optical fiber 40 is an optical fiber of which one end portion 42 is fixed to the ferrule 12 and of which the other end portion 43 protrudes (extends) backward from the ferrule 12. In this embodiment, the inserted optical fiber 40 includes a multi-core optical fiber core 41 which is an optical fiber tape core, and the resin coating of the optical fiber core 41 and the resin coating of the optical fiber wires are removed in one end portion 42 and the other end portion 43 of the optical fiber core 41 so as to separate into a plurality of bare optical fibers (parts of cores and clad).

The front end of the inserted optical fiber 40 is exposed from the joint end face 14 and is butt-jointed to an optical fiber of the opposite optical fiber connector.

The optical fiber used as the inserted optical fiber 40 is not limited to the multi-core optical fiber, but a structure in which one or more short single-core optical fibers are inserted into a single ferrule, a structure in which one or more optical fiber tape cores and single-core optical fiber cores are received in a single ferrule, or the like may be employed.

As shown in FIG. 25, the other end portion 43 of the inserted optical fiber 40 and the front end portion 46 of the external optical fiber 45 correspond to each other in a one-to-one manner and are fusion-spliced to each other. As shown in FIG. 24, the fusion-spliced portion 44 of the other end portion 43 of the inserted optical fiber 40 and the front end portion 46 of the external optical fiber 45 is pinched and reinforced between a pair of reinforcing members 51 and 54 in the splice reinforcing portion 50.

The reinforcing members 51 and 54 include reinforcing member bodies 52 and 55 formed of a hard material such as resin or metal and adhesion layers 53 and 56 disposed on the inner surfaces which come in contact with the other end portion 43 of the inserted optical fiber 40 and the front end portion 46 of the external optical fiber 45.

The ferrule 12 around the inserted optical fiber 40 is not shown in FIG. 25, but one end portion 42 of the inserted optical fiber 40 is preferably fixed into an optical fiber insertion hole 13 of the ferrule 12 before the fusion-splice to the external optical fiber 45.

Figure 18:
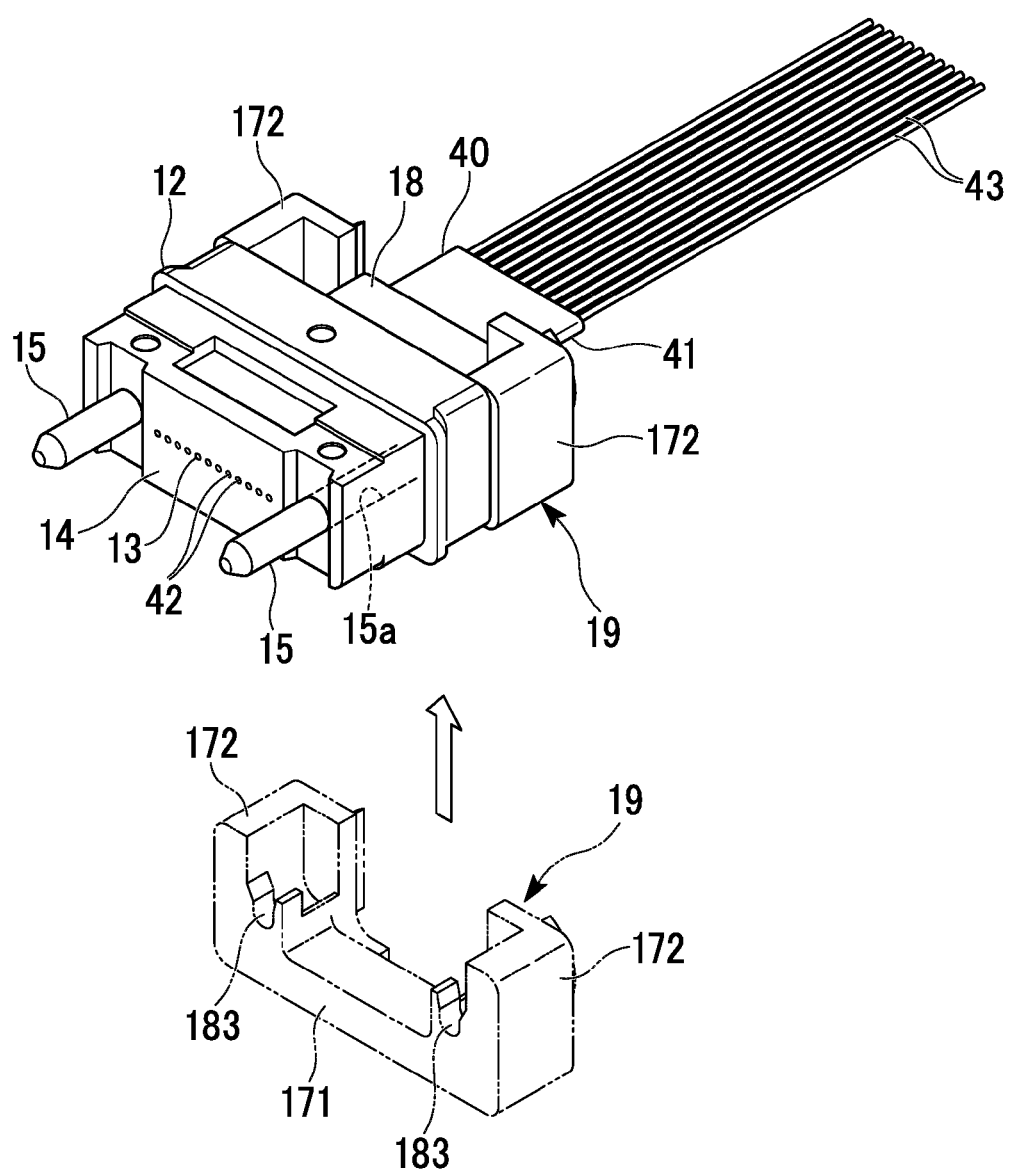
FIG. 18 is a perspective view illustrating a ferrule and a pin clamp of an optical fiber connector according to a second embodiment of the invention.

As shown in FIGS. 18, 23, and 24, the ferrule 12 includes a front end face (joint end face) 14 butt-jointed to a ferrule (not shown) of another optical fiber connector (the opposite optical fiber connector), a rear end face 16 which is the opposite end face of the joint end face 14, optical fiber insertion holes (micro holes) 13 opened in the joint end face 14, and a boot-receiving hole 17 opened in the rear end face 16. The ferrule 12 can be formed, for example, as an integrated molded product formed of plastic.

The joint end face 14 of the ferrule 12 may be a vertical face perpendicular to the central axis (substantially matched with the optical axis of the optical fiber 42) of the optical fiber insertion holes 13, or may be an inclined face inclined in a predetermined direction corresponding to a ferrule of another optical fiber connector.

The optical fiber insertion holes 13 are formed in the same number as the number of optical fibers in one end portion 42 of the inserted optical fiber 40. For example, a method of injecting an adhesive into the optical fiber insertion holes 13 to adhere to the bare optical fibers can be simply used as the method of fixing the bare optical fibers which are one end portion 42 of the inserted optical fiber 40 to the ferrule 12. The optical fiber insertion holes 13 are connected to the boot-receiving hole 17. A ferrule boot 18 is attached around the optical fiber core 41 and is received in the boot-receiving hole 17. The ferrule boot 18 is preferably formed of a flexible material such as rubber or elastomer, but the ferrule boot 18 may be formed of a material such as a resin or a metal having low flexibility.

Examples of the number of optical fiber insertion holes 13 (the number of cores) formed in the ferrule 12 include 2, 4, 8, and 12 and depend on the number of cores of the optical fiber core 47. In the optical fiber connector 110 according to this embodiment, a single-core ferrule may be used as the ferrule 12.

The optical fiber insertion holes 13 on the joint end face 14 of the multi-core ferrule 12 are arranged in a line to match with the arrangement of optical fibers pinched between the reinforcing members 51 and 54. The invention is not limited to the constitution in which the arrangement of optical fibers in the ferrule 12 is set to be the same as the arrangement of optical fibers in the splice reinforcing portion 50, but the arrangement of optical fibers separated for each core between the ferrule 12 and the splice reinforcing portion 50 may be changed.

As shown in FIG. 24B, a ferrule boot 18 covering the portion of the inserted optical fiber 40 protruding from the ferrule 12 is attached to the ferrule 12. The pair of reinforcing members 51 and 54 (specifically, the bodies 52 and 55 thereof) includes protrusions serving as boot clamping portions 52a and 55a at the ends close to the ferrule 12 and the ferrule boot 18 is clamped between the boot clamping portions 52a and 55a.

Accordingly, both ends of the ferrule boot 18 are tightly held between the ferrule 12 and the pair of reinforcing members 51 and 54, thereby more satisfactorily preventing the warp or damage of the inserted optical fiber 40.

A guide pin 15 of which the front end portion protrudes forward from the joint end face 14 is provided to the ferrule 12 for the purpose of the positioning with respect to the ferrule of the opposite optical fiber connector.

The guide pin 15 is inserted into a guide pin insertion hole 15a passing through the joint end face 14 and the rear end face 16 and is inserted into a guide pin insertion hole (not shown) formed in the ferrule of another optical fiber connector to suppress the misalignment in the direction along the joint end face 14 (such as the vertical direction in FIG. 24A, the vertical direction in FIG. 24B, or an inclined direction obtained by combining the directions) and accurately align the optical fiber connector 110 and the opposite optical fiber connector.

The positioning type relative to the opposite optical fiber connector using the guide pin 15 is called a guide pin positioning type.

As shown in FIG. 24A, the guide pin insertion holes 15a and 15a enable the guide pin 15 to detachably be inserted thereto (inserted and pulled out) and is formed in the front-rear direction.

In this embodiment, two guide pin insertion holes 15a are formed and are formed on both sides, respectively, of the optical fiber insertion hole 13 through which the inserted optical fiber 40 is inserted.

The guide pins 15 are inserted into the pair of guide pin insertion holes 15a.

Figure 22:
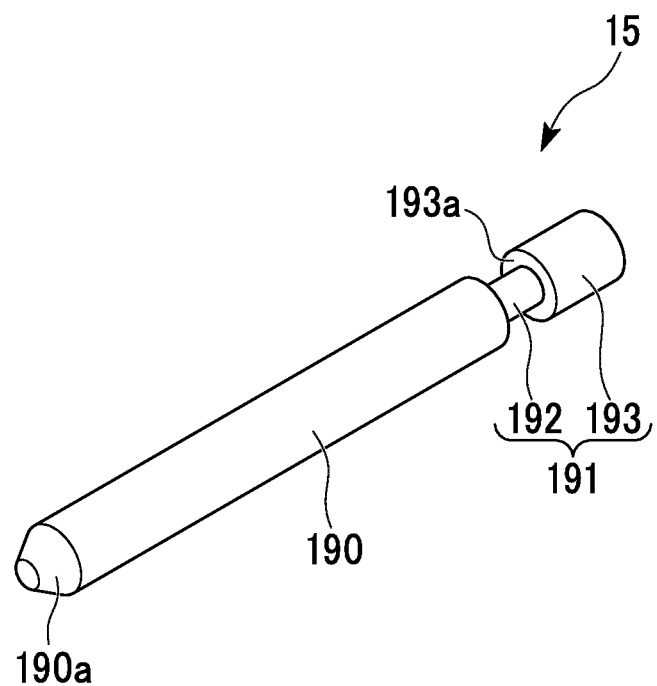
FIG. 22 is a perspective view illustrating the guide pin shown in FIG. 18.

As shown in FIG. 22, the guide pin 15 has a substantially tubular cylinder shape and includes a body portion 190 having a tapered front end portion 190a and a base end portion 191 formed at the rear end thereof.

The base end portion 191 includes a neck portion 192 extending backward from the rear end of the body portion 190 and a head portion 193 formed at the rear end of the neck portion 192. The front surface of the head portion 193 serves as a locking end portion 193a coming in contact with a front plate portion 177 of a pin clamp 19 to be described later.

The body portion 190, the neck portion 192, and the head portion 193 all have a substantially cylindrical shape and the central axis directions thereof are matched with each other.

The neck portion 192 has a diameter smaller than that of the head portion 193. Hereinafter, the neck portion 192 may be referred to as a small-diameter portion and the head portion 193 may be referred to as a large-diameter portion. The body portion 190 has a diameter larger than that of the neck portion 192.

As shown in FIGS. 23 and 24, the body portion 190 is inserted through the guide pin insertion hole 15a and the front end portion thereof protrudes forward from the joint end face 14.

As shown in FIG. 24A, the base end portion of the guide pin 15 protrudes from the rear end face 16 of the ferrule 12 and the base portion 191 which is the protruding portion is held in the pin clamp 19.

The optical fiber connector 110 shown in FIG. 23 is of a type (male type) having a guide pin 15, but may be of a type (female type) not having a guide pin 15 as described later.

As shown in FIGS. 18, 23, and 24, the pin clamp 19 is disposed on the side of the rear end face 16 of the ferrule 12. The pin clamp 19 is disposed on the front side of the fusion-spliced portion 44.

Figure 19:
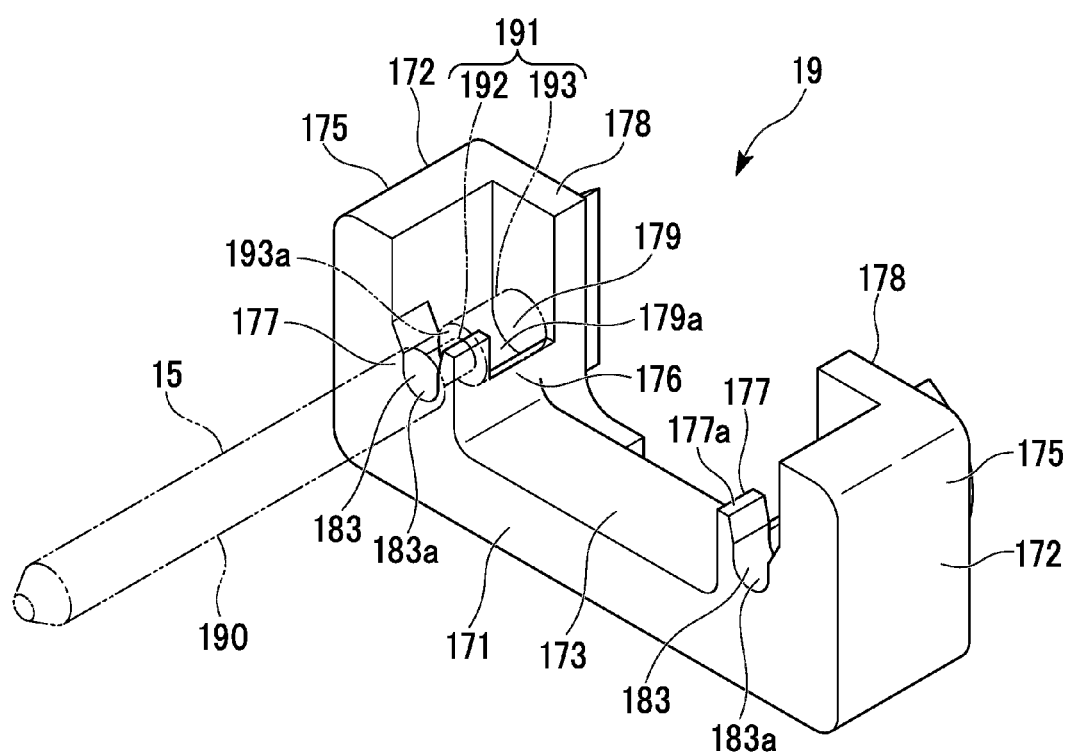
FIG. 19 is a perspective view illustrating the pin clamp shown in FIG. 18.
Figure 20:
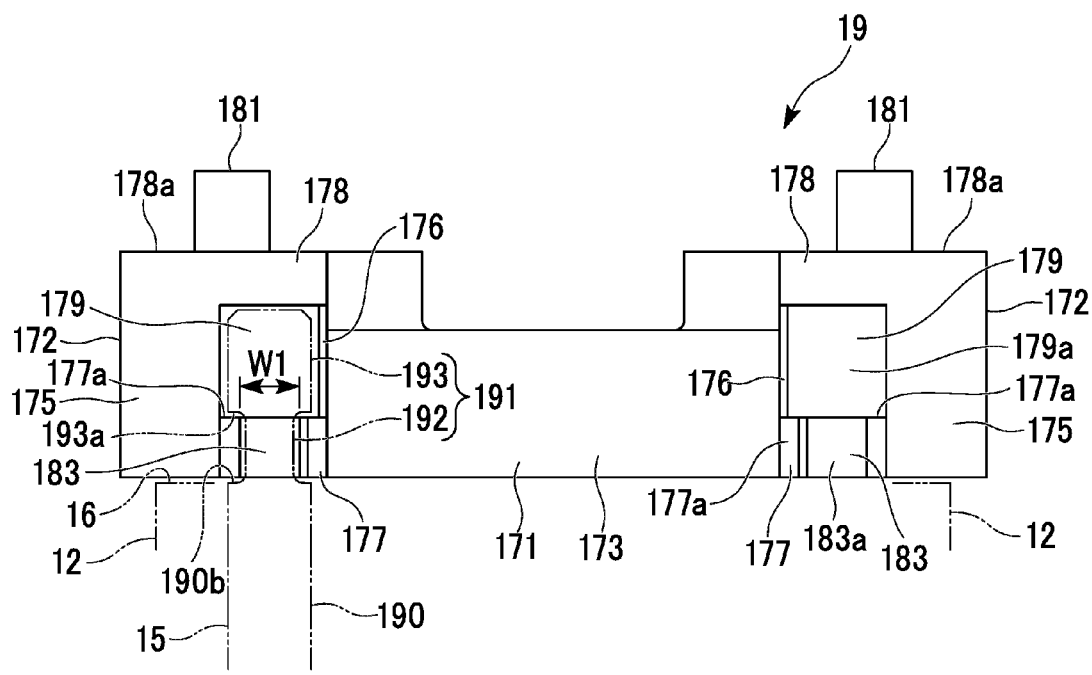
FIG. 20 is a plan view illustrating the pin clamp shown in FIG. 18.
Figure 21:
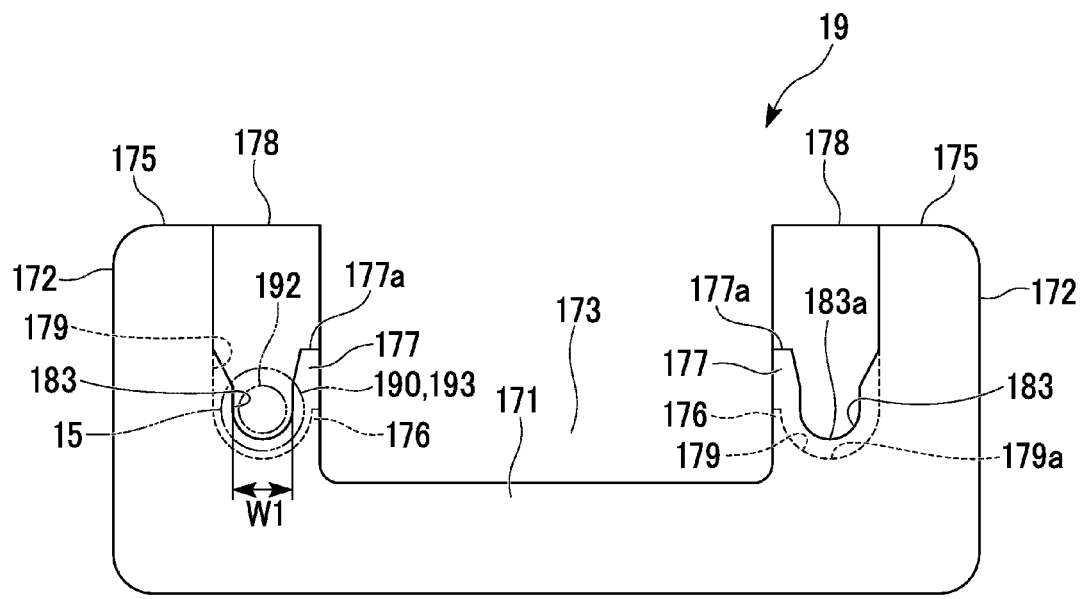
FIG. 21 is a front view illustrating the pin clamp shown in FIG. 18.

As shown in FIGS. 19 to 21, the pin clamp 19 serves to support the guide pin 15 and is detachably attached to the base end portion 191 of the guide pin 15 protruding from the rear end face 16 of the ferrule 12.

The pin clamp 19 shown in the drawings is formed of a synthetic resin material and has a substantially U shape having a bottom portion 171 and side wall portions 172 and 172 formed on both sides of the bottom portion 171. The space surrounded with the bottom portion 171 and the side wall portions 172 and 172 serves as an insertion space 173 through which the inserted optical fiber 40 is inserted (see FIGS. 23 and 24).

The insertion space 173 can be formed to receive the ferrule boot 18. That is, by setting the distance between the side wall portions 172 and 172 to be substantially equal to or slightly smaller than the width of the ferrule boot 18, both edges of the ferrule boot 18 contact the inner surfaces of the side wall portions 172 and 172 to position the ferrule boot.

In the below description, the extending direction of the side wall portions 172, that is, the upward direction in FIG. 21, may be referred to as upward (or the height direction) and the opposite direction thereof may be referred to as downward. The vertical direction in FIG. 21 is a direction substantially perpendicular to the formation direction of the guide pin insertion hole 15a through the guide pin 15 is inserted.

The side wall portion 172 includes an outer plate portion 175, an inner plate portion 176 formed with a gap inward from the outer plate portion 175, a front plate portion 177 formed at a front edge of the bottom portion 171, and a rear plate portion 178 formed at a rear edge of the bottom portion 171. The outer plate portion 175 is substantially vertically upright from the side edge of the bottom portion 171 with respect to the bottom portion 171.

The inner plate portion 176 is substantially vertically upright with respect to the bottom portion 171 and the space between the outer plate portion 175 and the inner plate portion serves as a reception portion 179 receiving the head portion 193 of the guide pin 15.

The inner plate portion 176 is formed to be lower than the outer plate portion 175. The bottom surface 179a of the reception portion 179 may be a curved surface along the outer circumference of the head portion 193.

As shown in FIGS. 19 to 21, the front plate portion 177 is substantially vertically upright from the front edge of the bottom portion 171 with respect to the bottom portion 171. Accordingly, the front plate portion 177 is substantially perpendicular to the front-rear direction.

A locking recessed portion 183 is formed downward from the upper edge 177a of the front plate portion 177. The locking recessed portion 183 shown in the drawings has a substantially U shape and the bottom portion 183a which is the deepest portion is located to be higher than the bottom surface 179a of the reception portion 179.

As shown in FIG. 21, since the locking recessed portion 183 is formed downward from the upper edge 177a, it can receive the neck portion 192 of the guide pin 15 moving downward.

Since the outer plate portion 175, the inner plate portion 176, and the rear plate portion 178 are formed to extend substantially upward, the reception portion 179 surrounded therewith can receive the head portion 193 moving downward.

Accordingly, the neck portion 192 and the head portion 193 of the guide pin 15 can go into and from the locking recessed portion 183 and the reception portion 179 in the vertical direction in FIG. 21.

In the example shown in the drawings, the locking recessed portion 183 is formed downward (that is, in the direction substantially perpendicular to the formation direction of the guide pin insertion hole 15a), but the formation direction of the locking recessed portion 183 is not limited to this direction and may be any direction as long as it is a direction crossing the formation direction of the guide pin insertion hole 15a. For example, the formation direction may be a direction inclined by an angle greater than 0° and less than 90° in the vertical direction in FIG. 21.

As shown in FIGS. 20 and 21, the width W1 of the locking recessed portion 183 is larger than the outer diameter of the neck portion 192 of the guide pin 15 and smaller than the outer diameter of the head portion 193, the locking recessed portion 183 regulates the forward movement of the head portion 193 and regulates the movement of the guide pin 15 in the direction.

That is, as shown in FIG. 20, when a force toward the front end (downward in FIG. 20) is applied to the guide pin 15, a locking end portion 193a which is the front face of the head portion 193 comes in contact with the rear face 177a of the front plate portion 177, thereby preventing the forward movement of the head portion 193. Accordingly, it is possible to prevent the falling of the guide pin 15.

The rear plate portion 178 is formed substantially vertically upright from the rear edge of the bottom portion 171 with respect to the bottom portion 171. The outer edge of the rear plate portion 178 reaches the rear edge of the outer plate portion 175. In the example shown in the drawing, the rear plate portion 178 has substantially the same height as the outer plate portion 175.

The rear plate portion 178 or the front plate portion 177 can be configured to regulate the backward movement of the guide pin 15. That is, the rear plate portion 178 or the front plate portion 177 can be configured to prevent the backward movement of the guide pin 15 by bringing the rear face 190b of the body portion 190 into contact with the front plate portion 177 or bringing the head portion 193 into contact with the rear plate portion 178, when a force to the rear side (upward in FIG. 20) is applied to the guide pin 15.

As shown in FIG. 20, a positioning protuberance portion 181 protruding backward is formed on the rear face 178a of the rear plate portion 178.

As shown in FIG. 23, the positioning protuberance portion 181 serves to prevent the misalignment of the ferrule spring 24 and is inserted into the front end portion of the ferrule spring 24.

The rear face 178a of the rear plate portion 178 serves as a spring seat 20 for accepting an impelling force (pressing force based on elasticity) from the ferrule spring 24. Accordingly, even when the guide pin 15 is not installed in the ferrule 12, the pin clamp 19 is attached to the ferrule 12. The pin clamp 19 can be inserted into and fixed to the ferrule 12 by, for example, irregularity or the like (not shown).

The optical fiber connector 110 described in this embodiment is a multi-core optical fiber connector and the example shown in the drawings is an MPO type optical fiber connector (F13 type multi-core optical fiber connector defined in the JIS C5982, MPO: Multi-fiber Push On). The optical fiber connector applicable to the invention is not limited to the single-core type or the multi-core type.

The housing 11 of the optical fiber connector 110 includes a sleeve-like (tubular) plug frame 21 and a sleeve-like (tubular) stop ring 30 attached to the rear end of the plug frame 21.

The ferrule 12 is inserted through the opening 22 at the front end of the plug frame 21.

An engaging claw 33 which can engage with an engaging window 27 formed in the side wall portion of the plug frame 21 is formed in the outer surface of the stop ring 30 so as to integrate the plug frame 21 and the stop ring 30 into a body.

The ferrule spring 24 (impelling means) serves to impel the ferrule 12 forward through the use of the pin clamp 19 and is disposed around the splice reinforcing portion 50, the front end of the spring 24 is brought into contact with the spring seat 20 at the rear end of the pin clamp 19, and the rear end of the spring 24 is brought into contact with the spring seat 31 at the front end of the stop ring 30.

When the joint end face 14 of the ferrule 12 is jointed to a ferrule of another optical fiber connector, the ferrule 12 is guided in the opening 22 and pushed backward to contract the ferrule spring 24, an appropriate force acts between the joint end face 14 of the ferrule 12 and a joint end face of a ferrule of another optical fiber connector, thereby bringing the joint end faces into close contact with each other. When the joint between the ferrule 12 and the ferrule of another optical fiber connector is released, the ferrule spring 24 is stretched and the ferrule 12 moves in the opening 22 and is restored to the original position.

An engaging portion 23 used for the MPO type connector plug to engage with an engaging claw (not shown) of an MPO type connector adaptor or a receptacle is disposed on both sides (both side in the vertical direction in FIG. 23A) in the width direction of the plug frame 21. A coupling 25 is disposed on the outer circumference of the plug frame 21, and a pair of coupling springs 26 and 26 is received between the outer circumferential surface of the plug frame 21 and the inner circumferential surface of the coupling 25. Accordingly, the coupling 25 can move forward and backward relative to the plug frame 21 with the stretching and contracting of the coupling springs 26 and 26. The engaging portion 23 or the coupling 25 has the same constitution as defined in the JIS or the like as the MPO type connector plug.

When the invention is applied to different types of optical fiber connectors, the constituents required for the joint (connector joint) of the optical fiber connectors are installed in the ferrule or the housing.

A through-hole 32 passing in the front-rear direction (the lateral direction in FIG. 23) along the length direction of the optical fiber is formed in the stop ring 30. The cross-sectional shape (the sectional shape in the plane perpendicular to the length direction of the optical fiber) of the through-hole 32 has at least a size which can receive the shape of the cross-sectional shape of the splice reinforcing portion 50. Accordingly, when the stop ring 30 is pushed in toward the plug frame 21 from the rear side of the splice reinforcing portion 50 in a state where the ferrule 12 is inserted into the opening 22 of the plug frame 21, the stop ring 30 is prevented from interfering with the splice reinforcing portion 50 (hindering the push thereof). When the stop ring 30 is pushed in toward the plug frame 21 from the rear side of the splice reinforcing portion 50, the engaging claw 33 is drawn into the splice reinforcing portion 50 just before the engaging claw 33 reaches the engaging window 27. Accordingly, on the back surface side of the engaging claw 33, a groove 32a is formed in the inner surface of the through-hole 32, thereby avoiding the interference of the splice reinforcing portion 50 with the back surface of the engaging claw 33.

An external screw 34 is formed on the outer circumferential surface of the rear end portion of the stop ring 30. An internal screw 36 formed on the inner circumferential surface of the screw ring 35 can be fastened to the external screw 34. The front end portion of the tensile fiber 49 of the external optical fiber 45 can be pinched and fixed between the external screw 34 and the internal screw 36. The screw ring 35 includes an opening 37 at the rear end thereof, and a part of the tensile fiber 49 of the external optical fiber 45 and the optical fiber core 47 is inserted into the opening 37. The cross-sectional shape (the sectional shape in the plane perpendicular to the length direction of the optical fiber) of the opening 37 preferably has a certain opening size so as to avoid the contact of the tensile fiber 49 with the splice reinforcing portion 50.

A boot 65 for an external optical fiber for protecting the external optical fiber 45 is attached to the outer circumferential surface of the screw ring 35. The boot 65 is generally formed of a flexible material such as rubber or elastomer. In this embodiment, a protective tube 66 is attached around the sheath 48 of the external optical fiber 45 and an annular locking portion 67 having a large diameter at the front end portion of the tube 66 is inserted into the boot 65.

The sequence of assembling the housing or the like is not particularly limited, but the following sequence can be employed as an example.

As an advance preparation before the fusion splice, the ferrule spring 24, the stop ring 30, the screw ring 35, the external optical fiber boot 65, and the protective tube 66 are made to pass around the external optical fiber 45. These components are preferably arranged on the rear side (the right side in FIG. 23) so as not to interfere with the fusion splice.

The bare optical fibers 43 and 46 are fusion-spliced and the fusion-spliced portion 44 is pinched and reinforced between the pair of reinforcing members 51 and 54 in the splice reinforcing portion 50.

As shown in FIGS. 19 and 21, the locking recessed portion 183 of the pin clamp 19 is formed downward and thus can cause the neck portion 192 of the guide pin 15 to go into and away from the vertical direction.

Accordingly, as shown in FIG. 18, by upward moving the pin clamp 19 indicated by a virtual line, it is possible to fit the neck portion 192 of the guide pin 15 into the locking recessed portion 183. At this time, the head portion 193 is received in the reception portion 179.

Accordingly, the pin clamp 19 is disposed at the rear end of the ferrule 12 in the state where the base end portion 191 of the guide pin 15 is held therein.

As shown in FIGS. 20 and 21, since the width W1 of the locking recessed portion 183 is smaller than the outer diameter of the head portion 193. Accordingly, when the forward force (downward in FIG. 20) is applied to the guide pin 15, the locking end portion 193a which is the front face of the head portion 193 comes in contact with the rear face 177a of the front plate portion 177, thereby stopping the forward movement of the head portion 193. Accordingly, the forward movement of the guide pin 15 is regulated.

When a backward (upward in FIG. 20) force is applied to the guide pin 15, the rear face 190b of the body portion 190 comes in contact with the front plate portion 177 or the head portion 193 comes in contact with the rear plate portion 178, thereby regulating the backward movement of the guide pin 15.

The plug frame 21 is attached from the front side (the left side in FIG. 23) of the ferrule 12 to dispose the ferrule 12 in the opening 22 of the plug frame 21, the stop ring 30 is pushed into the plug frame 21 to cause the engaging claw 33 to engage with the engaging window 27, and the ferrule spring 24 is received along with the ferrule 12 and the splice reinforcing portion 50. The coupling 25 may be attached to the plug frame 21 in advance or may be attached thereto after the coupling 25 is attached to the stop ring 30.

The front end portion of the tensile fiber 49 is placed on the external screw 34 of the stop ring 30 and the internal screw 36 of the screw ring 35 is fastened to the external screw 34 to fix the front end portion of the tensile fiber 49. When the front end portion of the tensile fiber 49 extends over the outer circumference of the plug frame 21, the tensile fiber is cut out if necessary. The boot 65 is attached to the stop ring 30. The optical fiber connector 110 shown in FIG. 23 can be assembled through this sequence.

When the external optical fiber does not include a tensile fiber, the internal screw 36 of the screw ring 35 is fastened to the external screw 34 of the stop ring 30 to integrate the housing into a body, without pinching the tensile fiber.

The optical fiber connector 110 shown in FIG. 23 is of a type (male type) having a guide pin 15, but may be of a type (female type) not having a guide pin 15.

Figure 26:
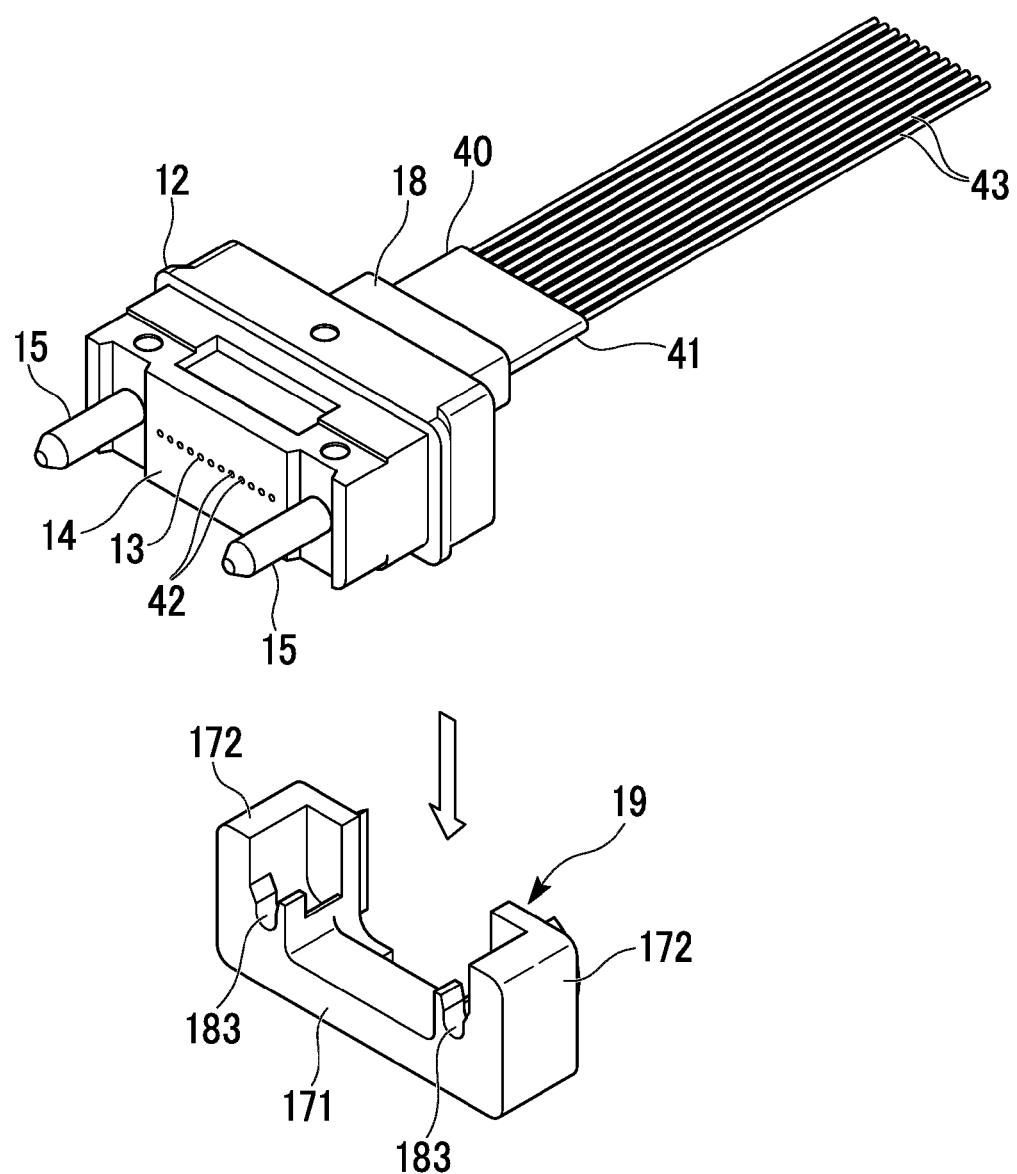
FIG. 26 is a diagram illustrating a usage of a pin clamp.
Figure 27:
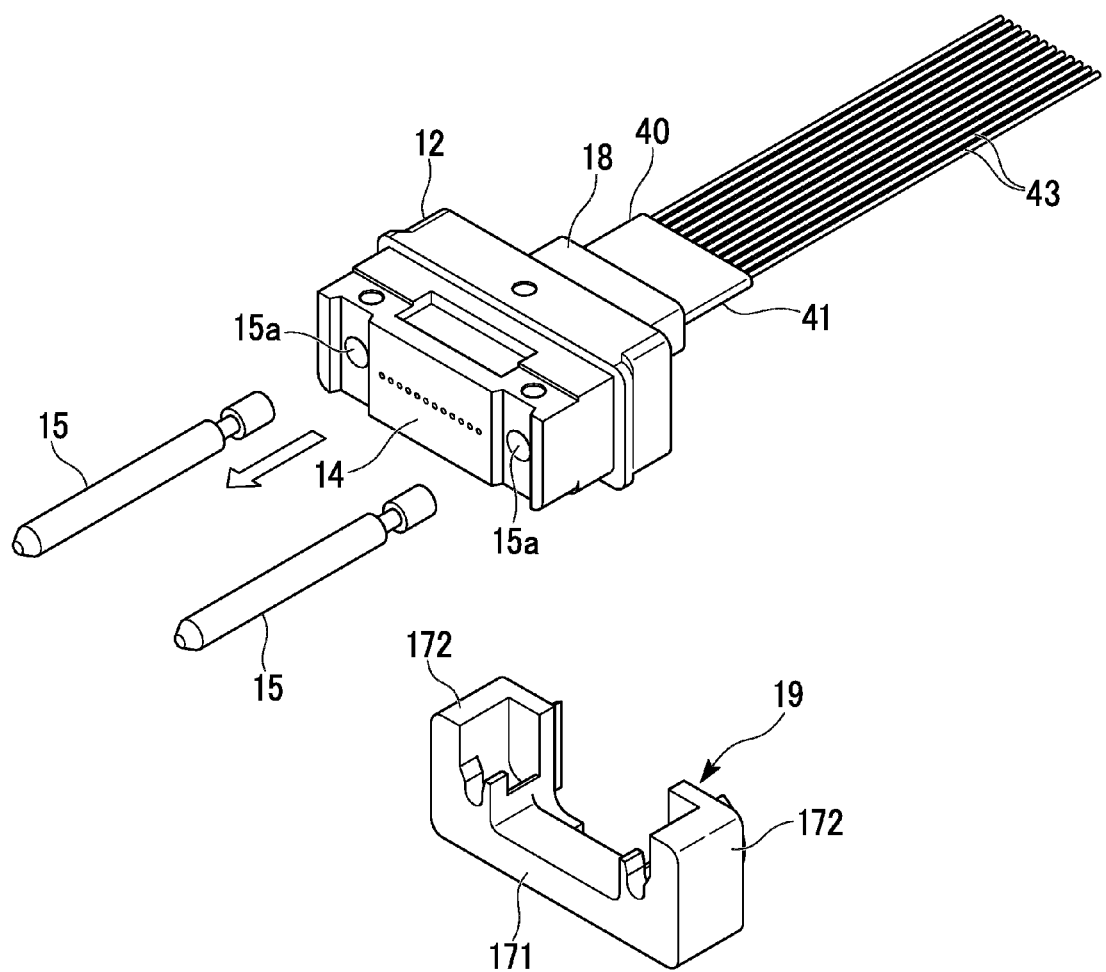
FIG. 27 is a diagram illustrating a usage of the pin clamp.

The sequence of detaching the guide pin 15 from the optical fiber connector 110 of the type (male type) shown in FIG. 23 to acquire the optical fiber connector 110 of the type (female type) not having the guide pin 15 will be described below with reference to FIGS. 26 to 28.

In the reverse sequence of the above-mentioned sequence, the plug frame 21 is detached to expose the ferrule 12 and the pin clamp 19.

As described above, the locking recessed portion 183 of the pin clamp 19 can allow the neck portion 192 of the guide pin 15 to go into and from the locking recessed portion in the vertical direction in FIG. 21. Accordingly, as shown in FIGS. 26 and 27, when the pin clamp 19 is moved downward, the neck portion 192 is pulled out of the locking recessed portion 183.

Accordingly, the guide pin 15 can move in the length direction and can be pulled out toward the front end.

Figure 28:
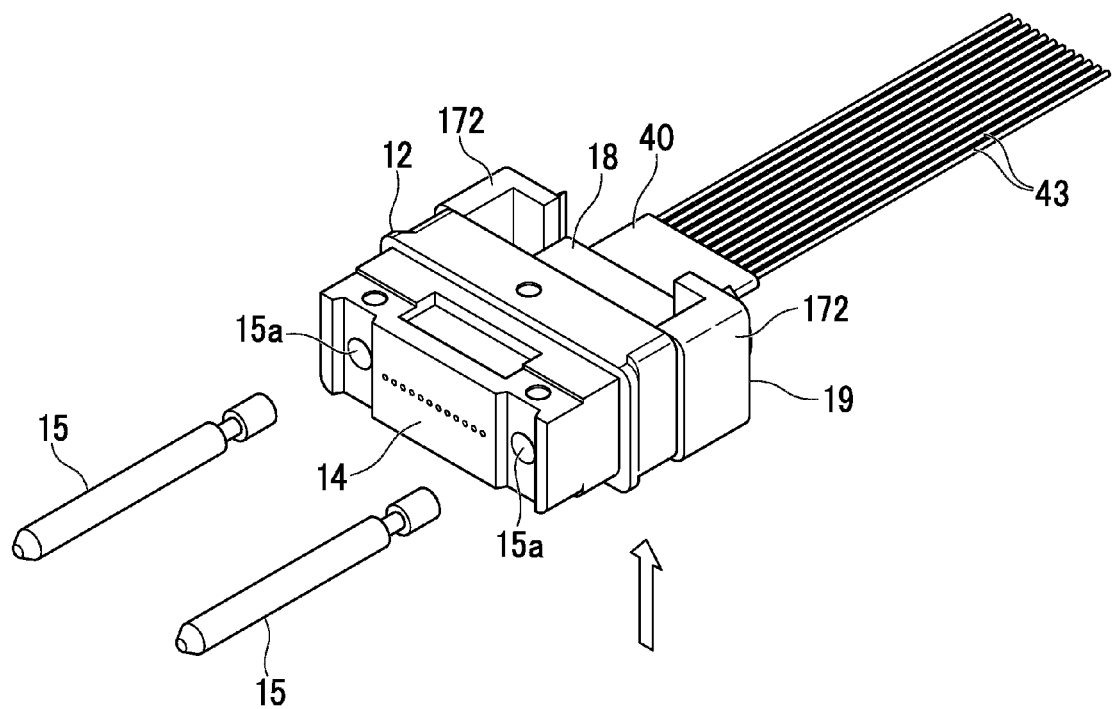
FIG. 28 is a diagram illustrating a usage of the pin clamp.

As shown in FIG. 28, the pin clamp 19 is moved upward after pulling out the guide pin 15, and then is disposed at the rear end of the ferrule 12. By attaching the plug frame 21 again, it is possible to obtain the optical fiber connector 110 of the type (female type) not having the guide pin 15.

The optical fiber connector 110 not having the guide pin 15 has the same constitution as the optical fiber connector 110 shown in FIG. 23, except that the guide pin 15 is not provided. In such a type of optical fiber connector 110, the guide pin insertion hole 15a serves as an insertion hole into which a guide pine of the opposite optical fiber connector is inserted.

When it is intended to change the optical fiber connector 110 of the type (female type) not having the guide pin 15 to the type (male type) having the guide pin 15, the guide pin 15 has only to be attached to the ferrule 12 in the opposite sequence of the above-mentioned sequence.

In the optical fiber connector 110, the pin clamp 19 includes the locking recessed portion 183 and the locking recessed portion 183 can allow the neck portion 192 of the guide pin 15 to go into and from the locking recessed portion in the direction substantially perpendicular to the guide pin insertion hole 15a. Accordingly, by moving the pin clamp 19 in the direction, it is possible to release the movement regulation in the length direction of the guide pin 15 and to separate the guide pin 15.

Therefore, the type (male type) having the guide pin 15 and the type (female type) not having the guide pin 15 can be easily switched to each other, thereby improving the workability on the splicing site.

In separation of the guide pin 15, since it is not necessary to move the pin clamp 19 backward, the fusion-spliced portion 44 of the inserted optical fiber 40 and the external optical fiber 45 is not adversely influenced. Therefore, it is not necessary to guarantee a space for movement of the pin clamp 19 between the ferrule 12 and the fusion-spliced portion 44, thereby reducing the size in the length direction of the optical fiber connector 110.

Since the pin clamp 19 includes the locking recessed portion 183 to which the base end portion 191 of the guide pin 15 is locked, it is possible to prevent the guide pin 15 from falling out toward the front end.

In this embodiment, the fusion-spliced portion 44 of the inserted optical fiber 40 and the external optical fiber 45 is pinched between a pair of reinforcing members 51 and 54 in the splice reinforcing portion 50, but the invention is not limited to this constitution. A constitution in which the fusion-spliced portion 44 is reinforced with a known reinforcing sleeve may be employed.

Another splicing method such as a method (mechanical splice method) of butt-jointing optical fibers of a pair of elements of a clamp unit may be used for the splicing of the inserted optical fiber 40 and the external optical fiber 45.

Figure 29:
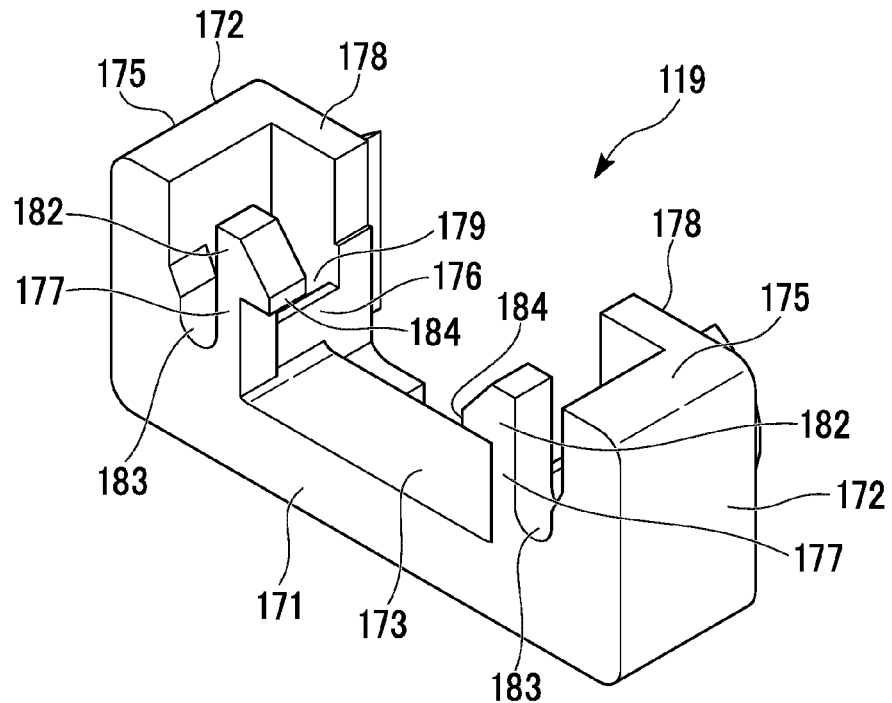
FIG. 29 is a diagram illustrating another example of the pin clamp.
Figure 30:
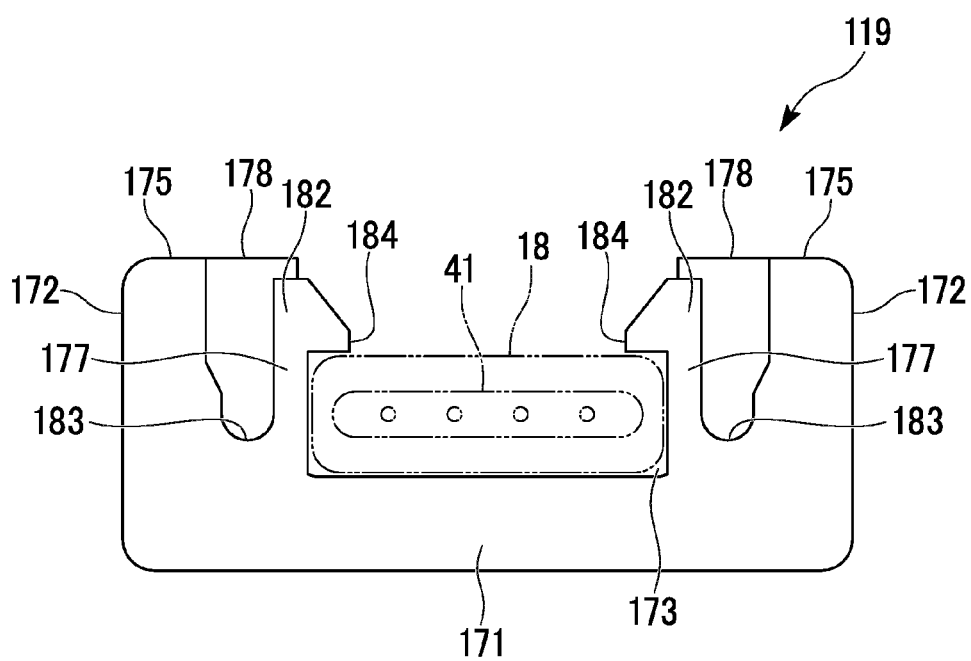
FIG. 30 is a front view illustrating the pin clamp shown in FIG. 29.

FIGS. 29 and 30 show another example of the pin clamp and the pin clamp 119 shown in the drawings is different from the pin clamp 19 shown in FIGS. 19 to 21, in that an extension 182 having a holding protrusion 184 is formed in the front plate portions 177 and 177.

The extension 182 is formed at the upper edges of the front plate portions 177 and 177 so as to extend upward from the further inner position than the locking recessed portion 183.

The holding protrusion 184 is formed at the inner edge of the extension 182 so as to protrude inward (in a direction in which both holding protrusions get closer to each other).

As shown in FIG. 30, since the distance between the front ends of the holding protrusions 184 and 184 is smaller than the width of the ferrule boot 18, the holding protrusion 184 can regulate the upward movement (outward movement) of the ferrule boot 18 in the insertion space 173. Accordingly, the pin clamp 119 can be prevented from falling out of the ferrule boot 18.

The top surface 184a of the holding protrusion 184 is an inclined face slowly going down toward the protruding direction (inward). Accordingly, when the ferrule boot 18 is inserted into the insertion space 173, the ferrule boot 18 presses the top face 184a outward to move the holding protrusions 184 outward with the warping deformation of the front plate portions 177, thereby enabling the insertion of the ferrule boot 18.

Hereinafter, a cap-attached optical fiber connector, an optical fiber connector assembling method, and an optical fiber connector cap according to embodiments of the invention will be described with reference to the accompanying drawings.

Third Embodiment

A third embodiment of the invention will be described below.

Figure 31:
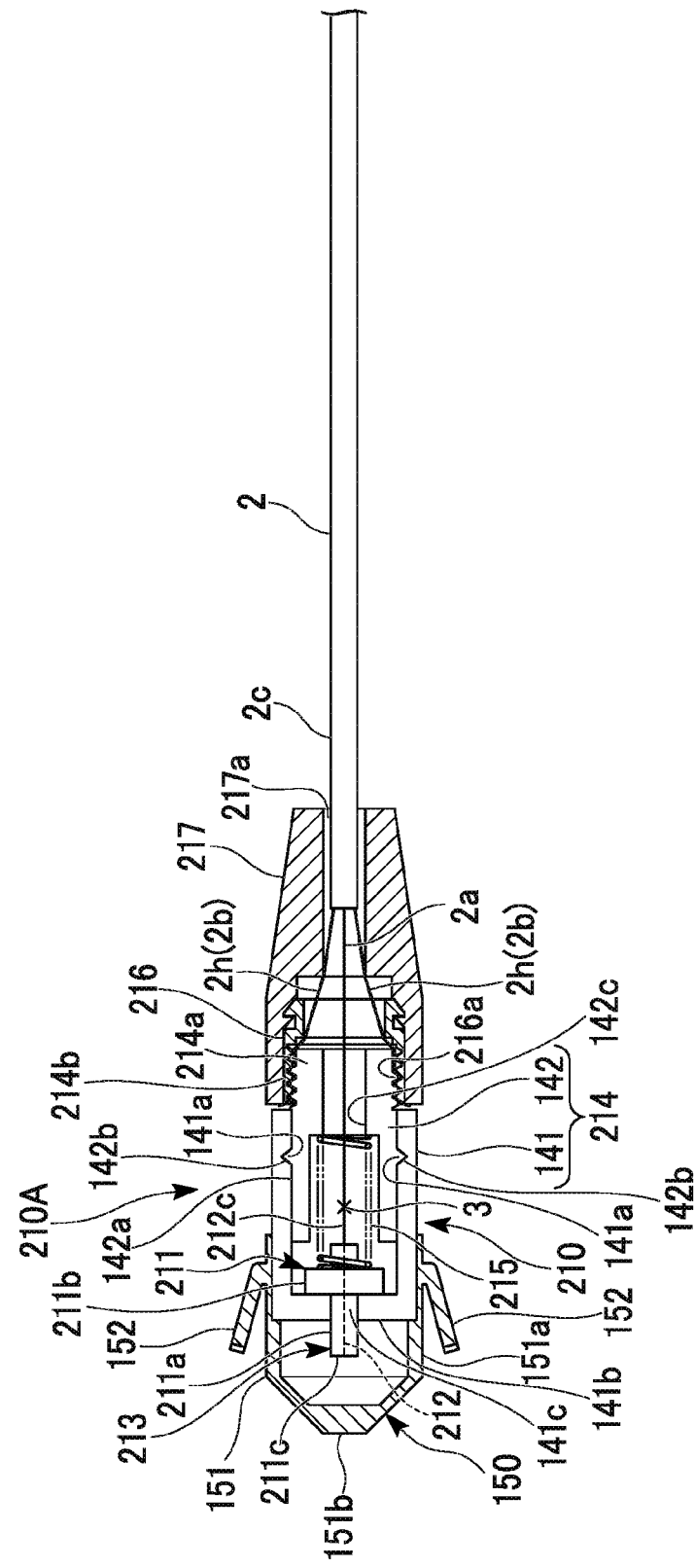
FIG. 31 is a sectional view illustrating an optical fiber connector and a cap-attached optical fiber connector according to a third embodiment of the invention.
Figure 33:
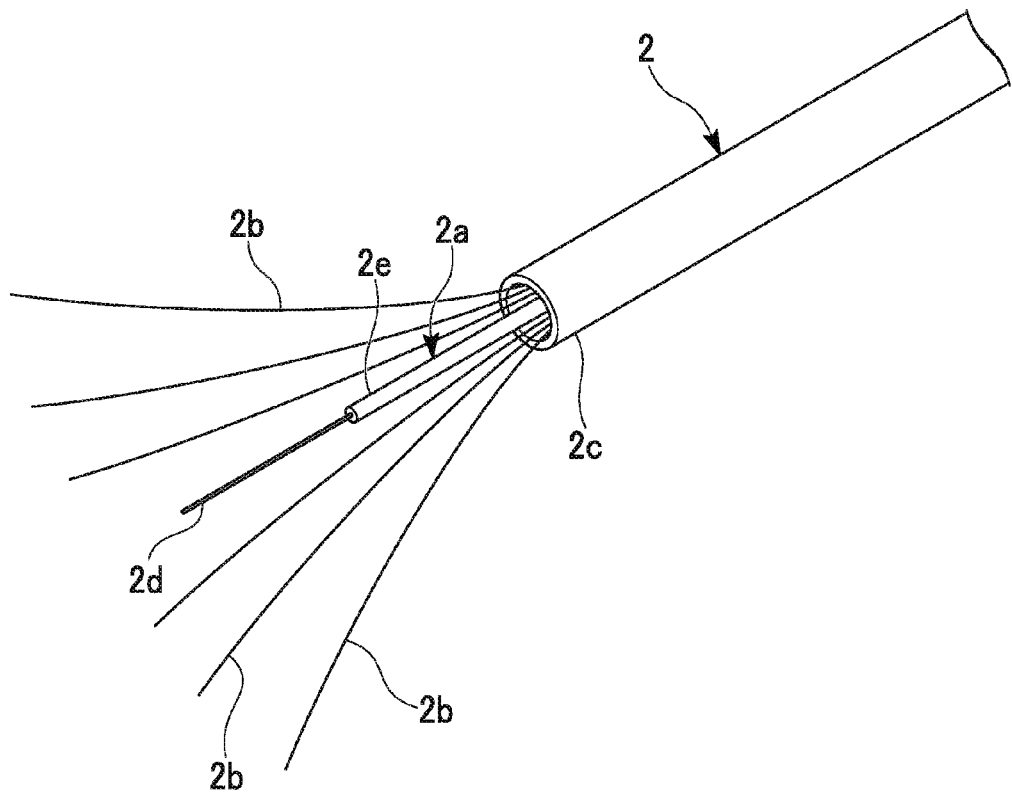
FIG. 33 is a perspective view illustrating an example of a structure of an optical fiber cord applicable to the invention.

FIG. 31 shows a cap-attached optical fiber connector 210A according to this embodiment.

In the cap-attached optical fiber connector 210A, an optical fiber connector cap 150 (hereinafter, may be simply referred to as a cap) is detachably attached to a front end portion (an end portion of the side on which a ferrule 211 is disposed) of an optical fiber connector 210 assembled to the terminal of an optical fiber cord 2 (optical transmission medium).

In FIGS. 31, 32A, and 32B, the left side in the cap-attached optical fiber connector 210A and the optical fiber connector 210 is defined as a front side and the right side is defined as a rear side.

Figure 40:
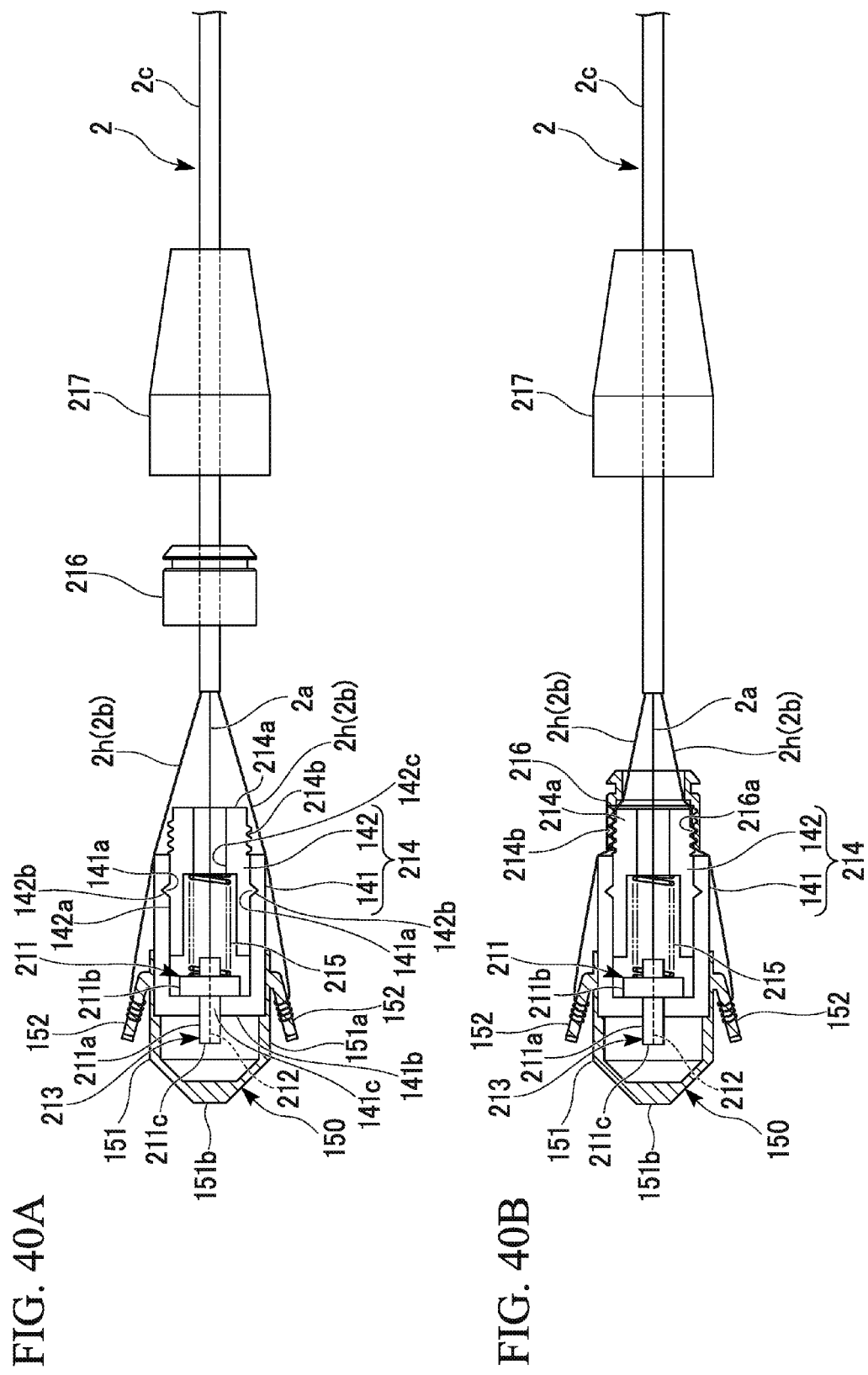
FIG. 40A is a diagram illustrating an optical fiber connector assembling method according to a fourth embodiment of the invention.
FIG. 40B is a diagram illustrating the optical fiber connector assembling method subsequent to FIG. 40A.
Figure 43A:
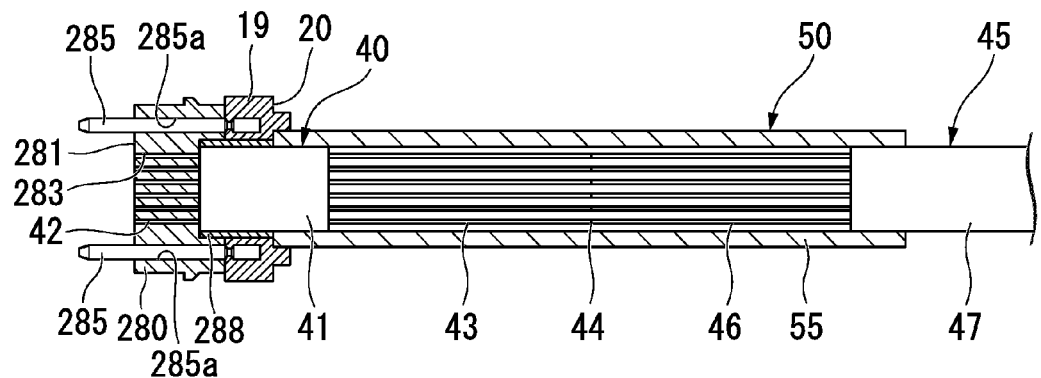
FIG. 43A is a sectional view illustrating a part (a splice reinforcing portion and the vicinity thereof) of the optical fiber connector shown in FIGS. 42A and 42B and is a sectional view taken along the plane in which the multi-core optical fiber is arranged.
Figure 45A:
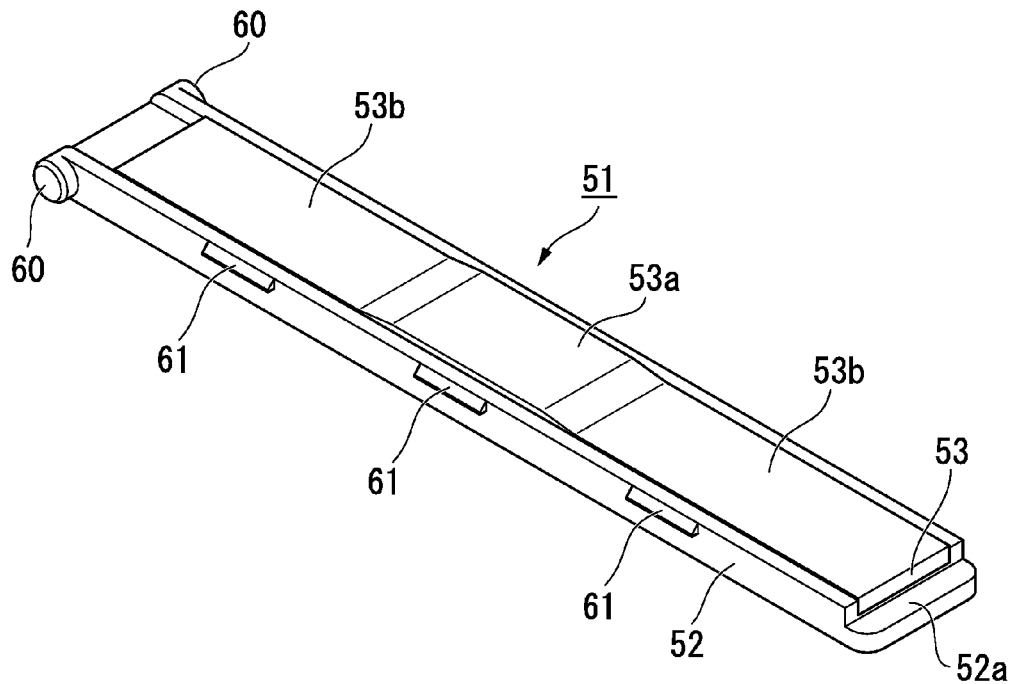
FIG. 45A is a perspective view illustrating the structure of a reinforcing member (a pinch member) (a first reinforcing member) used to assemble the splice reinforcing portion shown in FIGS. 43A and 43B.

Hereinafter, FIGS. 32A and 32B may be comprehensively referred to as "FIG. 32". Similarly, FIGS. 40A and 40B may be comprehensively referred to as "FIG. 40", FIGS. 42A and 42B may be comprehensively referred to as "FIG. 42", FIGS. 43A and 43B may be comprehensively referred to as "FIG. 43", and FIGS. 45A and 45B may be comprehensively referred to as "FIG. 45".

The optical fiber connector 210 shown in FIG. 31 is a single-core optical fiber connector.

The optical fiber connector 210 is a so-called site-assembled optical fiber connector.

As shown in FIGS. 31, 32A, and 32B, the optical fiber connector 210 schematically includes a ferrule 211 having a structure in which a flange portion 211b protrudes on the outer circumference of a capillary member 211a, an inserted optical fiber 212 which is a short optical fiber inserted into and fixed to the ferrule 211 (specifically, the capillary member 211a), a sleeve-like housing 214 receiving an optical-fiber-attached ferrule 213 including the ferrule 211 and the inserted optical fiber 212 inserted into and fixed to the ferrule 211 (specifically, the capillary member 211a), a spring 215 that is received in the housing 214 and that elastically impels the optical-fiber-attached ferrule 213 to the front side (hereinafter, also referred to as a connector front side) relative to the housing 214, and a screwed ring member 216 screwed to a tensile member fixing tube 214a (to be described later) which is a rear end portion of the housing 214 opposite to the front end portion in which the ferrule 211 is disposed.

The optical fiber connector 210 further includes a boot 217 externally inserted onto the screwed ring member 216 and disposed to extend backward from the screwed ring member 216.

Figure 38:
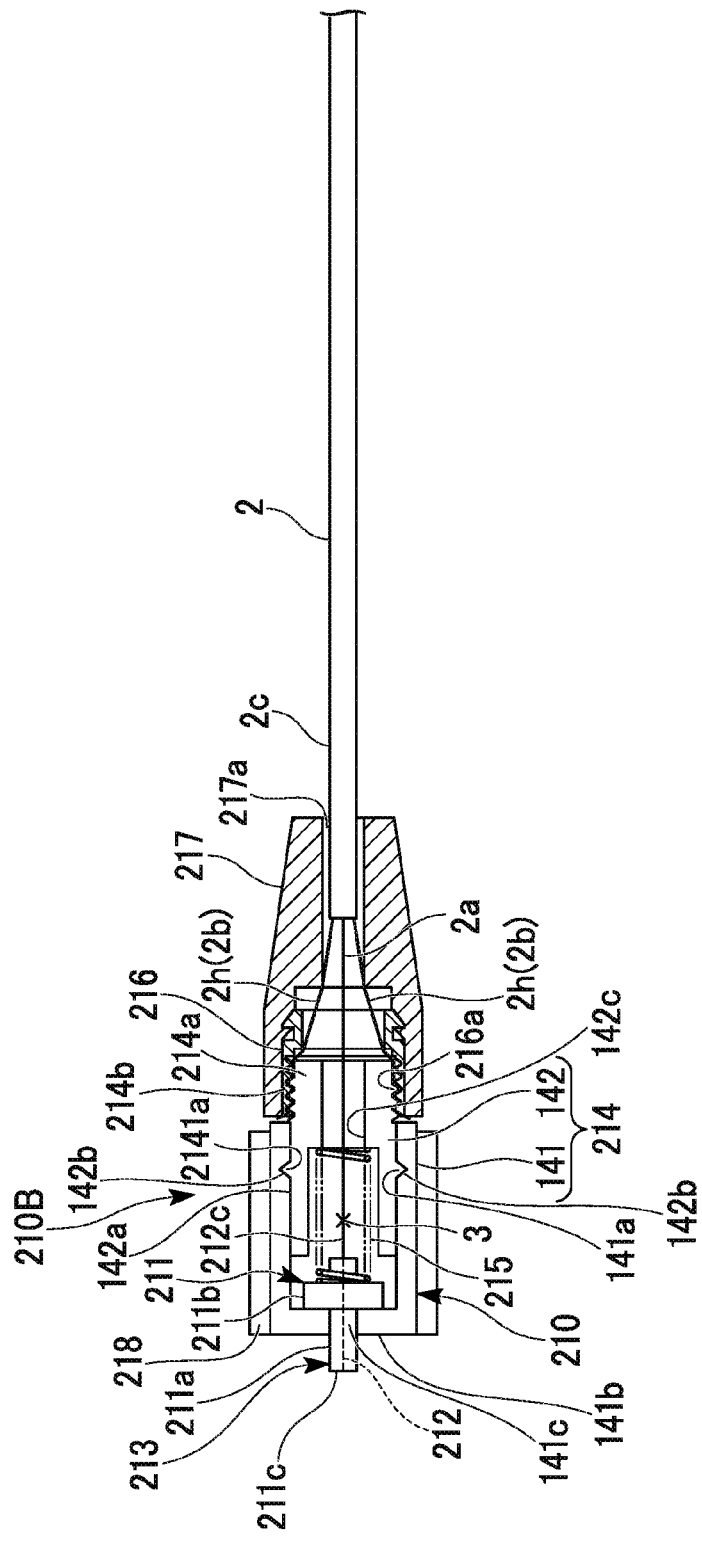
FIG. 38 is a sectional view illustrating an optical fiber connector obtained by assembling a cap to the optical fiber connector shown in FIG. 31.

As shown in FIG. 38, in the optical fiber connector 210, a sleeve-like grin 218 (coupling) may be externally inserted and attached to the housing 214. The grip 218 is disposed in the housing 214 to slide within a movable range in the front-rear direction.

In FIG. 38, the optical fiber connector having the grip 218 disposed therein is referenced by reference sign 210B.

In the housing 214, a sleeve-like stop ring 142 is inserted into and fixed to the rear end portion of a sleeve-like plug frame 141 to integrate them into a body. The stop ring 142 is disposed to extend backward from the plug frame 141. The rear end portion of the stop ring 141 located in the back of the plug frame 141 serves as the tensile member fixing tube 214a of the housing 214.

The tensile member fixing tube 214a has an external screw 214b (screw portion) formed on the outer circumference thereof, and the screwed ring member 216 having an internal screw 216a which can be screwed to the external screw 214b can be screwed thereto from the rear side of the tensile member fixing tube 214a, as shown in FIG. 31.

Hereinafter, the tensile member fixing tube 214a is also referred to as a screwed tube.

A ferrule, a plug frame, and a grip of a single-core optical fiber connector (plug) such as an SC type optical fiber connector (F04 type optical fiber connector defined in the JIS C5973; SC: Single fiber Coupling optical fiber connector) and an MU type optical fiber connector (F14 type optical fiber connector defined in the JIS C5983, MU: Miniature-Unit coupling optical fiber connector) can be employed as the ferrule 211, the plug frame 141, and the grip 218.

The inserted optical fiber 212 of the optical-fiber-attached ferrule 213 includes a rear extension 212c which is a portion extending to the rear end opposite to the joint end face 211c (front end face) for butt joint which is a front end of the capillary member 211a of the ferrule 211. The inserted optical fiber 212 is inserted into and fixed to the capillary member 211a of the ferrule 211 in a state where the end face of the end portion (front end portion) opposite to the rear extension 212c is arranged on the polished joint end face 211c of the end portion of the capillary member 211a.

As shown in FIG. 31, in the optical fiber connector 210 assembled to the terminal of the optical fiber cord 2, a spliced portion 3 where the end portion (the rear end portion of the inserted optical fiber 212) of the rear extension 212c of the inserted optical fiber 212 is optically spliced to the front end portion of an optical fiber 2a drawn out of the terminal of the optical fiber cord 2 is received in the housing 214. The optical fiber 2a of the optical fiber cord 2 is a single-core coated optical fiber in which a bare optical fiber 2d is coated with a resin coating material 2e (hereinafter, also simply referred to as a coating material) so as to cover the outer circumference thereof and to integrate into a body.

Figure 35:
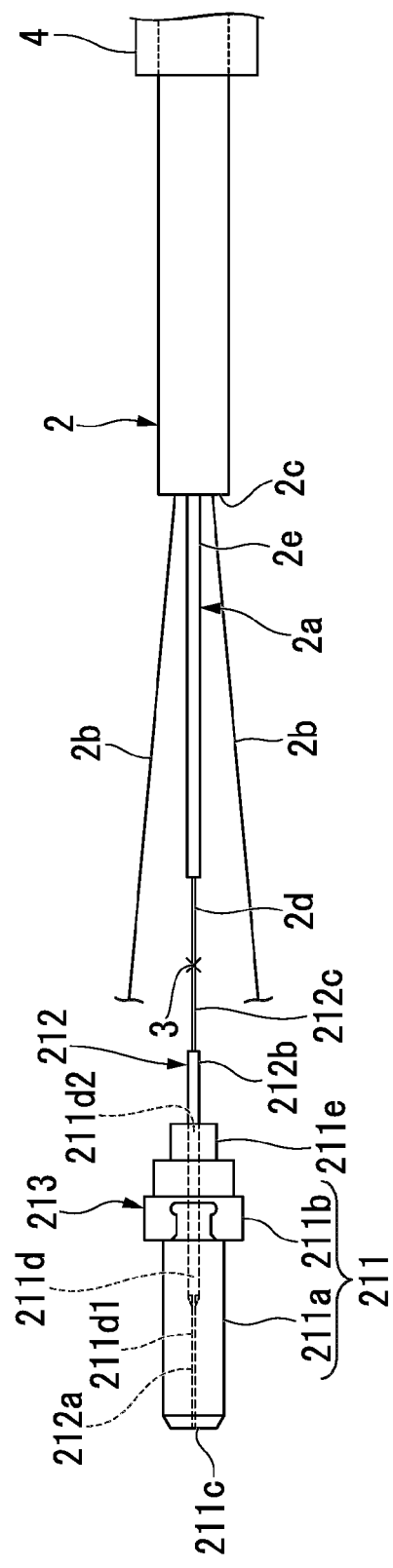
FIG. 35 is a diagram illustrating a fiber connecting step in an optical fiber connector assembling method according to the first embodiment.

On the other hand, the inserted optical fiber 212 is a single-core coated optical fiber (specifically, an optical fiber core) from of which both ends a bare optical fiber 2a is drawn out, for example, as shown in FIG. 35. The inserted optical fiber 212 is bonded and fixed to the ferrule 211 (specifically, the capillary member 211a) with an adhesive disposed in a fiber hole 211d in a state where one of both protruding portions of a coated portion coated with a coating material 12b out of the bare optical fiber 12a is inserted into a positioning hole 211da which is a front part (on the side of the joint end face 211c) of the fiber hole 211d penetrating the capillary member 211a of the ferrule 211 and which has an opening in the joint end face 211c and the coated portion is inserted into a coated portion receiving hole 211d2 which is a rear part of the fiber hole 211d about the positioning hole 211d1 and which has a diameter larger (an inner diameter larger) than that of the positioning hole 211d1.

The optical fibers 2a and 212 are a single-core optical fiber core herein, but for example, an optical fiber wire may be employed.

The inserted optical fiber 212 may be a bare optical fiber all over the length.

As shown in FIG. 35, the coated portion of the inserted optical fiber 212 has a part extending backward from the ferrule 211.

As shown in FIG. 35, the spliced portion 3 is a fusion-spliced portion in which the rear end of the inserted optical fiber 212 of the optical-fiber-attached ferrule 213 and the front end of the optical fiber 2a extending from the terminal of the optical fiber cord 2 are fusion-spliced. Hereinafter, when the spliced portion 3 indicates the fusion-spliced portion, it may be referred to as a fusion-spliced portion.

The fusion-spliced portion 3 is specifically, a fusion-spliced portion in which the bare optical fiber drawn out from the rear end portion of the inserted optical fiber 212 and the bare optical fiber 2d drawn out from the front end portion of the optical fiber 2a extending from the terminal of the optical fiber cord 2 are fusion-spliced.

A fusion reinforcing portion (spliced point reinforcing portion) incorporating a reinforcing member (not shown) covering the fusion-spliced portion 3 to the fusion-spliced portion 3 as a body and reinforcing the fusion-spliced portion is received in the housing 214 of the optical fiber connector 210.

In the optical fiber connector 210, a part, which extends from a sheath 2c, of a fiber-like tensile member 2b (hereinafter, also referred to as a tensile fiber) longitudinally added to the optical fiber 2a and received along with the optical fiber 2a in the resin sheath 2c (external sheath) of the optical fiber cord 2 is pinched and fixed between the outer circumferential surface of the screwed tube 214a at the rear end of the housing 214 and the inner circumferential surface of the screwed ring member 216 screwed to the screwed tube 214a, whereby the optical fiber cord 2 is detained relative to the housing 214.

A cap 150 will be described below.

As shown in FIGS. 31, 32A, and 32B, the cap 150 has a constitution in which a hooking protrusion 152 (tensile member detaining portion) used to detain the tensile fiber 2b extending from the terminal of the optical fiber cord 2 in the work of assembling the optical fiber connector 210 to the terminal of the optical fiber cord 2 protrudes from the outer surface of a body 151 (hereinafter, also referred to as a cap body) of a bottomed cylinder which is detachably externally inserted onto the front end portion (the front end portion of the plug frame 141) of the housing 214 of the optical fiber connector 210.

The cap body 151 of the cap 150 shown in the drawings includes a bottomed cylinder of which one end in the axis direction of a tubular body portion 151a which can be externally inserted onto the front end portion of the housing 214 of the optical fiber connector 210 is blocked by an end wall 151b, and is externally inserted onto the front end portion of the housing 214 so as to be attached to and detached from the housing.

The hooking protrusion 152 protrudes to be inclined about the axis line of the tubular body portion 151a so that as it goes from the tubular body portion 151a of the cap body 151 to the front end blocked by the end wall 151b of the cap body 151, the distance from the outer circumferential surface of the tubular body portion 151a increases.

In the cap 150 shown in the drawings, the hooking protrusions 152 protrude from both sides with the axis line of the tubular body portion 151a of the cap body 151 interposed therebetween.

The cap 150 is a plastic molded product and can be produced at a low cost.

A method of assembling the optical fiber connector 210 to the terminal of the optical fiber cord 2 (an optical fiber connector assembling method) will be described below.

First, as shown in FIG. 35, a fusion-splicing and reinforcing step (fiber splicing step) of fusion-splicing the rear end of the inserted optical fiber 212 of the optical-fiber-attached ferrule 213 assembled in advance to the front end of the optical fiber 2a extending from the terminal of the optical fiber cord 2 and assembling a splice reinforcing portion (spliced portion reinforcing portion) for reinforcing the fusion-spliced portion formed by the fusion splice by the use of a reinforcing member 3 is performed.

Figure 36:
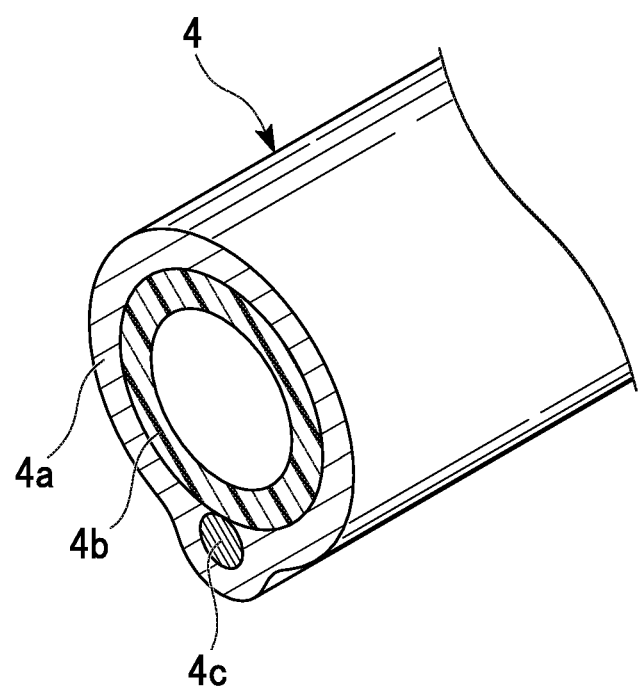
FIG. 36 is a sectional perspective view illustrating the structure of an example of a reinforcing sleeve which can be suitably used in the fiber connecting step (fusion-slicing and reinforcing step) of the optical fiber connector assembling method according to the first embodiment.
Figure 37:
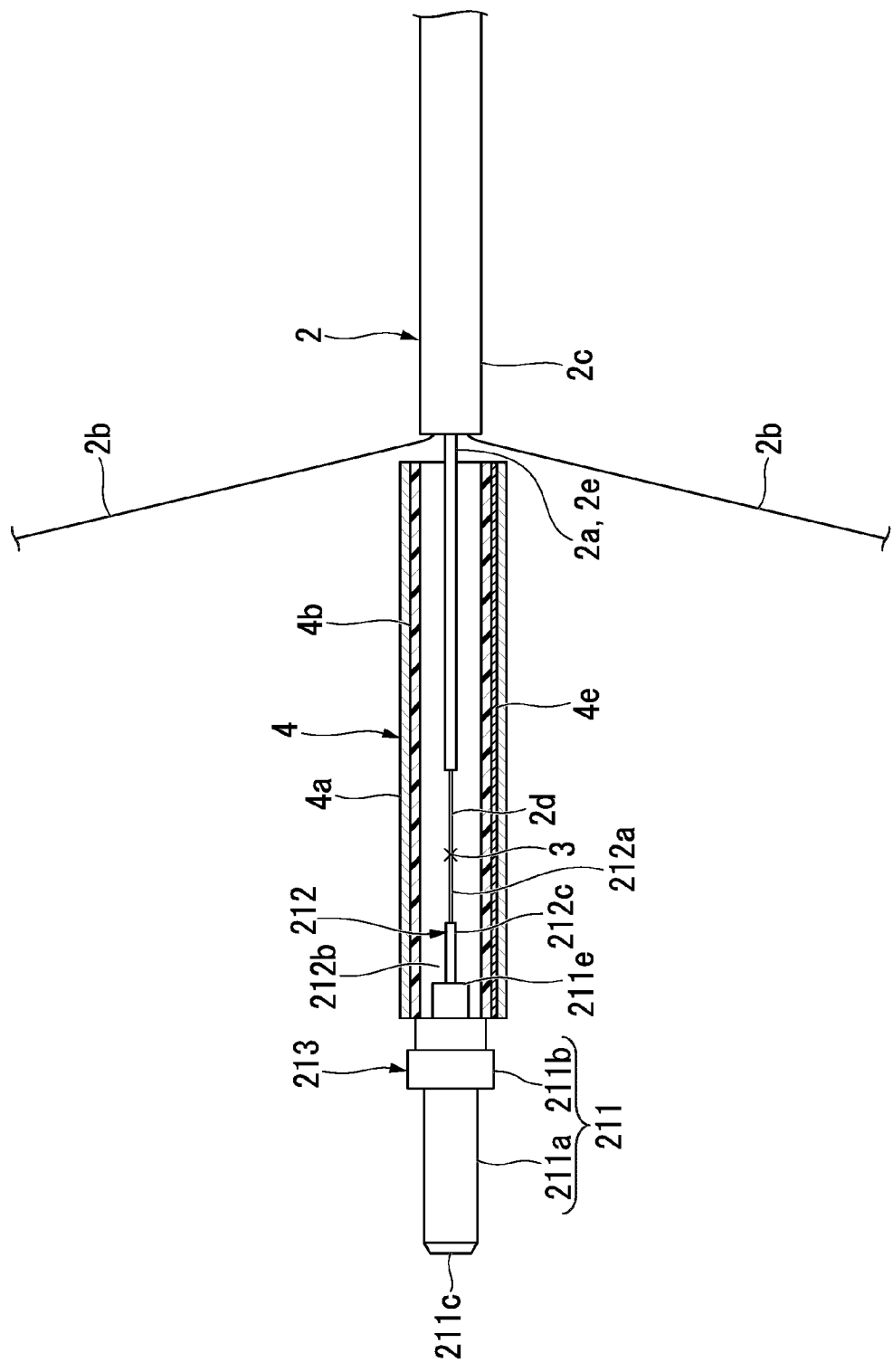
FIG. 37 is a diagram illustrating the fiber connecting step (fusion-slicing and reinforcing step) using the reinforcing sleeve shown in FIG. 36.

For example, a reinforcing sleeve 4 shown in FIGS. 36 and 37 can be suitably used as the splice reinforcing portion.

As shown in FIGS. 36 and 37, the reinforcing sleeve 4 includes a heat-shrinkable tube 4a and a thermoplastic resin layer 4b disposed along the inner surface thereof, and further includes a rod-like tensile member 4c (metal rod) inserted over the whole length in the length direction (axis line direction) of the heat-shrinkable tube 4a with the same thickness as the heat-shrinkable tube 4a.

In assembling the fusion-spliced portion using the reinforcing sleeve 4, as shown in FIG. 35, the inserted optical fiber 212 and the optical fiber 2a of the optical fiber cord 2 are fusion-spliced, the reinforcing sleeve 4 externally inserted onto the optical fiber cord 2 in advance is moved to the ferrule 211 and covers the fusion-spliced portion 3, the rear extension 212c of the inserted optical fiber 212, and the portion, which extends from the terminal of the optical fiber cord 2, of the optical fiber 2a of the optical fiber cord 2, as shown in FIG. 37, and the reinforcing sleeve 4 is heated in this state to melt a thermoplastic resin forming the thermoplastic resin layer 4b and to thermally contract the heat-shrinkable tube 4a. By cooling (for example, cooling with air), the thermoplastic resin in the molted state is solidified. Accordingly, the fusion-spliced portion 3 is embedded in the solidified thermoplastic resin, and the heat-shrinkable tube 4a, the thermoplastic resin therein, and the fusion-spliced portion 3 are integrated into a body, whereby it is possible to assemble the fusion splice reinforcing portion in which the fusion-spliced portion 3 is reinforced with the heat-shrinkable tube 4a, the thermoplastic rein, and the rod-like tensile member 4c.

The heat-shrinkable tube 4a is formed of a heat-shrinkable resin and, for example, polyolefin contracting at 100° C. to 160° C. can be used.

A hot-melt resin (hot-melt adhesive) can be suitably used as the thermoplastic resin forming the thermoplastic resin layer 4b. Examples of the hot-melt resin include ethylene-vinyl acetate copolymer (EVA), polyethylene, polyisobutylene, polyamide, and ethylene-ester acrylate copolymer. It is preferable that the thermoplastic resin be softened at the contraction temperature of the heat-shrinkable tube 4a. The softening temperature is, for example, in the range of 100° C. to 160° C.

In FIG. 37, one end in the length direction of the reinforcing sleeve 4 is externally inserted onto a rear end tube 211e at the rear end of the ferrule 211, and the heat-shrinkable tube 4a is fixed to the rear end tube 211e at the rear end of the ferrule 211 when the reinforcing sleeve 4 is heated to assemble the fusion splice reinforcing portion, whereby the ferrule with the fusion splice reinforcing portion in which the fusion splice reinforcing portion is integrated to the rear side of the ferrule 211 is assembled. However, the invention is not limited to this constitution, but the reinforcing sleeve 4 may be disposed at a position separated backward (toward the optical fiber cord 2) from the ferrule 211 and the fusion splice reinforcing portion not integrated to the ferrule 211 may be assembled at the position separated backward from the ferrule 211.

The inserted optical fiber 212 extends backward from the rear end tube 211e through the inside of the rear end tube 211e.

When the fusion splicing and reinforcing step is ended, as shown in FIG. 32A, a housing assembling step of fitting the stop ring 142 to the plug frame 141 to assemble the housing 214 and receiving the optical-fiber-attached ferrule 213, the fusion splice reinforcing portion, and the spring 215 (coil spring) in the housing 214 is performed.

In the housing assembling step, the spring 215 and the stop ring 142 externally inserted onto the optical fiber cord 2 in advance is moved toward the ferrule 211, the ferrule 211, the fusion splice reinforcing portion, the spring 215, and the stop ring 142 are inserted into the sleeve-like plug frame 141 from the rear end, and the engaging claw 142b protruding from the outer circumference of the stop ring 142 is locked to the engaging recessed portion 141a formed in the inner surface of the rear end portion of the plug frame 141, whereby the front sleeve portion 142a located in the front of the screwed tube 214a of the stop ring 142 is fitted to the plug frame 141.

As a result, the stop ring 142 is fixed to the plug frame 141, and the ferrule 211, the fusion splice reinforcing portion, and the spring 215 are received in the sleeve-like housing 214 in which the plug frame 141 and the stop ring 142 are integrated into a body.

In the ferrule 211, the capillary member 211a is inserted into a front end opening 141c guaranteed inside a front end convex wall 141b protruding on the inner circumference of the front end portion of the plug frame 141 so as to be movable in the axis line direction of the plug frame 141 and is received in the front end portion of the housing 214 so as to be movable in the axis line direction of the housing 214. By bringing the flange portion 211b into contact with the front end convex wall 141b inside the housing 214, the capillary member is prevented from falling out forward from the housing 214.

The spring 215 is locked so as not to fall out backward from the stop ring 142 by the spring receiving wall 142c protruding in the rear end portion of the stop ring 142. In the ferrule 211, the flange portion 211b is disposed at the position where it comes in contact with the front end convex wall 141b of the plug frame 141 with the elastic impelling force of the spring 215 and can be pushed into the rear side of the housing 214 against the elastic impelling force of the spring 215.

When the housing 214 is assembled in the housing assembling step, as shown in FIG. 32A, a tensile member fixing step of fitting the cap body 151 of the cap 150 to the front end portion of the housing 214 to attach the cap 150 to the housing 214, hooking and detaining the tensile fiber 2b extending from the optical fiber cord 2 to and in the hooking protrusion 152 of the cap 150, and screwing the screwed ring member 216 to the screwed tube 214a at the rear end of the housing 214 (FIG. 32B) to fix the tensile fiber 2b to the screwed tube 214a is carried out.

In the housing assembling step, when the assembling of the housing 214 is completed, the terminal of the optical fiber cord 2 is disposed at a position separated backward from the housing 214.

In the tensile member fixing step, the front end portion of the tensile fiber 2b being drawn out from the terminal of the optical fiber cord 2 along with the optical fiber 2a in advance and extending from the terminal of the optical fiber cord 2 is attached to and detained in the hooking protrusion 152 of the cap 150 attached to the front end portion of the housing 214, for example, by winding, binding, or the like.

In this specification, the winding or the binding is considered to correspond to the "hooking" of the tensile fiber 2b on the hooking protrusion 152 of the cap 150.

Figure 34:
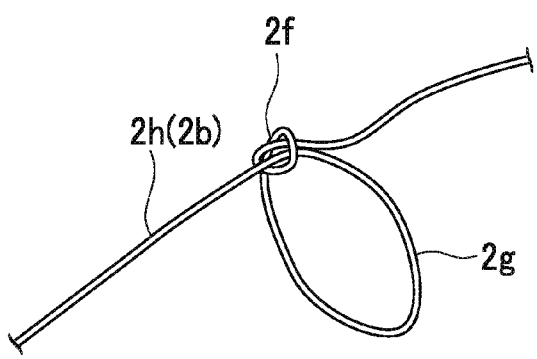
FIG. 34 is a diagram illustrating an example where a loop to be hooked to a hooking protrusion of an optical fiber connector cap is formed in a tensile fiber bundle extending from the optical fiber cord shown in FIG. 33.

For example, as shown in FIG. 34, in the tensile fiber 2b extending from the terminal of the optical fiber cord 2, a loop portion 2g in which the front end portion thereof is formed in a loop and a knot 2f causing the tensile fiber 2b to hold the loop portion 2g may be formed and then the loop portion 2g may be externally inserted onto and hooked on the hooking protrusion 152.

As described above, the hooking protrusion 152 protrudes to be inclined about the axis line of the tubular body portion 151a so that as it goes from the tubular body portion 151a of the cap body 151 to the front end blocked by the end wall 151b of the cap body 151, the distance from the outer circumferential surface of the tubular body portion 151a increases. Accordingly, there is an advantage that it is difficult to allow the tensile fiber 2b hooked on the hooking protrusion 152 by winding, binding, or the like to fall out of the hooking protrusion 152.

The tensile fiber 2b is hooked on and fixed to the hooking protrusion 152, whereby tension is applied to the part extending between the terminal of the optical fiber cord 2 and the hooking protrusion 152.

For example, aramid fiber can be suitably used for the tensile fiber 2b but, for example, glass fiber and carbon fiber may be used in addition to the aramid fiber.

A plurality of tensile fibers 2b are received in the sheath 2c of the optical fiber cord 2. In this case, in detaining the tensile fibers 2b in the hooking protrusion 152 of the cap 150 attached to the front end portion of the housing 214 by the hooking, specifically, a plurality of tensile fibers 2b extending from the terminal of the optical fiber cord 2 are partitioned into two parts with the optical fiber 2a interposed therebetween to form two tensile fiber sets 2h with substantially the same thickness and the front end portions of the tensile fiber sets 2h are hooked on two hooking protrusions 152 of the cap 150, respectively.

When the detainment of the tensile fibers 2b in the hooking protrusions 152 of the cap 150 by the hooking is completed, the screwed ring member 216 externally inserted onto the optical fiber cord 2 in advance is moved toward the housing 214 and the screwed ring member 216 is screwed to the outer circumference of the screwed tube 214a at the rear end portion (the rear end portion of the stop ring 142) of the housing 214, as shown in FIG. 32B.

As described above, the terminal of the optical fiber cord 2 is disposed at the position separated backward from the housing 214. Accordingly, when the screwed ring member 216 is screwed to the outer circumference of the screwed tube 214a, two tensile fiber sets 2h extending forward from the terminal of the optical fiber cord 2 through the vicinity of the external screw 214b of the screwed tube 214a can be pinched and fixed between the outer circumferential surface of the screwed tube 214a and the inner circumferential surface of the screwed ring member 216. The tensile fiber sets 2h are specifically pinched between the external screw 214b of the screwed tube 214a and the internal screw 216a of the screwed ring member 216 and thus can be strongly fixed to the rear end portion of the housing 214.

When the tensile member fixing step is ended, the parts of the tensile fiber sets 2h from the position at which they are fixed to the housing 214 by the use of the screwed ring member 216 to the cap 150 are removed, and the sleeve-like boot 217 externally inserted onto the optical fiber cord 2 in advance is moved toward the housing 214 and externally fitted and attached to the screwed ring member 216 (see FIG. 31). Accordingly, it is possible to totally assemble the optical fiber connector 210.

Since the cap 150 is attached to the front end portion of the assembled optical fiber connector 210, it is possible to obtain a cap-attached optical fiber connector 210A at the same time as assembling the optical fiber connector 210. Since the cap 150 attached to the optical fiber connector 210 covers the joint end face 211c at the front end of the capillary member 211a of the ferrule 211 of the optical fiber connector 210 by the use of the cap body 151, the cap can be made to function as a protective cover protecting the joint end face 211c of the ferrule 211 by holding the state where it is attached to the optical fiber connector 210.

The terminal of the optical fiber cord 2 is disposed in an inner hole 217a penetrating the boot 217 disposed to extend backward from the screwed ring member 216.

Since the tensile fibers 2b extending from the terminal of the optical fiber cord 2 are fixed to the screwed tube 214a at the rear end of the housing 214 through the use of the screwed ring member 216, the terminal is detained without falling out to the rear side of the connector from the sleeve-like boot 217 disposed to extend backward from the screwed ring member 216.

The grip 218 shown in FIG. 38 can be attached to the outside of the housing 214 so as to slide within a movable range in the front-rear direction guaranteed by externally inserting the grip to the housing 214 from the front side (connector front side) of the optical fiber connector 210.

When it is intended to install the grip 218 in the optical fiber connector 210 with the cap 150 attached thereto, that is, the cap-attached optical fiber connector 210A shown in FIG. 31, having been completely assembled to the terminal of the optical fiber cord 2, the cap 150 is detached from the optical fiber connector 210 and the grip 218 is externally inserted onto the housing 214 from the front side of the optical fiber connector 210.

As described above, in the course of assembling the optical fiber connector 210 to the terminal of the optical fiber cord 2, by attaching the cap 150 to the housing 214 in the step of assembling the housing 214, the front end portions of the tensile fiber sets 2h extending from the terminal of the optical fiber cord 2 can be hooked on (wound on or bound to) and detained in the hooking protrusion 152 of the cap 150 and thus tension can be applied to the tensile fiber sets 2h.

Accordingly, without using a conventional swaging tool, the work of fixing the tensile fiber sets 2h to the rear end of the housing 214 can be carried out in the state where tension is applied to the tensile fiber sets 2h.

Fourth Embodiment

A fourth embodiment of the invention will be described below.

Figure 39:
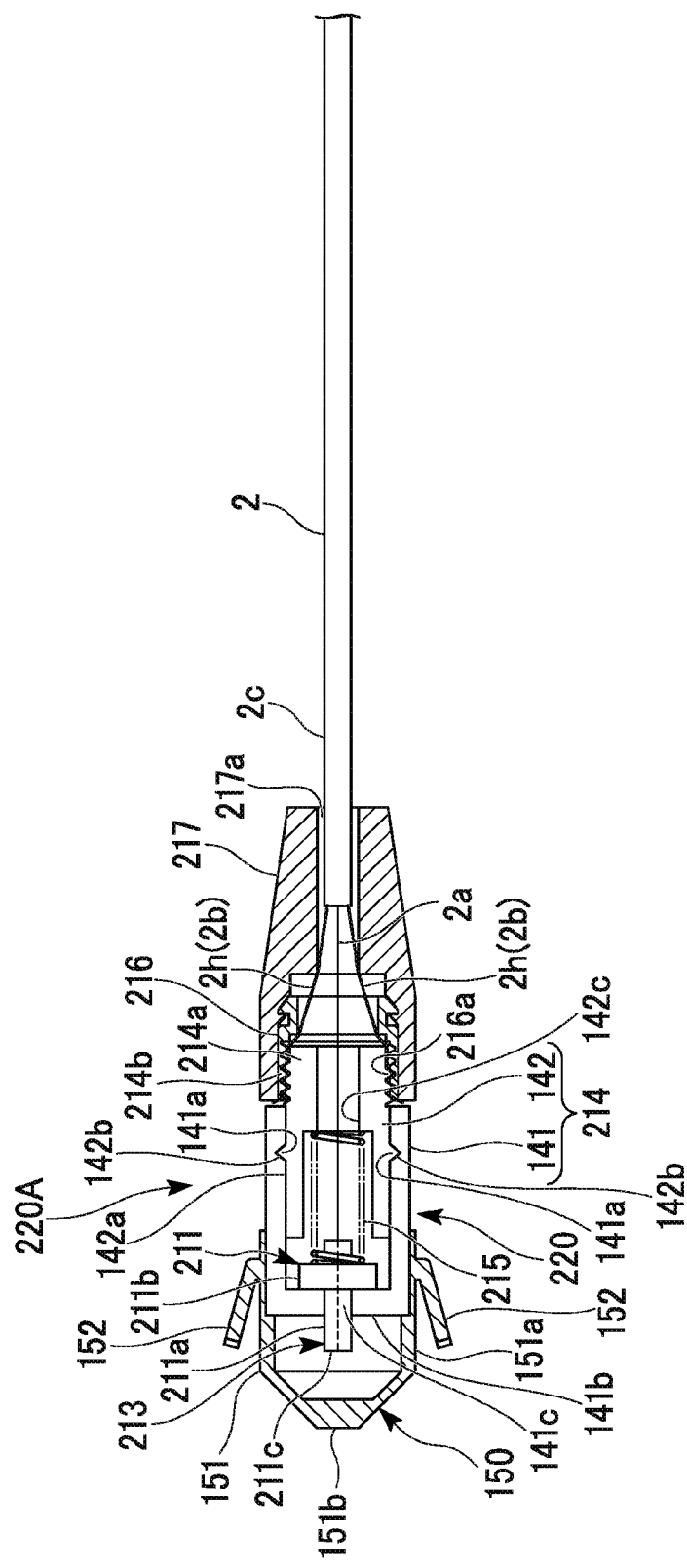
FIG. 39 is a sectional view illustrating the optical fiber connector and the cap-attached optical fiber connector according to the first embodiment of the invention.

As shown in FIG. 39, an optical fiber connector 20 according to this embodiment is different from the optical fiber connector 210 according to the third embodiment, in that the ferrule 211 directly attached to the front end of the optical fiber 2a drawn out from the terminal of the optical fiber cord 2 instead of the optical-fiber-attached ferrule 213 described in the third embodiment is received in the housing 214.

The constitutions other than the constitution in which the ferrule 211 directly attached to the front end of the optical fiber 2a is received in the housing 214 are equal to those of the optical fiber connector 210 according to the third embodiment.

Figure 41:
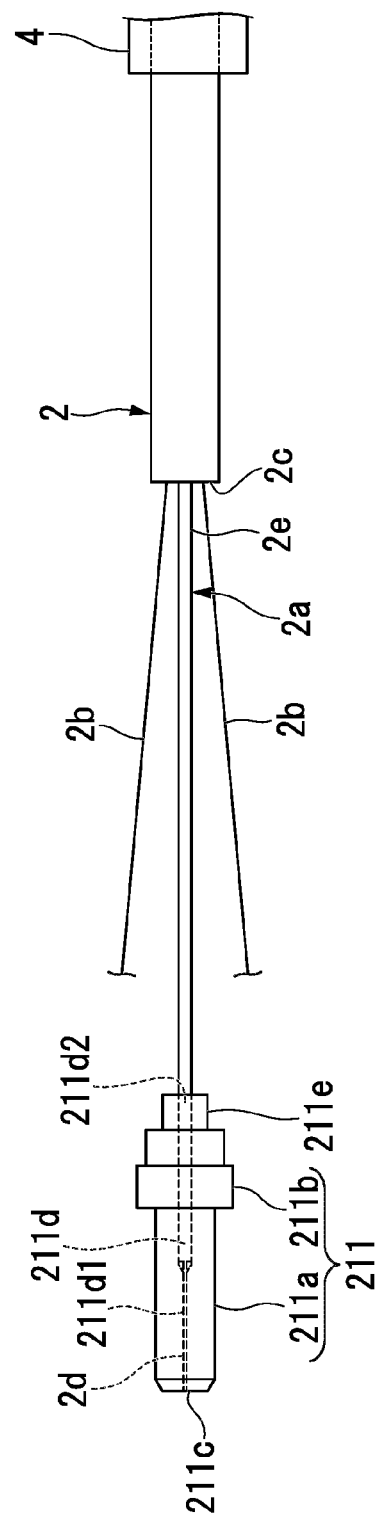
FIG. 41 is a diagram illustrating a step of attaching a ferrule to a tip of an optical fiber extending from the terminal of an optical fiber cord in the optical fiber connector assembling method according to the fourth embodiment.

The front end of the optical fiber 2a drawn out from the terminal of the optical fiber cord 2 is inserted into the ferrule 211. As shown in FIG. 41, the optical fiber 2a is attached and fixed to the ferrule 211 by inserting the bare optical fiber 2d drawn out from the front end thereof into the positioning hole 211d1 (see FIG. 35) of the fiber hole 211d of the ferrule 211 and inserting the front end portion of the coated portion coated with the coating material 2e into the coated portion receiving hole 211d2. The joint end face 211c of the ferrule 211 is polished, for example, after the optical fiber 2a is inserted and fixed.

The optical fiber connector 20 is assembled by attaching the ferrule 211 to the front end of the optical fiber 2a, assembling the housing 214 to receive the ferrule 211 and the spring 215 as shown in FIG. 40A, fixing the tensile fiber sets 2h of the optical fiber cord 2 to the screwed tube 214a of the rear end portion of the housing 214 through the sequence of the tensile member fixing step described in the third embodiment as shown in FIGS. 40A and 40B, and then externally inserting and fixing the tensile fiber sets to the screwed ring member 216 attached to the rear end portion (the screwed tube 214a) of the housing 214.

As shown in FIGS. 40A and 40B, since the work of fixing the tensile fiber sets 2h of the optical fiber cord 2 to the screwed tube 214a of the rear end portion of the housing 214 is performed in the state where the tensile fiber sets 2h are hooked on and detained in the hooking protrusions 152 protruding from the cap body 151 of the cap 150 attached to the front end portion of the housing 214 through the sequence of the tensile member fixing step described in the third embodiment, it is possible to obtain a cap-attached optical fiber connector 20A in which the cap 150 is attached to the front end portion of the optical fiber connector 20 at the same time as the assembly of the optical fiber connector 20 is completed.

Fifth Embodiment

A fifth embodiment of the invention will be described below.

The invention may be applied to the assembling of the optical fiber connector to the terminal of a multi-core optical fiber cord (optical transmission medium).

FIG. 42 shows an optical fiber connector 100 according to this embodiment and FIG. 43 shows an important part of the optical fiber connector 100. The optical fiber connector 100 has a constitution in which the other end portion 43 of an inserted optical fiber 40 of which one end portion 42 is fixed to a ferrule 280 is fusion-spliced to a front end portion 46 of an external optical fiber 45 and a spliced point reinforcing portion 50 in which the fusion-spliced portion 44 is pinched and reinforced between a pair of reinforcing members 51 and 54 is received in a housing or the like.

In the following description, in order to distinguish both sides in the length direction (the lateral direction in FIG. 42) of an optical fiber, the side which a joint end face 281 of the ferrule 280 faces (the left side in FIG. 42) may be referred to as "front side" and the opposite side (the right side in FIG. 42) may be referred to as "rear side". The front side is also referred to as a "front end" and the opposite side (the right side in FIG. 42) thereof is also referred to as a "rear end".

An external optical fiber 45 is formed of an optical transmission medium such as an optical fiber cord or an optical fiber cable having an optical fiber. In this embodiment, the external optical fiber 45 is an optical fiber cord including a multi-core optical fiber core 47 including an optical fiber tape core in which a plurality optical fibers (optical fiber wires, which are not shown) are arranged in parallel in the lateral direction perpendicular to the length direction thereof, a tubular sheath 48 (outer shell, externally-inserted film) surrounding the multi-core optical fiber core 47, and a tensile fiber 49 received between the optical fiber core 47 and the sheath 48.

In the front end portion 46 of the external optical fiber 45, the resin coating of the optical fiber core 47 and the resin coating of the optical fiber wires are removed and each of a plurality of bare optical fibers (parts of core and clad) are separated.

Examples of the number of bare optical fibers 46 (the number of cores) included in the optical fiber core 47 include 2, 4, 8, and 12. In FIG. 42A, the 12-core constitution is simplified and only 6 cores are shown. The optical fiber cord in this embodiment has a constitution in which a single optical fiber tape core is received in a sheath, but is not particular to this constitution. For example, a constitution in which a plurality of single-core optical fiber cores are received in a single sheath, a constitution in which a plurality of optical fiber tape cores are received in a single sheath, and a constitution in which one or more optical fiber tape cores and signal-core optical fiber cores are received in a single sheath can be employed as the constitution of the external optical fiber.

Since an alignment mechanism such as a V groove is not necessary for a pair of reinforcing members 51 and 54 to be described later, the number of cores of the optical fiber which are held between a pair of reinforcing members 51 and 54 is not specified depending on the structure of a pair of reinforcing members 51 and 54, as long as it can be received within the width range of adhesion layers 53 and 56. The specification of a pair of reinforcing members 51 and 54 applied to optical fiber connectors with different numbers of cores such as 2 cores, 4 cores, 8 cores, and 12 cores can be used in common. That is, by changing only the ferrule to a ferrule having a suitable number of cores, an optical fiber connector having a different number of cores can be constructed, thereby contributing to a decrease in cost.

The sheath 48 is formed of a resin such as polyethylene and preferably has flexibility. A plurality of tensile fibers 49 extend along the length direction of the optical fiber and functions as a tensile member accepting a tensile force (tension) to the optical transmission medium. The fiber material used for the tensile fiber 49 is not particularly limited as long as it can provide a necessary tensile strength, and examples thereof include aramid fiber, glass fiber, and carbon fiber.

The tensile member or the sheath is not essential to the invention. For example, an optical fiber core or an optical fiber tape core not having a sheath may be used as the external optical fiber. In some structures of an optical fiber cable or the like, metal wires such as steel wires or various wires such as fiber-reinforced plastic (FRP) may be used as the tensile member.

The inserted optical fiber 40 is an optical fiber of which one end portion 42 is fixed to the ferrule 280 and of which the other end portion 43 protrudes (extends) backward from the ferrule 280. In this embodiment, the inserted optical fiber 40 includes a multi-core optical fiber core 41 which is an optical fiber tape core, and the resin coating of the optical fiber core 41 and the resin coating of the optical fiber wires are removed in one end portion 42 and the other end portion 43 of the optical fiber core 41 so as to separate into a plurality of bare optical fibers (parts of cores and clads).

The optical fiber used as the inserted optical fiber 40 is not limited to the multi-core optical fiber, but a structure in which one or more short single-core optical fibers are inserted into a single ferrule, a structure in which one or more optical fiber tape cores and single-core optical fiber cores are received in a single ferrule, or the like may be employed.

Figure 43B:
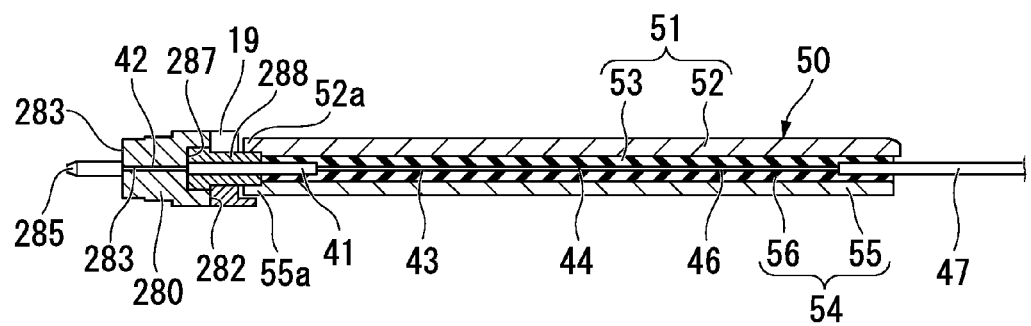
FIG. 43B is a sectional view illustrating the part (the splice reinforcing portion and the vicinity thereof) of the optical fiber connector shown in FIGS. 42A and 42B and is a sectional view taken along a plane perpendicular to the plane shown in FIG. 43A and parallel to the length direction of the optical fiber.
Figure 44:
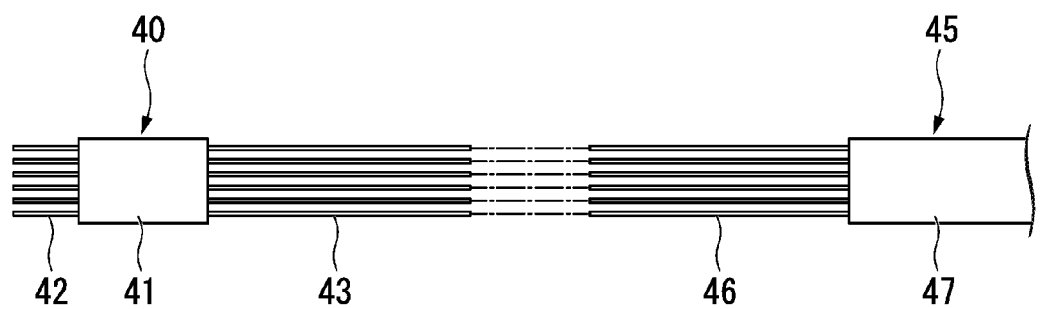
FIG. 44 is a diagram illustrating the relationship between the other end portion of the inserted optical fiber and the front end portion of the external optical fiber in the splice reinforcing portion shown in FIGS. 43A and 43B.

As shown in FIG. 44, the other end portion 43 of the inserted optical fiber 40 and the front end portion 46 of the external optical fiber 45 correspond to each other in a one-to-one manner and are fusion-spliced to each other. As shown in FIG. 43, the fusion-spliced portion 44 of the other end portion 43 of the inserted optical fiber 40 and the front end portion 46 of the external optical fiber 45 is pinched between a pair of reinforcing members 51 and 54 to reinforce the fusion-spliced portion. The ferrule 280 around the inserted optical fiber 40 is not shown in FIG. 44, but one end portion 42 of the inserted optical fiber 40 is preferably fixed into an optical fiber insertion hole 283 (fiber hole) of the ferrule 280 before the fusion-splice to the external optical fiber 45.

As shown in FIG. 43, the ferrule 280 includes a front end face (joint end face) 281 butt-jointed to a ferrule (not shown) of another optical fiber connector, a rear end face 282 which is the opposite end face of the joint end face 281, optical fiber insertion holes (micro holes) 283 opened in the joint end face 281, and a boot-receiving hole 287 opened in the rear end face 282. The ferrule 280 can be formed, for example, as an integrated molded product formed of plastic. The joint end face 281 of the ferrule 280 may be a vertical face perpendicular to the central axis (substantially matched with the optical axis of the optical fiber 42) of the optical fiber insertion holes 283, or may be an inclined face inclined in a predetermined direction corresponding to a ferrule of another optical fiber connector.

The optical fiber insertion holes 283 are formed in the same number as the number of optical fibers in one end portion 42 of the inserted optical fiber 40. For example, a method of injecting an adhesive into the optical fiber insertion holes 283 to adhere to the bare optical fibers can be simply used as the method of fixing the bare optical fibers which are one end portion 42 of the inserted optical fiber 40 to the ferrule 280. The optical fiber insertion holes 283 are connected to the boot-receiving hole 287. A ferrule boot 288 is attached around the optical fiber core 41 and is received in the boot-receiving hole 287. The ferrule boot 288 is preferably formed of a flexible material such as rubber or elastomer, but the ferrule boot 288 may be formed of a material such as a resin or a metal having low flexibility.

Examples of the number of optical fiber insertion holes 283 (the number of cores) formed in the ferrule 12 include 2, 4, 8, and 12. In FIG. 42A, the structure of 280 cores is simplified and only 6 cores are shown. In the optical fiber connector 100 according to this embodiment, a single-core ferrule may be used as the ferrule 280.

The optical fiber insertion holes 283 on the joint end face 281 of the multi-core ferrule 280 are arranged in a line to match with the arrangement of optical fibers pinched between the reinforcing members 51 and 54 to be described later. The invention is not limited to the constitution in which the arrangement of optical fibers in the ferrule 280 is set to be the same as the arrangement of optical fibers in the splice reinforcing portion 50, but the arrangement of optical fibers separated for each core between the ferrule 280 and the splice reinforcing portion 50 may be changed.

For the purpose of alignment when coupling the ferrule 280 to another ferrule of another optical fiber connector, a guide pin 285 passing through the joint end face 281 and the rear end face 282 may be provided (a pin fitting positioning type). The tip of the guide pin 285 protrudes from the joint end face 281 and the guide pin is inserted into a guide pin insertion hole (not shown) formed in the ferrule of another optical fiber connector to suppress the shaking in the direction along the joint end face 281 (such as the vertical direction in FIG. 43A, the vertical direction in FIG. 43B, or an inclined direction obtained by combining the directions). When a guide pin is provided to a ferrule of another optical fiber connector, a guide pine insertion hole is provided to the ferrule 280. A hole formed as a trace of pulling out the guide pin 285 from the ferrule 280 may be used as the guide pin insertion hole 285a. Alternatively, the ferrule 280 having a guide pin insertion hole formed thereon instead of the guide pin 285 may be used at the first time.

Preferably, the guide pin 285 can be attached and detached by the insertion and the pulling-out into and from the guide pin insertion hole 285a, since it can be easily determined on the splicing site with which of the optical fiber connector 100 and another optical fiber connector to provide the guide pin. For example, when the jointed state of the optical fiber connector 100 and another optical fiber connector is released, a pin clamp 19 is disposed on the rear end face 282 of the ferrule 280 so as to prevent the guide pin 285 from being unintentionally pulled out. In this embodiment shown in FIG. 42, the pin clamp 19 fills a gap between the ferrule 280 and the splice reinforcing portion 50 and includes a spring seat 20 for accepting an impelling force (pressing force based on elasticity) from a ferrule spring 24. Accordingly, even when the guide pin 285 is not installed in the ferrule 280, the pin clamp 19 is attached to the ferrule 280. The pin clamp 19 can be inserted into and fixed to the ferrule 280 by, for example, irregularity or the like (not shown).

The guide pin 285 may be fixed to the guide pin insertion hole 285a (for example, by adhesion or embedment through insert molding) for use.

An example of the reinforcing members 51 and 54 (pinch members) used in this embodiment is shown in FIGS. 45 to 48. The first reinforcing member 51 used in the upper side of FIG. 43B is shown in FIG. 45A and the second reinforcing member 54 used in the lower side of FIG. 43B is shown in FIG. 45B. In this embodiment, the reinforcing members 51 and 54 includes reinforcing member bodies 52 and 55 (pinch member bodies) formed of a hard material such as a resin or a metal and adhesion layers 53 and 56 disposed on the inner surfaces coming in contact with the other end portion 43 of the inserted optical fiber 40 and the front end portion 46 of the external optical fiber 45, respectively.

Figure 49:
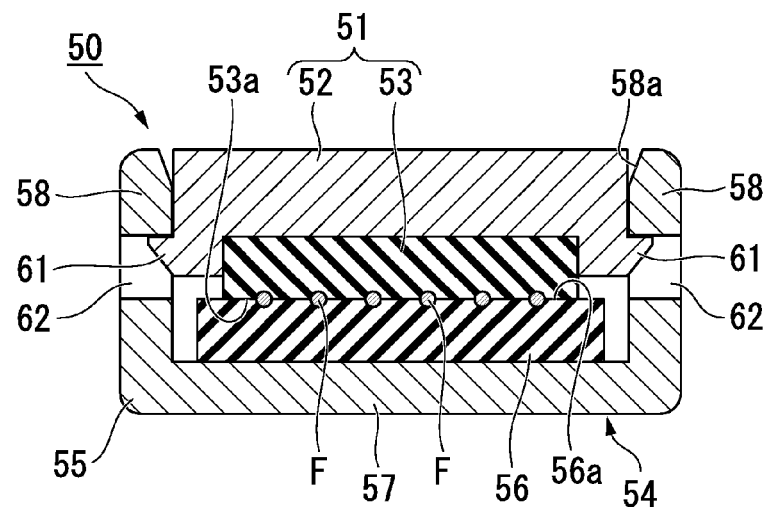
FIG. 49 is a sectional view illustrating a state where the pair of reinforcing members shown in FIGS. 45A and 45B is integrated and a fusion-spliced portion in which optical fibers are fusion-spliced is pinched therebetween.

As shown in FIG. 49, the adhesion layers 53 and 56 are depressed at the position where the inserted optical fiber and the external optical fiber (which are comprehensively represented by the optical fibers F in FIG. 49) come in contact with each other to closely adhere to the outer circumferential surfaces of the optical fibers F in the vicinity of the fusion-spliced portion 44. Accordingly, a mechanism such as a V groove or a U groove used to align the optical fibers is not necessary to form in the inner surfaces of the reinforcing members. In this embodiment, since the other end portion 43 of the inserted optical fiber 40 and the front end portion 46 of the external optical fiber 45 are fusion-spliced in advance, the splice loss is small and the loss is not increased due to the axial misalignment (misalignment of the optical axes) of both optical fibers or the separation of the end faces.

In the case of the groove-like mechanism such as a V groove or a U groove, when the outer diameter in the vicinity of the fusion-spliced portion 44 is greater than the original outer diameter of the optical fibers (before the fusion splice), an excessive pressing force acts on the fusion-spliced portion 44, thereby shortening the lifetime. On the other hand, when the outer diameter in the vicinity of the fusion-spliced portion 44 is smaller, the positioning of the optical fibers is not stabilized and the positions of the optical fibers may be misaligned in the lateral direction in the grooved mechanism. On the contrary, when the adhesion layers 53 and 56 have deformability following the outer circumferential surface of the optical fibers F, the positioning of the optical fibers F is stabilized, thereby suppressing the warp of the optical fibers F with the lapse of time or the increase in loss.

In this embodiment, as shown in FIG. 49, at the position where the optical fibers F in the fusion-spliced portion 44 are pinched between a pair of reinforcing members 51 and 54, the adhesion layers 53 and 56 of the pair of reinforcing members 51 and 54 closely adhere to each other on both sides (on both sides in the width direction perpendicular to the length direction) of the optical fibers F. Accordingly, it is possible to suppress the warp of the optical fibers F with the lapse of time or the increase in loss. Since there is no gap between the opposed adhesion layers 53 and 56, it is possible to prevent the permeation of moisture or the like which may adversely influence the lifetime of bare optical fibers (particularly, in the case of quartz optical fibers). When an opaque material is used for the adhesion layers 53 and 56, it is possible to prevent the leakage of light (leaking light) from the gap between the adhesion layers 53 and 56.

The adhesion layers 53 and 56 are preferably formed of a flexible elastic material such as rubber or elastomer. Accordingly, when the optical fibers F are pinched between the adhesion layers 53 and 56 with a pressing force, the adhesion layers are depressed at the position where they come in contact with the optical fibers F and thus more closely adhere to the outer circumferential surfaces of the optical fibers F with the elastic force of the adhesion layers 53 and 56. The elastic force of the adhesion layers 53 and 56 has such a magnitude that the original flat surface is restored, when the pressing force is released after the depression.

When a foamed material is used for the adhesion layers 53 and 56, it is preferable that bubbles be small and the bubbles be independent of each other (the bubbles be not connected). An adhesive (pressure-sensitive adhesive) may be used as the adhesion layers 53 and 56, but it is preferable that the adhesion layers 53 and 56 be non-adhesive (the adhesive force is small or zero to such an extent that the bare optical fibers 43 and 46 can be easily detached after the temporary disposing) so as to dispose the bare optical fibers 43 and 46 again after temporarily disposing them. When the adhesive force of the surfaces of the adhesion layers 53 and 56 is weak, it is difficult to cause the adhesion layers 53 and 56 to closely adhere to the bare optical fibers 43 and 46. Accordingly, it is preferable that the positional relationship between the first reinforcing member 51 (the first pinch member) and the second reinforcing member 54 (the second pinch member) be fixed to maintain appropriate pressing forces from both sides.

Figure 45B:
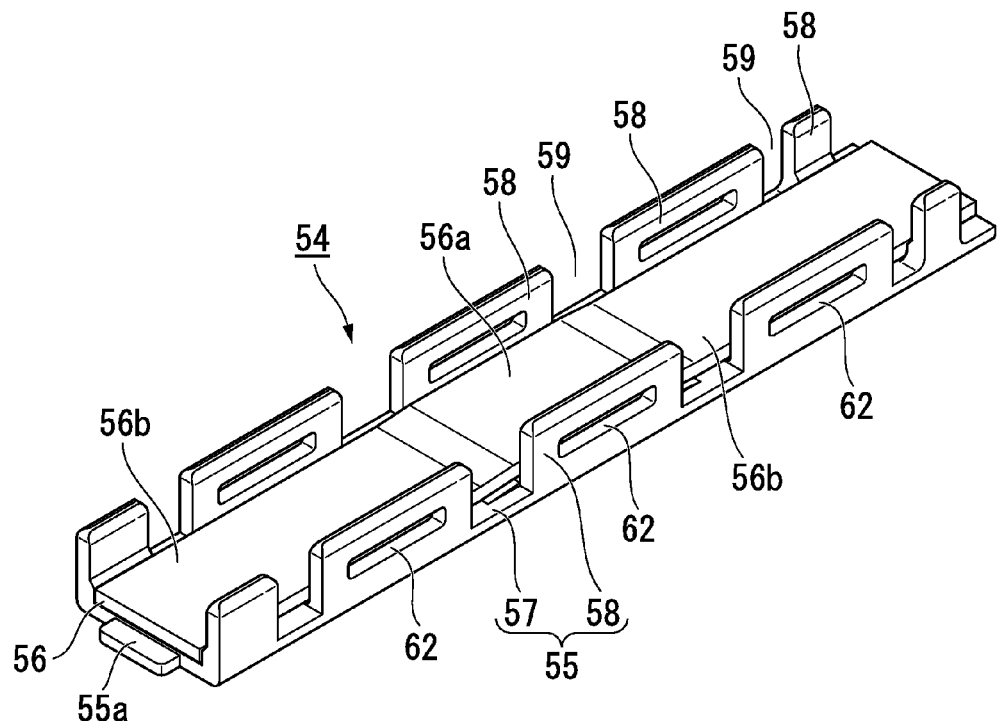
FIG. 45B is a perspective view illustrating a second reinforcing member of the splice reinforcing portion shown in FIGS. 43A and 43B.
Figure 46:
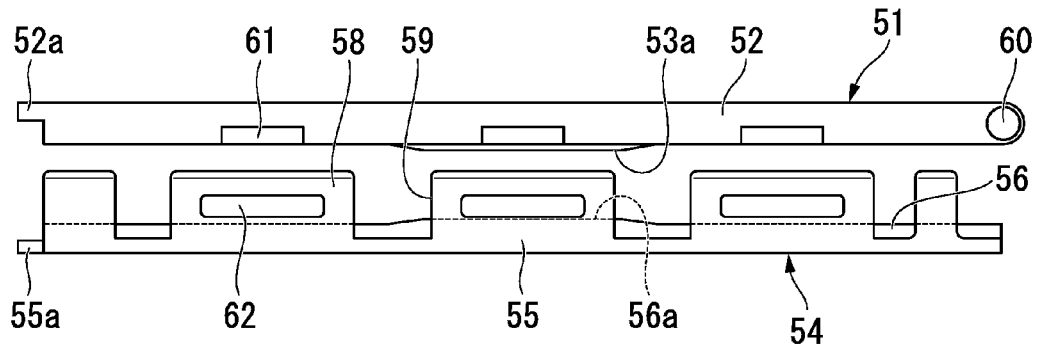
FIG. 46 is a diagram illustrating a method of incorporating the pair of reinforcing members shown in FIGS. 45A and 45B.
Figure 47:
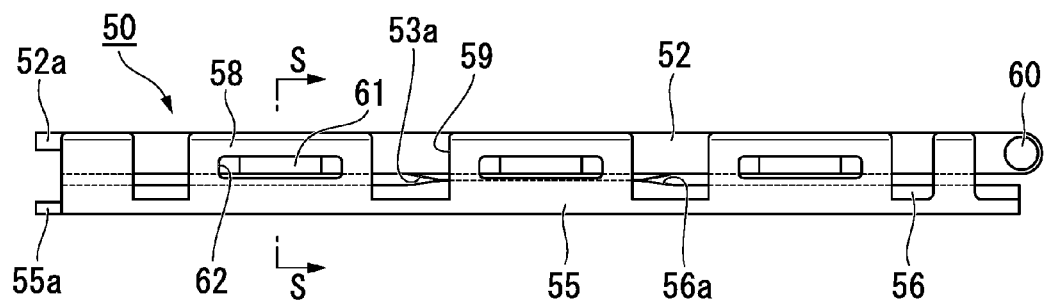
FIG. 47 is a diagram illustrating a method of incorporating the pair of reinforcing members shown in FIGS. 45A and 45B.

As shown in FIGS. 45 to 47, a pair of reinforcing members 51 and 54 includes protuberance portions 61 and recessed portions 62, respectively, engaging with each other on both sides in the width direction (the direction perpendicular to the paper surface of FIGS. 46 and 47) which is the direction perpendicular to the length direction of the inserted optical fiber 40 and the external optical fiber 45. By causing the protuberance portions (engaging protuberance portions) 61 and the recessed portions (engaging recessed portions) 62 to engage with each other, the state where the adhesion layers 53 and 56 of the pair of reinforcing members 51 and 54 closely adhere to each other is maintained. Accordingly, even when the adhesion therebetween is not maintained with only the adhesive force between the adhesion layers 53 and 56, it is possible to cause the adhesion layers 53 and 56 to satisfactorily closely adhere to each other and thus to prevent the first reinforcing member 51 and the second reinforcing member 54 from being separated from each other.

In this embodiment, as shown in FIG. 45B, the body 55 of the second reinforcing member 54 includes a bottom portion 57 and side wall portions 58 and 58 formed on both sides in the width direction thereof and the engaging recessed portion 62 is a through-hole formed in the side wall portions 58. Accordingly, it is possible to easily confirm the engagement state of the engaging recessed portions 61 from the outside with the naked eye or a magnifier. From the viewpoint of the incorporation of the reinforcing members 51 and 54, only the inner surfaces of the side wall portions 58 to form holes (blind holes) not penetrating the outer surface as the engaging recessed portions. Instead of forming the engaging protuberance portions in the first reinforcing member and forming the engaging recessed portions in the second reinforcing member 54, the engaging protuberance portions may be formed in the second reinforcing member and the engaging recessed portions may be formed in the first reinforcing member 54. Various combinations such as a combination of alternately forming the engaging protuberance portion and the engaging recessed portion in the first reinforcing member and alternately forming the engaging recessed portion and the engaging protuberance portion in the second reinforcing member so as to be complementary thereto may be employed.

Figure 48:
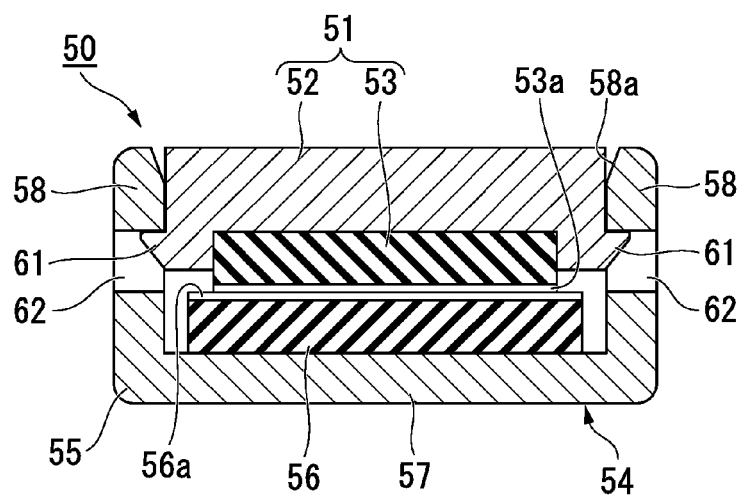
FIG. 48 is a sectional view illustrating the relationship between adhesion layers of the reinforcing members when the pair of reinforcing members shown in FIGS. 45A and 45B is integrated.

The side wall portion 58 of the second reinforcing member 54 is divided into a plurality of parts (tongue-shaped parts) by cutouts 59 and one or less engaging recessed portions 62 are disposed on one side. Accordingly, as shown in FIG. 48, when the first reinforcing member 51 is interposed between the pair of side wall portions 58 opposed to each other in the width direction, the side wall portions 58 having the engaging recessed portions 62 can be independently opened and closed. Even when a set of engaging portions is loosened, the other engaging portions are not loosened therewith. In the front end portions (the upper side of FIG. 48) of the side wall portions 58 protruding from the bottom wall portion 57, an inclined surface 58a is formed on the inner surface side of the side wall portion 58. Accordingly, it is possible to easily interpose the first reinforcing member 51 between the pair of side walls 58 opposed to each other in the width direction. When the engaging protuberance portions 61 and the engaging recessed portions 62 are disengaged from each other after the pair of reinforcing members 51 and 54 are combined, a tool may be inserted into the clearance between the inclined surface 58a of the side wall portion 58 and the first reinforcing member body 52 to easily push and open the side wall portion 58 to the outside in the width direction.

The adhesion layers 53 and 56 in this embodiment include swelled portions 53a and 56a of which the surface is raised higher in the vicinity of the fusion-spliced portion 44 and thus the pressing force can be kept higher between the swelled portions 53a and 56a. Alleviated portions 53b and 56b which are lower in height than the swelled portions 53a and 56a and which are alleviated in pressing force are disposed on both sides of the swelled portions 53a and 56a (on both sides in the length direction of the bare optical fibers 43 and 46). Examples of a method of forming the swelled portions 53a and 56a include a method of forming protrusions in the reinforcing member bodies 52 and 55 in the back of the adhesion layers 53 and 56 and a method of partially increasing the thicknesses of the adhesion layers 53 and 56.

The sets of engaging portions including the sets of the engaging protuberance portions 61 and the engaging recessed portions 62 are disposed in the length direction of the optical fibers. Specifically, one set (or two or more sets) is disposed at the position of the swelled portions 53a and 56a, one set (or two or more sets) is disposed at the position of the alleviated portions 53b and 56b on the side of the inserted optical fiber 40, and one set (or two or more sets) is disposed at the position of the alleviated portions 53b and 56b on the side of the external optical fiber 45. Accordingly, the pressing force applied to the fusion-spliced portion 44 from the swelled portions 53a and 56a can be adjusted by adjusting the positional relationship of the engaging portions in the swelled portions 53a and 56a. Even when the pressing force of the swelled portions 53a and 56a is excessively strong and the engaging portions are loosened due to the repulsive force between the swelled portions 53a and 56a, the engaging portions in the alleviated portions 53b and 56b are not loosened well, thereby preventing the first reinforcing member 51 and the second reinforcing member 54 from being separated from each other.

As shown in FIG. 43B, a ferrule boot 288 covering the part of the inserted optical fiber 40 extending from the ferrule 280 is attached to the ferrule 280. The pair of reinforcing members 51 and 54 (specifically, the bodies 52 and 55 thereof) include protrusions serving as boot clamping portions 52a and 55a at ends close to the ferrule 280 and the ferrule boot 288 is clamped between the boot clamping portions 52a and 55a. Accordingly, both ends of the ferrule boot 288 is tightly held between the ferrule 280 and the pair of reinforcing members 51 and 54, thereby satisfactorily preventing the warp or damage of the inserted optical fiber 40.

The method of assembling the optical fiber connector 100 according to this embodiment includes a step of fusion-splicing the other end portion 43 of the inserted optical fiber 40, of which one end portion 42 is fixed to the ferrule 280 and of which the other end portion 43 protrudes from the ferrule 280, to the front end portion 46 of the external optical fiber 45 and then pinching the fusion-spliced portion 44 between the pair of reinforcing members 51 and 54 to integrate them into a body. Accordingly, the adhesion layers 53 and 56 disposed on the inner surfaces of the reinforcing members 51 and 54 can be caused to closely adhere to the outer circumferential surfaces of the bare optical fibers 43 and 46 in the fusion-spliced portion 44.

Figure 50:
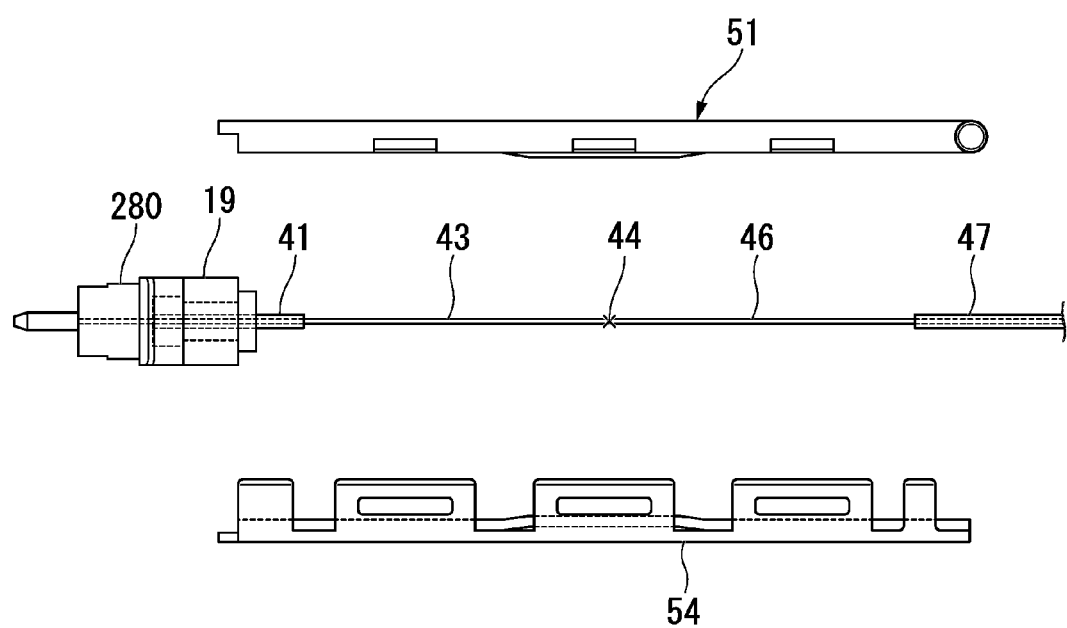
FIG. 50 is a sectional view illustrating the work of incorporating a pair of reinforcing members and pinching a fusion-spliced portion in which optical fibers are fusion-spliced therebetween in a step of assembling the optical fiber connector shown in FIGS. 42A and 42B.
Figure 51A:
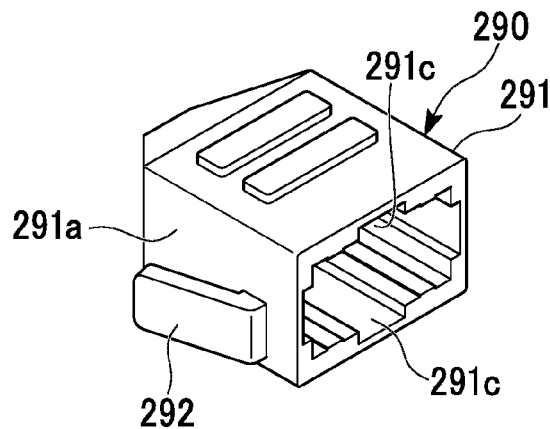
FIG. 51A is a perspective view illustrating the structure of an optical fiber connector cap which can be attached to the front end portion of the optical fiber connector shown in FIGS. 42A and 42B.
Figure 51B:
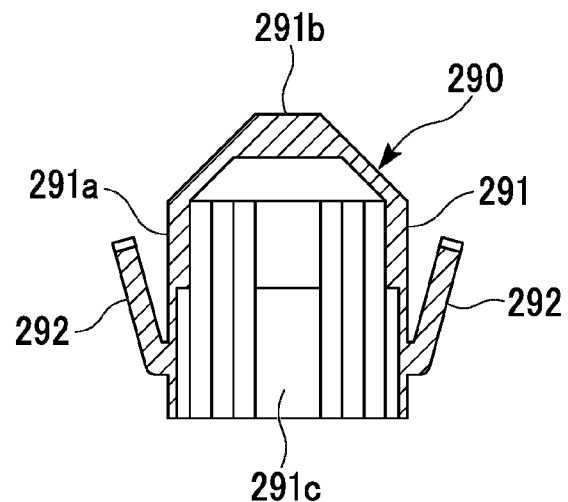
FIG. 51B is a perspective view illustrating the structure of the optical fiber connector cap which can be attached to the front end portion of the optical fiber connector shown in FIGS. 42A and 42B.
Figure 51C:
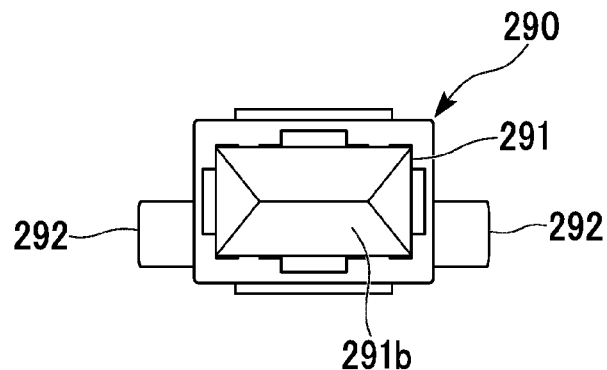
FIG. 51C is a perspective view illustrating the structure of the optical fiber connector cap which can be attached to the front end portion of the optical fiber connector shown in FIGS. 42A and 42B.

As shown in FIG. 50, a structure in which the other end portion 43 of the inserted optical fiber 40 protruding from the ferrule 280 is fusion-spliced to the front end portion 46 of the external optical fiber 45 is prepared. The fusion-spliced portion 44 is pinched between a pair of reinforcing members 51 and 54 to integrate them into a body.

In this embodiment, a ferrule to which the guide pin 285, the ferrule boot 288, the pin clamp 19, and the internal optical fiber 40 are attached in advance is used as the ferrule 280 and the other end portion 43 of the inserted optical fiber 40 has only to be fusion-spliced to the front end portion 46 of the external optical fiber 45 on the splicing site. When the pin clamp 19 can be attached and detached after assembling the splice reinforcing portion 50, the assembling work may be performed in a state where the guide pin 285 or the pin clamp 19 is detached from the ferrule 280.

By assembling the housing H or the like receiving the ferrule 280 and the splice reinforcing portion 50 after assembling the splice reinforcing portion 50 to the rear side of the ferrule 280, the optical fiber connector 100 shown in FIG. 31 can be completed.

The optical fiber connector 100 described in this embodiment is a multi-core optical fiber connector and the example shown in the drawings is an MPO type optical fiber connector (F13 type multi-core optical fiber connector defined in the JIS C5982, MPO: Multi-fiber Push On). The optical fiber connector applicable to the invention is not limited to the single-core type or the multi-core type.

The housing H of the optical fiber connector 100 includes a sleeve-like (tubular) plug frame 21 and a sleeve-like (tubular) stop ring 30 attached to the rear end of the plug frame 21. The side surface of the ferrule 280 is held from the surrounding by the front opening 22 of the plug frame 21. An engaging claw 33 which can engage with an engaging window 27 formed in the side wall portion of the plug frame 21 is formed in the outer surface of the stop ring 30 so as to integrate the plug frame 21 and the stop ring 30 into a body. The ferrule spring 24 is disposed around the splice reinforcing portion 50, the front end of the spring 24 is brought into contact with the spring seat 20 at the rear end of the pin clamp 19, and the rear end of the spring 24 is brought into contact with the spring seat 31 at the front end of the stop ring 30.

When the joint end face 281 of the ferrule 280 is jointed to a ferrule of another optical fiber connector, the ferrule 280 is guided in the opening 22 and pushed backward to contract the ferrule spring 24, an appropriate force acts between the joint end face 281 of the ferrule 280 and a joint end face of a ferrule of another optical fiber connector, thereby bringing the joint end faces into close contact with each other. When the joint between the ferrule 280 and the ferrule of another optical fiber connector is released, the ferrule spring 24 is stretched and the ferrule 280 moves in the opening 22 and is restored to the original position.

An engaging portion 23 used for the MPO type connector plug to engage with an engaging claw (not shown) of an MPO type connector adaptor or a receptacle is disposed on both sides (both side in the vertical direction in FIG. 42A) in the width direction of the plug frame 21. A coupling 25 is disposed on the outer circumference of the plug frame 21, and a pair of coupling springs 26 and 26 is received between the outer circumferential surface of the plug frame 21 and the inner circumferential surface of the coupling 25. Accordingly, the coupling 25 can move forward and backward relative to the plug frame 21 with the stretching and contracting of the coupling springs 26 and 26. The engaging portion 23 or the coupling 25 has the same constitution as defined in the JIS or the like as the MPO type connector plug.

When the invention is applied to different types of optical fiber connectors, the constituents required for the joint (connector joint) of the optical fiber connectors are installed in the ferrule or the housing.

In the optical fiber connector 100 shown in FIG. 42, a cap 290 is provided to protect the front end portion of the ferrule 280 of the optical fiber connector plug or the like. The cap 290 is detached in use (at the time of jointing to another optical fiber connector).

The basic structure of the cap 290 is the same as cap 150 described in the third embodiment.

That is, as shown in FIGS. 42A and 42B and FIGS. 51A to 51C, the cap 290 has a constitution in which a hooking protrusion 292 (tensile member detaining portion) used to detain the tensile fiber 49 (also referred to as a tensile fiber set) protrudes from the outer surface of a cap body 291 of a bottomed cylinder which is detachably externally inserted onto the front end portion (the front end portion of the plug frame 21) of the housing H of the optical fiber connector 100.

The cap body 291 of the cap 290 shown in the drawings includes a bottomed cylinder of which one end in the axis direction of a tubular body portion 291a which can be externally inserted onto the front end portion of the housing H of the optical fiber connector 100 is blocked by an end wall 291b, and is externally inserted onto the front end portion of the housing H, that is, the portion of the housing H (specifically, the plug frame 21) protruding more forward from the coupling 25 so as to be attached thereto and detached therefrom.

The hooking protrusion 292 protrudes to be inclined about the axis line of the tubular body portion 292 so that as it goes from the tubular body portion 292 of the cap body 291 to the front end blocked by the end wall 291b of the cap body 291, the distance from the outer circumferential surface of the tubular body portion 292 increases.

In the cap 290 shown in the drawings, the hooking protrusions 292 protrude from both sides with the axis line of the tubular body portion 292 of the cap body 291 interposed therebetween.

The cap 290 is a plastic molded product and can be produced at a low cost.

A key groove 291c fitted to a key 21a formed on one of the side surfaces of the plug frame 21 is formed in the inner surface of the cap 291. The key 21a of the plug frame 21 is conventionally installed to prevent the vertically-reverse use (of the top and bottom in FIG. 42B) of an optical fiber connector plug, and the key groove 291c of the cap 290 is installed on both sides in the vertical direction. Accordingly, it is possible to attach the cap 290 to the optical fiber connector 100 without distinguishing the upside and downside of the cap 290.

A through-hole 32 passing in the front-rear direction (the lateral direction in FIG. 42) along the length direction of the optical fiber is formed in the stop ring 30. The cross-sectional shape (the sectional shape in the plane perpendicular to the length direction of the optical fiber) of the through-hole 32 has at least a size which can receive the shape of the cross-sectional shape of the splice reinforcing portion 50. Accordingly, when the stop ring 30 is pushed in toward the plug frame 21 from the rear side of the splice reinforcing portion 50 in a state where the ferrule 280 is inserted into the opening 22 of the plug frame 21, the stop ring 30 is prevented from interfering with the splice reinforcing portion 50 (hindering the push thereof). When the stop ring 30 is pushed in toward the plug frame 21 from the rear side of the splice reinforcing portion 50, the engaging claw 33 is drawn into the splice reinforcing portion 50 just before the engaging claw 33 reaches the engaging window 27. Accordingly, on the back surface side of the engaging claw 33, a groove 32a is formed in the inner surface of the through-hole 32, thereby avoiding the interference of the splice reinforcing portion 50 with the back surface of the engaging claw 33.

An external screw 34 (a screw portion, a male screw) is formed on the outer circumferential surface of the rear end portion of the stop ring 30. An internal screw 36 (a female screw) formed on the inner circumferential surface of the screw ring 35 (a screwed ring member) can be fastened to the external screw 34. The front end portion of the tensile fiber 49 of the external optical fiber 45 can be pinched and fixed between the external screw 34 and the internal screw 36. The screw ring 35 includes an opening 37 at the rear end thereof, and a part of the tensile fiber 49 of the external optical fiber 45 and the optical fiber core 47 is inserted into the opening 37. The cross-sectional shape (the sectional shape in the plane perpendicular to the length direction of the optical fiber) of the opening 37 preferably has a certain opening size so as to avoid the contact of the tensile fiber 49 with the splice reinforcing portion 50.

A boot 65 for an external optical fiber for protecting the external optical fiber 45 is attached to the outer circumferential surface of the screw ring 35. The boot 65 is generally formed of a flexible material such as rubber or elastomer. In this embodiment, a protective tube 66 is attached around the sheath 48 of the external optical fiber 45 and an annular locking portion 67 having a large diameter at the front end portion of the tube 66 is inserted into the boot 65.

The sequence of assembling the housing or the like is not particularly limited, but the following sequence can be employed as an example.

As an advance preparation before the fusion splice, the ferrule spring 24, the stop ring 30, the screw ring 35, the external optical fiber boot 65, and the protective tube 66 are made to pass around the external optical fiber 45. These components are preferably arranged on the rear side (the right side in FIG. 42) so as not to interfere with the fusion splice.

As described above, the bare optical fibers 43 and 46 are fusion-spliced, the splice reinforcing portion 50 is assembled thereto, the plug frame 21 is attached thereto from the front side (the left side in FIG. 42) of the ferrule 280 to dispose the ferrule 280 in the opening 22 of the plug frame 21, the stop ring 30 is pushed into the plug frame 21 to cause the engaging claw 33 to engage with the engaging window 27, and the ferrule spring 24 is received along with the ferrule 280 and the splice reinforcing portion 50. The cap 290 and the coupling 25 may be attached to the plug frame 21 in advance or may be attached thereto after the cap 290 and the coupling 25 are attached to the stop ring 30.

Figure 52:
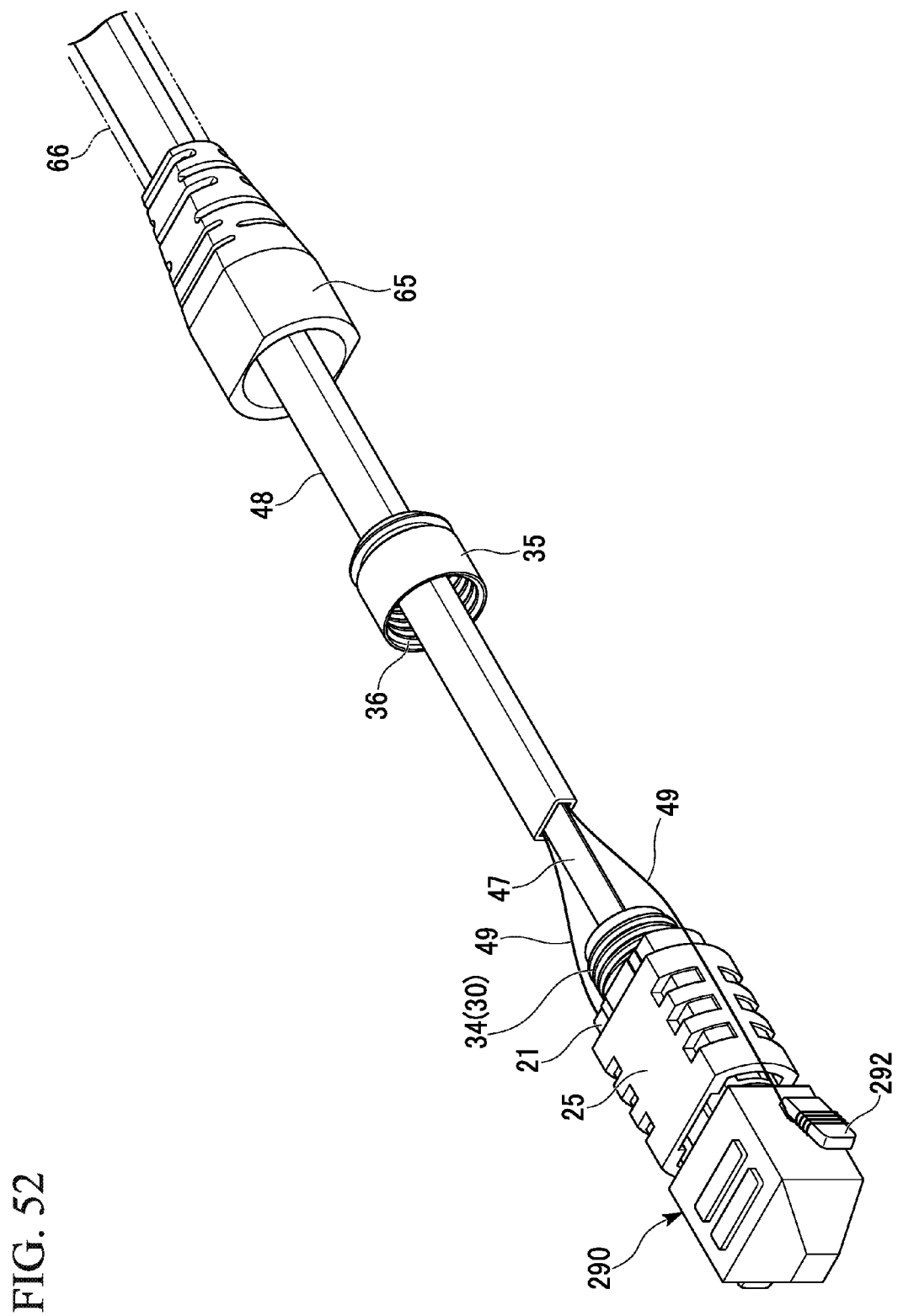
FIG. 52 is a perspective view illustrating a tensile member fixing step in the method of assembling the optical fiber connector shown in FIGS. 42A and 42B.

As shown in FIG. 52, the front end portion of the tensile fiber 49 passes through the external screw 34 of the stop ring 30 and is hooked on and detained in the hooking protrusion 292 of the cap 290 attached to the plug frame 21, tension is applied to the tensile fiber 49, and the internal screw 36 of the screw ring 35 is fastened to the external screw 34 in this state to fix the front end portion of the tensile fiber 49.

When the front end portion of the tensile fiber 49 fixed to the stop ring 30 extends over the outer circumference of the plug frame 21, the tensile fiber is cut out if necessary. The boot 65 is externally inserted onto and attached to the screw ring 35 to receive the rear end of the stop ring 30. The optical fiber connector 100 shown in FIG. 42 can be assembled through this sequence.

It is possible to obtain a cap-attached optical connector 100A having a constitution in which the cap 290 is attached to the front end portion of the optical fiber connector 100 at the same time as completing the assembling of the optical fiber connector 100.

The invention is not limited to the above-mentioned embodiments, but may be appropriately modified in design without departing the concept of the invention.

(1) A swaging fixing method using a swage ring may be employed as the method of fixing the tensile fiber to the housing.

Figure 53A:
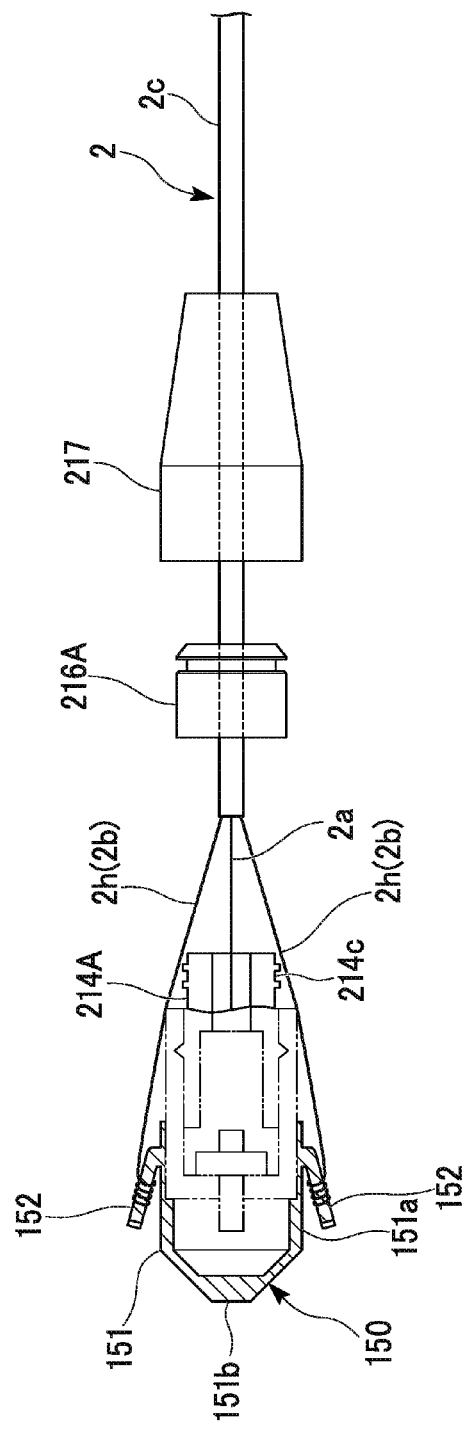
FIG. 53A is a diagram illustrating another example of the tensile member fixing step in the optical fiber connector assembling method according to the invention and is a diagram illustrating a constitution fixing a tensile fiber to a swage ring attachment portion of the housing of the optical fiber connector using a swage ring.
Figure 53B:
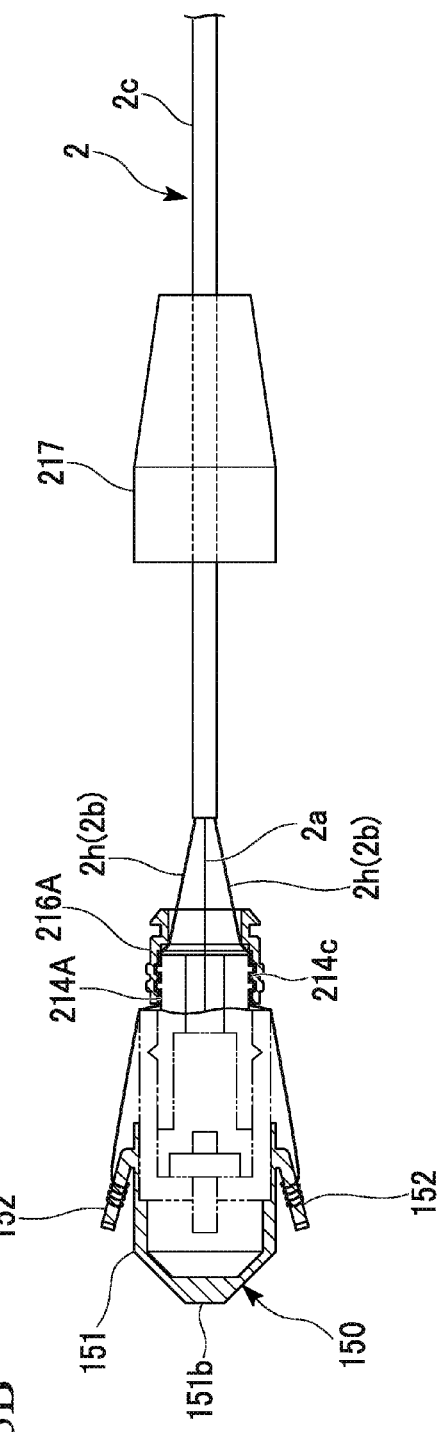
FIG. 53B is a diagram illustrating another example of the tensile member fixing step subsequent to FIG. 53A.

For example, as shown in FIGS. 53A and 53B, a constitution may be employed in which the tensile fiber sets 2*h* can be fixed to the housing 214A by employing a housing 214A which is formed in a sleeve shape receiving a ferrule and which has a swage ring attachment portion 214*c* in which a swage ring 216A is fixed to the outer circumference thereof, detaining the tensile fiber sets 2*h* extending forward from the terminal of the optical transmission medium (the optical fiber cord 2 in FIGS. 53A and 53B) through the vicinity of the swage ring attachment portion 214*c* in the hooking protrusion 152 of the cap 150, and fixing the swage ring 216A to the swage ring attachment portion 214*c* by swaging in this state. A protrusion for partially deforming the swage ring 216A at the time of swaging and enhancing the fixing force of the tensile fibers is formed to protrude from the outer circumference of the swage ring attachment portion 214*c*.

Here, the swaging fixation requires a swaging tool for swaging a swage ring, but the fixation of the tensile fiber based on the screwing of a screwed ring member can be easily embodied by only rotationally operating and screwing the screwed ring member to the screw portion, which is advantageous in that no tool is necessary for the fixation of the tensile fiber.

(2) The method of optically splicing an optical fiber drawn out from the terminal of an optical transmission medium to an inserted optical fiber inserted into and fixed to a ferrule is not particularly limited. For example, a mechanical splicing method of clamping and fixing a pair of optical fibers butt-jointed to each other and maintaining the butt-jointed state may be employed.

(3) The tensile member detaining portion of a cap is not limited to the hooking protrusion, as long as it can detain a tensile fiber.

Figure 54:
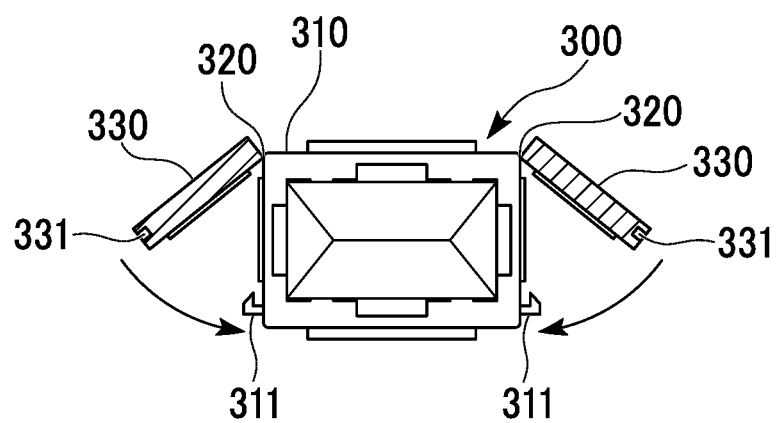
FIG. 54 is a diagram illustrating another example of the optical fiber connector cap according to the invention.

For example, like the cap 300 shown in FIG. 54, a constitution for pinching and fixing a tensile fiber between the outer surface of a cap body 310 and a pressing plate 330 (the tensile member detaining portion) rotatably disposed on both sides of the cap body 310 with a hinge portion 320 interpose therebetween may be employed. The pressing plate 330 of the cap 300 shown in FIG. 54 can maintain the state where it is closed with respect to the outer surface of the cap body 310 by causing an engaging recessed portion 331 formed in the pressing plate 330 to engage with an engaging claw 311 protruding from the cap body 310

FIGS. 55 to 60 show a specific example of the assembling tool shown in FIGS. 8 to 13.

Figure 55:
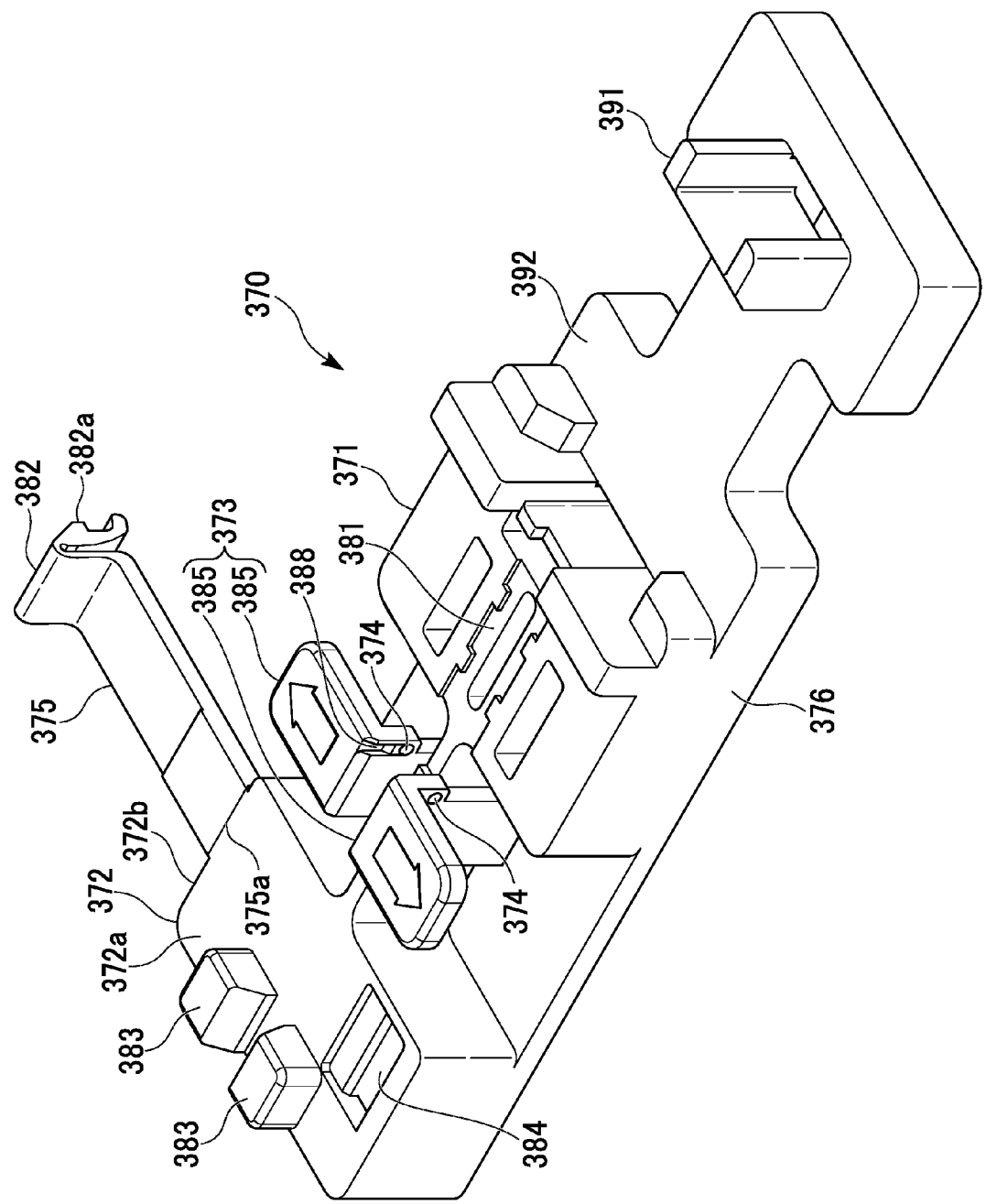
FIG. 55 is a perspective view illustrating an example of an assembling tool.
Figure 56:
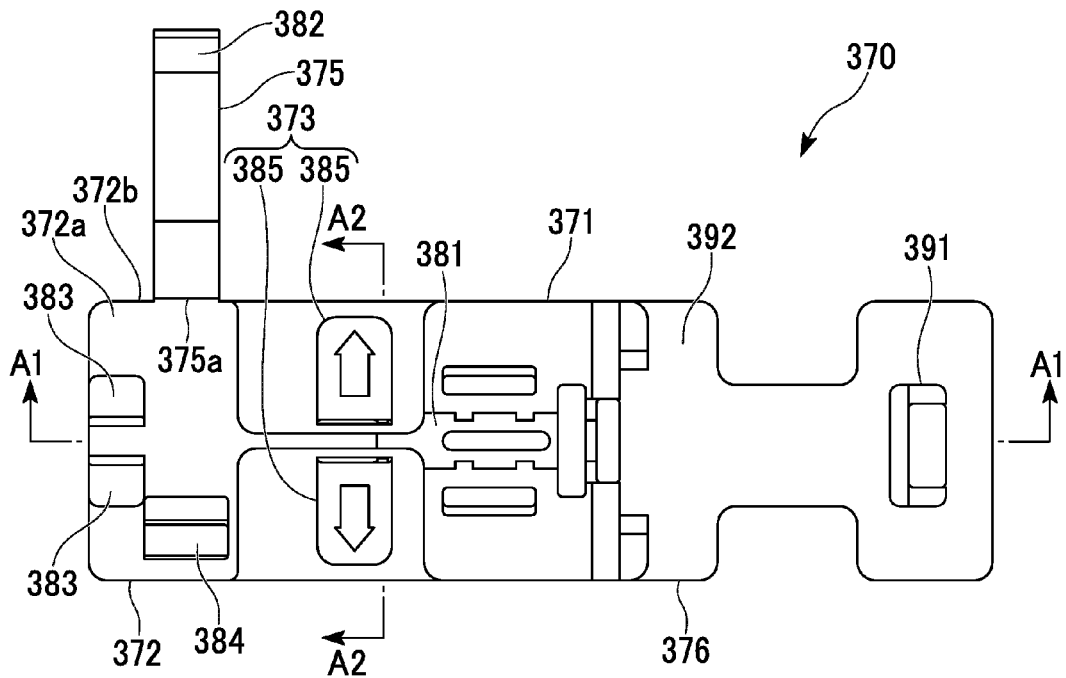
FIG. 56 is a plan view of the assembling tool shown in FIG. 55.
Figure 57:
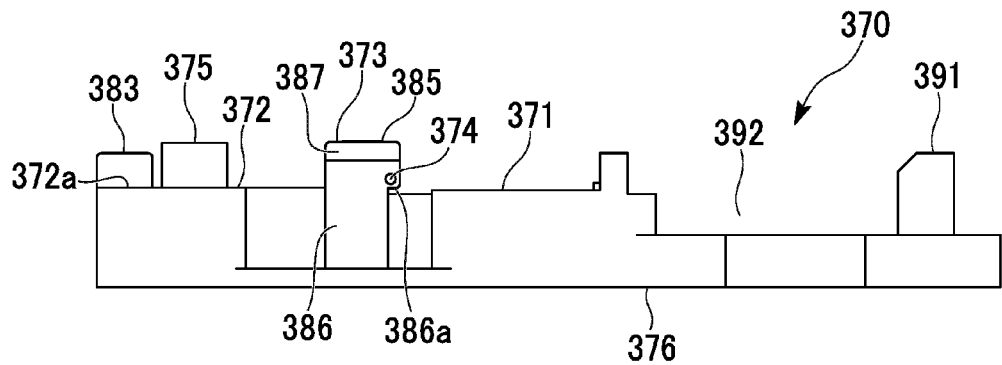
FIG. 57 is a side view of the assembling tool shown in FIG. 55.
Figure 58:
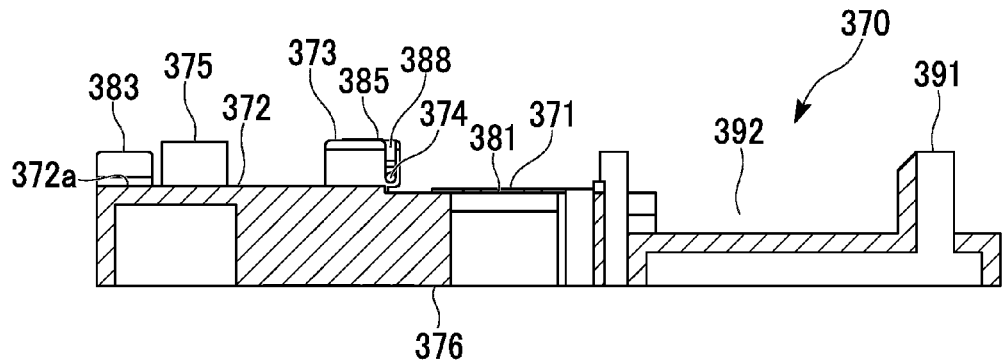
FIG. 58 is a longitudinal sectional view of the assembling tool shown in FIG. 55.
Figure 59:
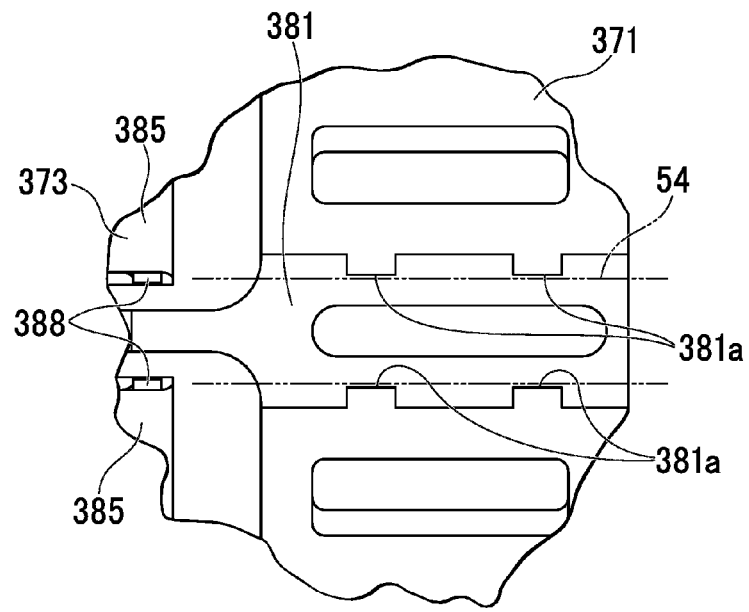
FIG. 59 is a partially-enlarged plan view of the assembling tool shown in FIG. 55.
Figure 60:
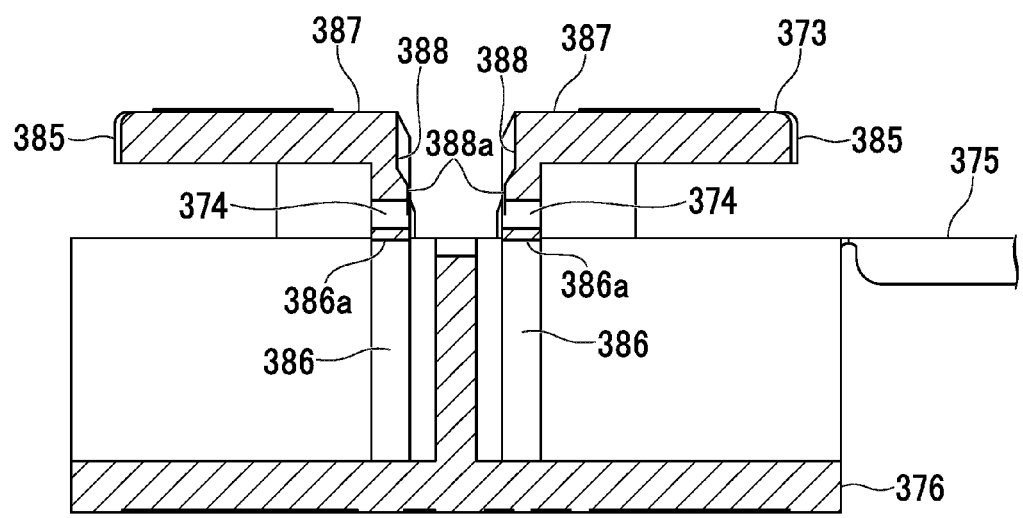
FIG. 60 is a cross-sectional view of the assembling tool shown in FIG. 55.

FIG. 55 is a perspective view of the assembling tool 370. FIG. 56 is a plan view of the assembling tool 370. FIG. 57 is a side view of the assembling tool 370. FIG. 58 is a longitudinal sectional view of the assembling tool 370 and is a sectional view taken along line A1-A1 of FIG. 56. FIG. 59 is a partially-enlarged plan view of the assembling tool 370. FIG. 60 is a cross-sectional view of the assembling tool 370 and is a sectional view taken along line A2-A2 of FIG. 56.

The assembling tool 370 is used to assemble the splice reinforcing portion 50 and includes a base 376, a reinforcing member holding portion 371 holding the second reinforcing member 54 at a predetermined position, a core holding portion 372 holding a part of the optical fiber core 47 of the external optical fiber 45, a bearing supporting portion 373 having a bearing portion 374 rotatably holding the shaft portion 60 of the first reinforcing member 51, and a pressing cover 375 pressing the part of the optical fiber core 47 of the external optical fiber 45 on the core holding portion 372.

Hereinafter, the right side in FIG. 56 may be referred to as a front side and the opposite side (the left side in FIG. 56) thereof may be referred to as a rear side. The left-right direction in FIG. 56 may be referred to as a front-rear direction. In the example shown in the drawings, the bare optical fibers 43 and 46 and the external optical fiber 45 are arranged in the front-rear direction (see FIG. 62 and the like).

As shown in FIGS. 55, 56, and 59, the reinforcing member holding portion 371 protrudes upward from the top surface of the base 376 and a holding recessed portion 381 holding the second reinforcing member 54 is formed on the top surface thereof. The holding recessed portion 381 is formed to extend along the front-rear direction (the left-right direction in FIG. 56) and can position the second reinforcing member 54 with a posture parallel to the front-rear direction.

As shown in FIG. 59, in this embodiment, a positioning protuberance portion 381*a* protrudes inward from both edges of the holding recessed portion 381 and the second reinforcing member 54 can be fitted between the positioning protuberance portions 381*a* and 381*a* at both edges.

Figure 62:
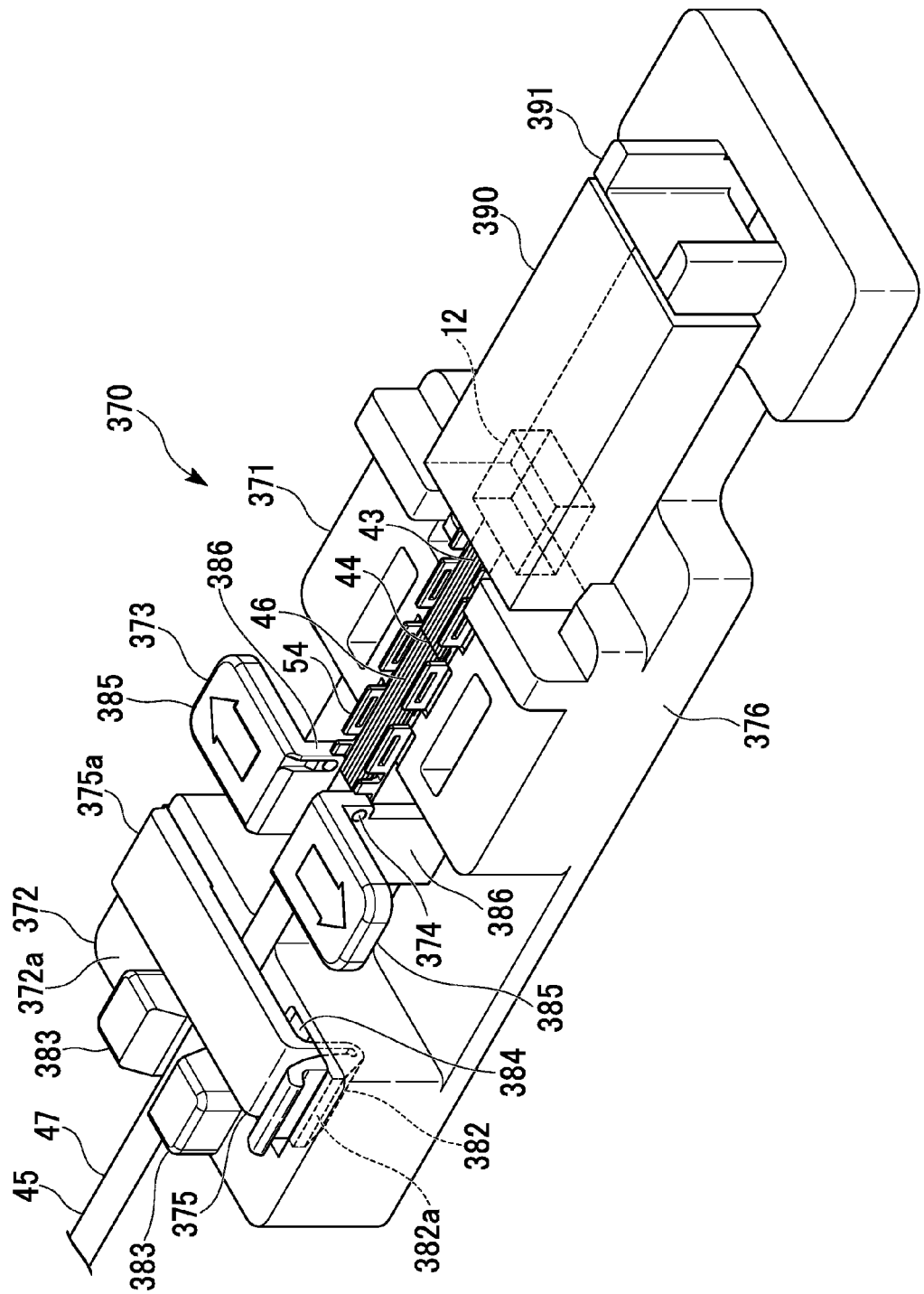
FIG. 62 is a diagram illustrating the flow subsequent to FIG. 61.

As shown in FIGS. 55 and 56, the core holding portion 372 protrudes upward from the top surface of the base 376 and the optical fiber core 47 of the external optical fiber 45 can be placed on a flat top surface 372*a* thereof (see FIG. 62 and the like). A pair of regulating recessed portions 383 regulating the movement in the width direction of the external optical fiber 45 is formed on the top surface 372*a*. By interposing the external optical fiber 45 between the regulating protuberance portions 383, it is possible to determine the position in the width direction of the external optical fiber 45.

An insertion recessed portion 384 into which a latch portion 382 of the pressing cover 375 is inserted is formed on the top surface 372*a* of the core holding portion 372.

As shown in FIGS. 55, 56, and 60, the bearing supporting portion 373 includes a pair of support members 385 and 385 disposed to oppose each other. As shown in FIG. 60, the support member 385 is formed in an L shape having a side plate portion 386 formed upright on the top surface of the base 376 and a top plate portion 387 extending outward (in the direction in which both move separately from each other) from the upper edge of the side plate portion 386.

The side plate portion 386 has a plate shape parallel to the front-rear direction and extends upward (the direction perpendicular to the base 376) from the top surface of the base 376. The side plate portions 386 and 386 forming a pair are formed to oppose each other. The side plate portions 386 and 386 are preferably elastically bending-deformable so that the bearing portions 374 and 374 are able to come close to each other and to move separately from each other.

By setting the distance between the side plate portions 386 and 386 to be substantially equal to or slightly larger than the width of the optical fiber core 47, it is possible to position the optical fiber core 47 in the width direction.

Figure 65:
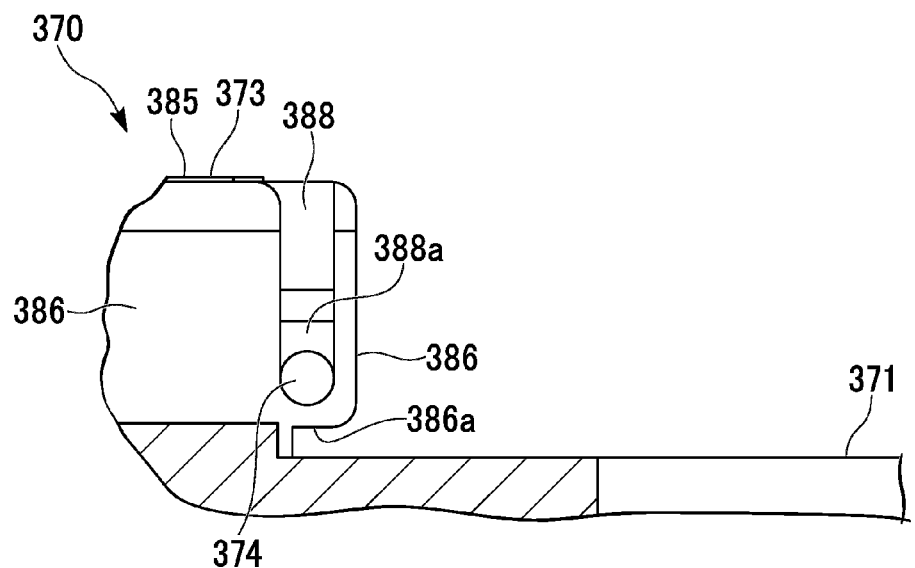
FIG. 65 is a diagram illustrating the flow of the method of assembling a splice reinforcing portion using the assembling tool shown in FIG. 55.

As shown in FIGS. 57 and 65, the lower part of the front edge of the side plate portion 386 is cut out and thus a stepped portion 386*a* is formed at a position slightly higher than the bottom portion of the holding recessed portion 381 in the front edge of the side plate portion 386.

As shown in FIGS. 55, 58, 60, and 65, the bearing portion 374 is a hole portion having a substantially circular section formed through at a position close to the front edge of the side plate portion 386. The bearing portion 374 has an inner diameter substantially equal to or slightly larger than the outer diameter of the shaft portion 60 and can rotatably support the inserted shaft portion 60. The bearing portions 374 and 374 are formed at the opposed positions of the pair of side plate portions 386 and 386.

An approach groove 388 is formed in the vertical direction in the inner surface of the side plate portion 386. The approach groove 388 is a groove formed to guide the shaft portion 60 of the first reinforcing member 51 to the bearing portion 374, has a width through which the shaft portion 60 can pass, and extends from the upper edge of the side plate portion 386 to the bearing portion 374.

As shown in FIGS. 60 and 65, a protuberance portion 388a is formed on the bottom portion of the approach groove 388. Since the protuberance portion 388a has such a height to make the upward movement of the shaft portion 60 fitted to the bearing portion 374 difficult, the shaft portion 60 fitted to the bearing portion 374 is not easily detached from the bearing portion 374.

As shown in FIGS. 55 and 56, the pressing cover 375 has a long plate shape and a base end portion 375a thereof is hinged to one outer edge 372b of the core holding portion 372. By employing the hinge coupling, the pressing cover 375 can be formed in a body with the core holding portion 372, which is advantageous in manufacturing cost.

As shown in FIG. 62, the pressing cover 375 rotates about the base end portion 375a and overlaps with the top surface 372a of the core holding portion 372, whereby the optical fiber core 47 can be pinched between the top surface 372a and the pressing cover.

By inserting the latch portion 382 into the insertion recessed portion 384 in a state where the pressing cover 375 overlaps with the top surface 372a of the core holding portion 372 and locking the locking protuberance portion 382a to a locking recessed portion (not shown) in the insertion recessed portion 384, it is possible to maintain the state where the optical fiber core 47 is pinched between the pressing cover 375 and the top surface.

By elastically bending the latch portion 382 by external work, it is possible to select the locked state and the unlocked state of the locking protuberance portion 382a to and from the locking recessed portion (not shown).

As shown in FIGS. 55 and 56, a positioning protrusion 391 positioning a holding jig 390 holding the ferrule 12 is formed on the front side of the reinforcing member holding portion 371. The positioning protrusion 391 can regulate the forward movement of the holding jig 390 received in the reception space 392 between the reinforcing member holding portion 371 and the positioning protrusion.

Figure 69:
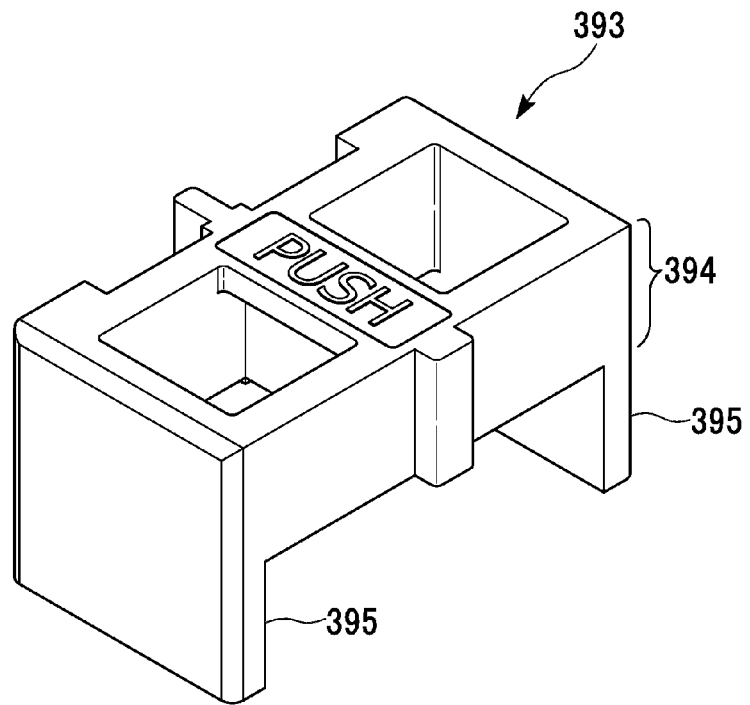
FIG. 69 is a perspective view illustrating a pressing jig pressing the first reinforcing member toward the second reinforcing member on the assembling tool shown in FIG. 55.
Figure 70:
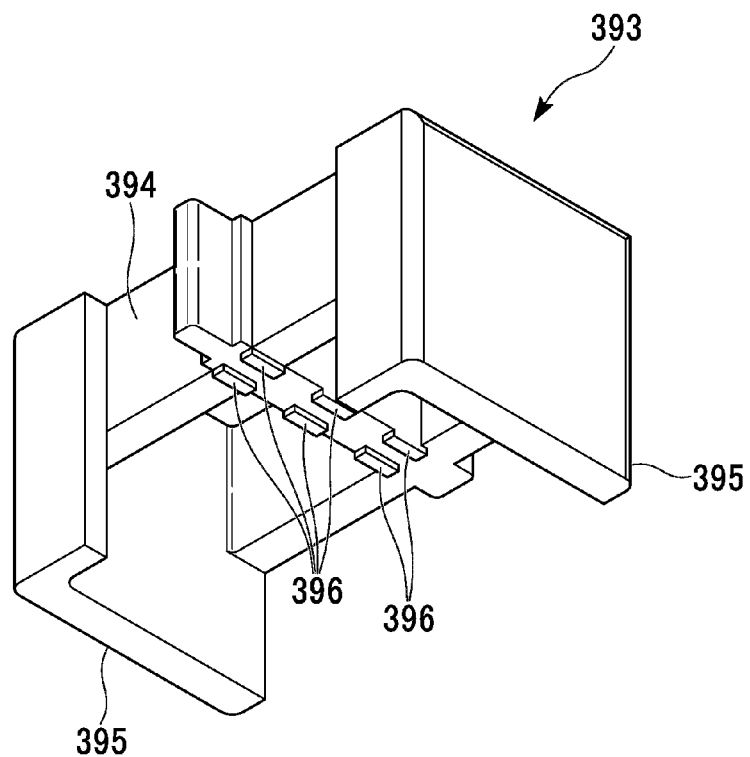
FIG. 70 is a perspective view illustrating the pressing jig shown in FIG. 69 as viewed from another direction.

FIGS. 69 and 70 show a pressing jig 393 pressing the first reinforcing member 51 to the second reinforcing member 54 on the assembling tool 370. FIG. 69 is a perspective view of the pressing jig 393 as viewed from a side of the top surface and FIG. 70 is a perspective view of the pressing jig 393 as viewed from a side of the bottom surface.

The pressing jig 393 includes a base portion 394 and leg portions 395 and 395 vertically extending downward from both edges of the base portion 394, and a plurality of pressing protuberance portions 396 pressing the first reinforcing member 51 are formed on the bottom surface of the base portion 394. In the example shown in the drawings, the pressing protuberance portions 396 are arranged in two lines along both edges of the first reinforcing member 51 and can press the vicinity of the lateral edges of the first reinforcing member 51 at a plurality of points in the length direction of the first reinforcing member 51.

An example of a method of assembling the splice reinforcing portion 50 using the assembling tool 370 will be described below.

Figure 61:
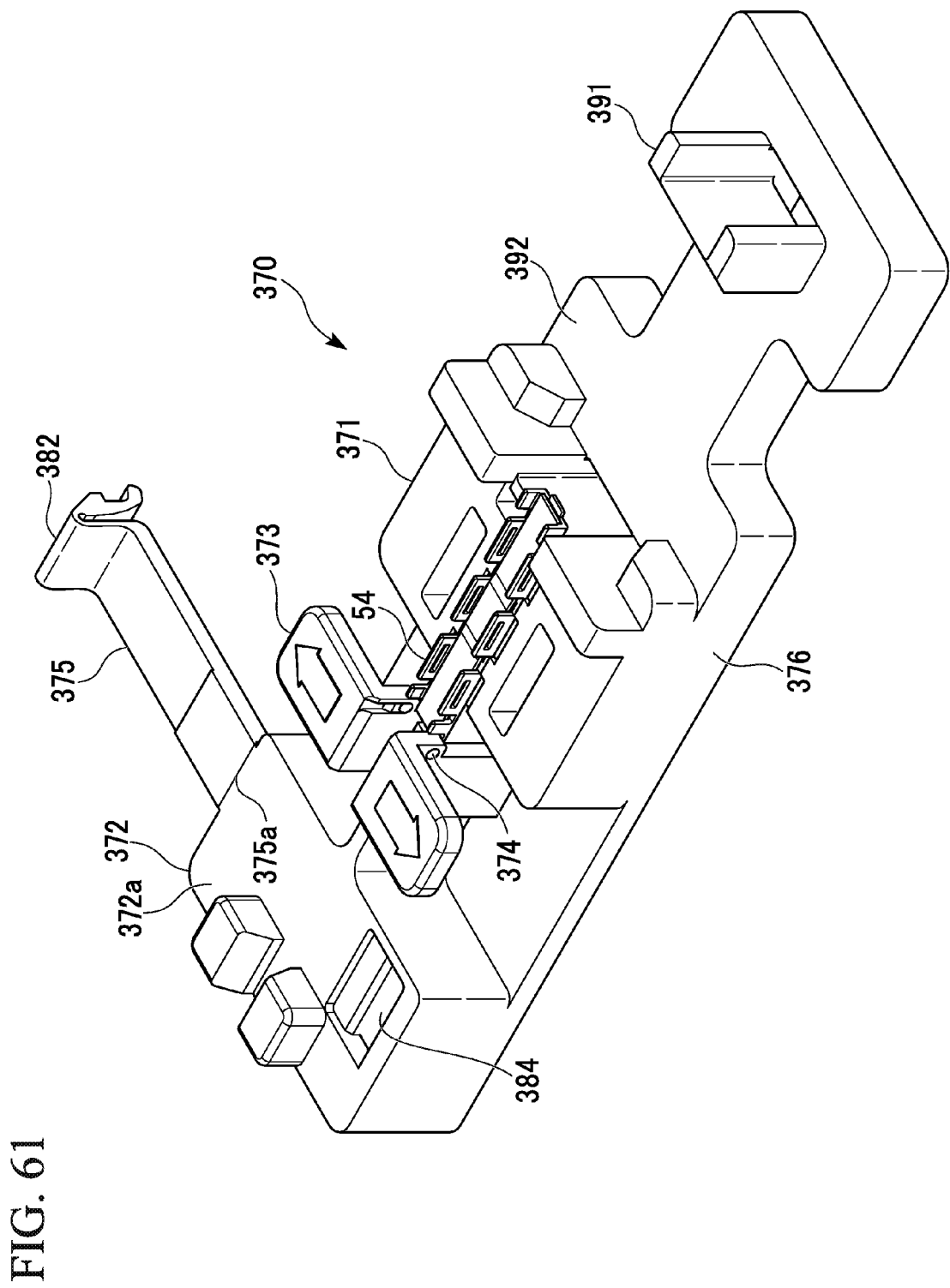
FIG. 61 is a diagram illustrating the flow of a method of assembling a splice reinforcing portion using the assembling tool shown in FIG. 55.
Figure 66:
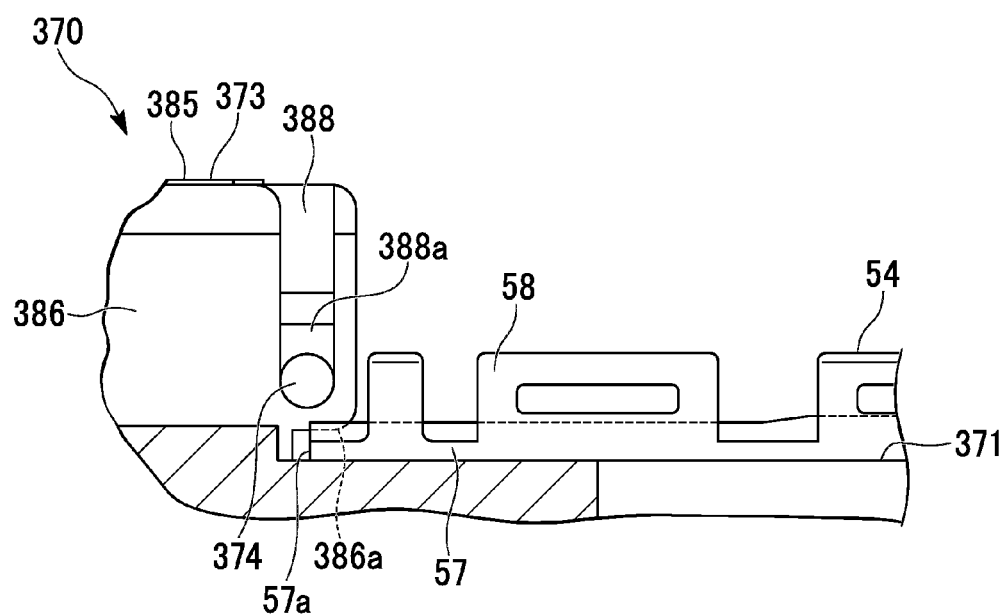
FIG. 66 is a diagram illustrating the flow subsequent to FIG. 65.

As shown in FIGS. 61 and 66, the second reinforcing member 54 with a posture arranged along the front-rear direction is held in the holding recessed portion 381 of the reinforcing member holding portion 371.

As shown in FIG. 59, the shift in the width direction of the second reinforcing member 54 is prevented by the positioning protuberance portion 381a.

As shown in FIG. 66, since the upward movement of the bottom wall portion 57 can be suppressed by locating the front end portion 57a of the bottom wall portion 57 of the second reinforcing member 54 below the stepped portions 386a of the side plate portions 386, the positioning in the vertical direction is possible. By bringing the front end portion of the bottom wall portion 57 or the front end portions of the side wall portions 58 into contact with the side plate portion 386, it is also possible to regulate the positional shift in the front-rear direction.

As shown in FIG. 62, a unit (see FIG. 8) in which the other end portion 43 of the inserted optical fiber 40 protruding from the ferrule 12 is fusion-spliced to the front end portion 46 of the external optical fiber 45 is placed on the assembling tool 370. In the example shown in the drawing, the ferrule 12 is received and held in the holding jig 390.

The fusion-spliced portion 44 of the bare optical fibers 43 and 46 is placed on the second reinforcing member 54.

When the holding jig 390 is disposed in the reception space 392 between the reinforcing member holding portion 371 and the positioning protrusion 391, the movement in the front-rear direction of the holding jig 390 is regulated and thus the positions in the front-rear direction of the bare optical fibers 43 and 46 on the second reinforcing member 54 is determined.

The position in the width direction of the optical fiber core 47 of the external optical fiber 45 is determined by placing the optical fiber core on the top surface 372a of the core holding portion 372 and disposing the optical fiber core between a pair of regulating protuberance portions 383 and 383. The movement in the width direction of the optical fiber core 47 is also regulated by the side plate portions 386 and 386.

By rotationally moving the pressing cover 375 and interposing the optical fiber core 47 between the pressing cover 375 and the core holding portion 372, the positional shift of the optical fiber core 47 can be prevented. By inserting the latch portion 382 into the insertion recessed portion 384 and locking the locking protuberance portion 382a to the locking recessed portion (not shown) in the insertion recessed portion 384, the state where the pressing cover 375 pinches the optical fiber core 47 is maintained.

By positioning the optical fiber core 47 by the use of the pressing cover 375, it is possible to accurately position the optical fiber core 47 and to arrange the optical fiber core 47 in a straight line shape. Accordingly, it is possible to prevent the position shaking of the bare optical fibers 43 and 46 in the splice reinforcing portion 50 due to the bending of the optical fiber core 47 or the like.

Figure 63:
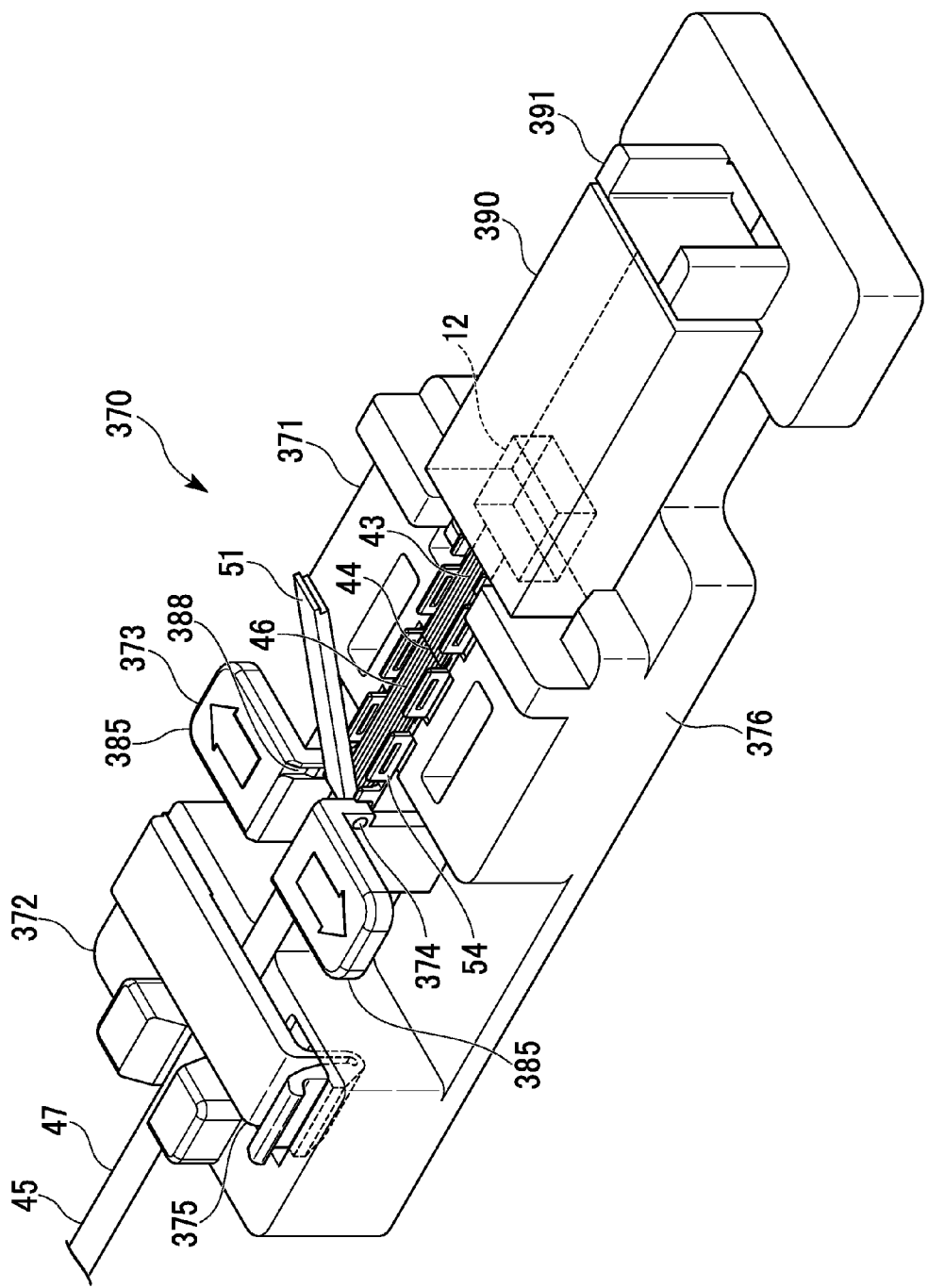
FIG. 63 is a diagram illustrating the flow subsequent to FIG. 62.
Figure 67:
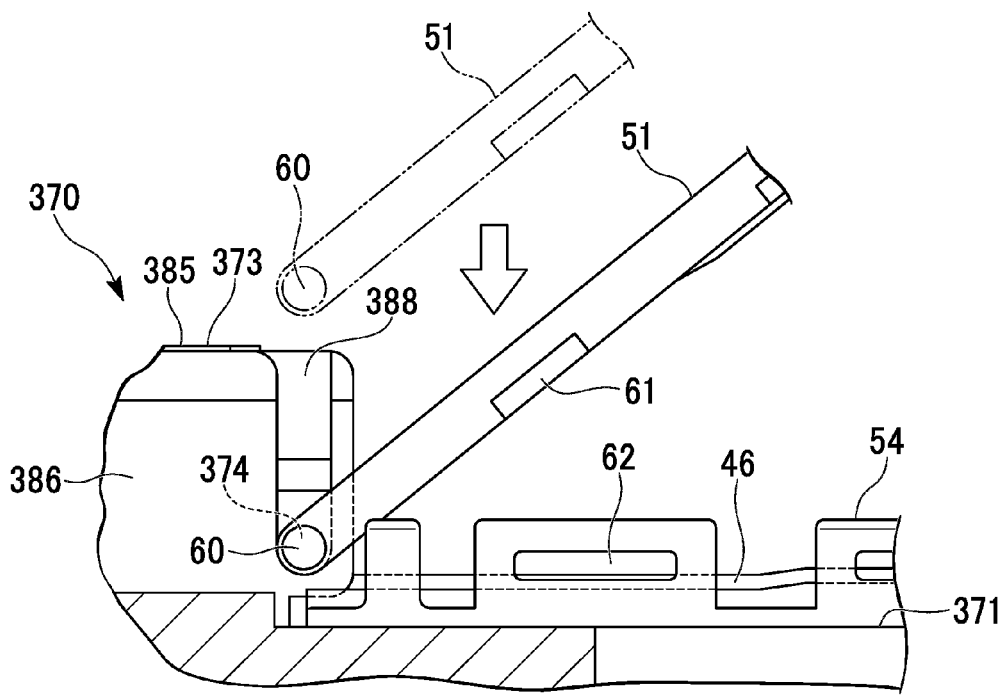
FIG. 67 is a diagram illustrating the flow subsequent to FIG. 66.

As shown in FIGS. 63 and 67, the shaft portion 60 of the first reinforcing member 51 is caused to approach the approach groove 388 of the side plate portion 386 and is fitted to the bearing portion 374. The shaft portions 60 and 60 protruding to one side and the other side of the first reinforcing member 51 are inserted into the bearing portions 374 and 374 of the side plate portions 386 and 386, respectively, and are rotatably supported by the bearing portions 374 and 374.

Figure 64:
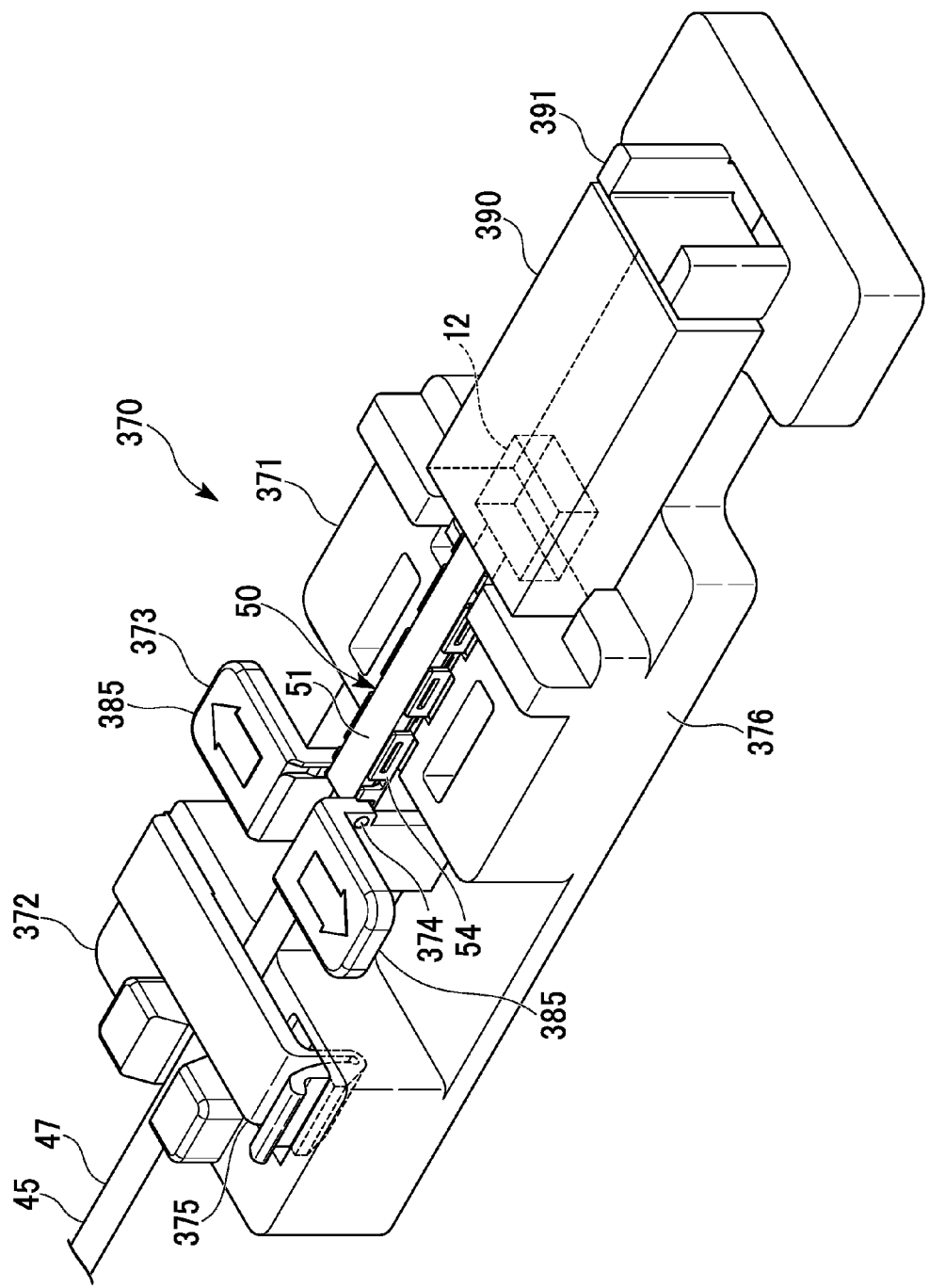
FIG. 64 is a diagram illustrating the flow subsequent to FIG. 63.
Figure 68:
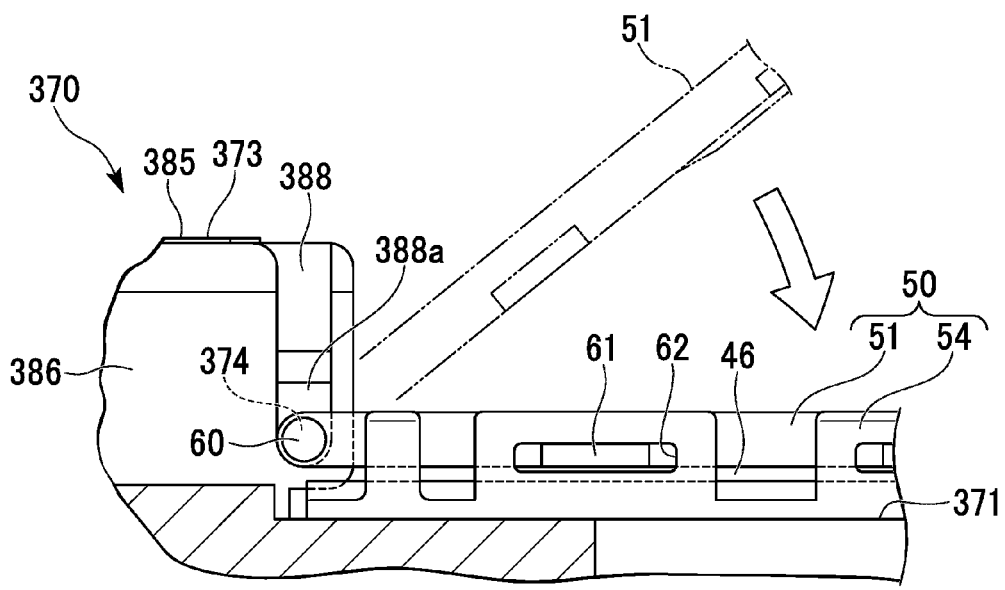
FIG. 68 is a diagram illustrating the flow subsequent to FIG. 67.

As shown in FIGS. 64 and 68, by rotationally moving the first reinforcing member 51 about the shaft portion 60 fitted to the bearing portion 374, the fusion-spliced portion 44 and the bare optical fibers 43 and 46 are pinched between a pair of reinforcing members 51 and 54. As shown in FIG. 68, when pinching the fusion-spliced portion 44 between a pair of reinforcing members 51 and 54, the engaging protuberance portions 61 are made to engage with the engaging recessed portions 62. Accordingly, it is possible to assemble the splice reinforcing portion 50 to the rear side of the ferrule 12.

Figure 71:
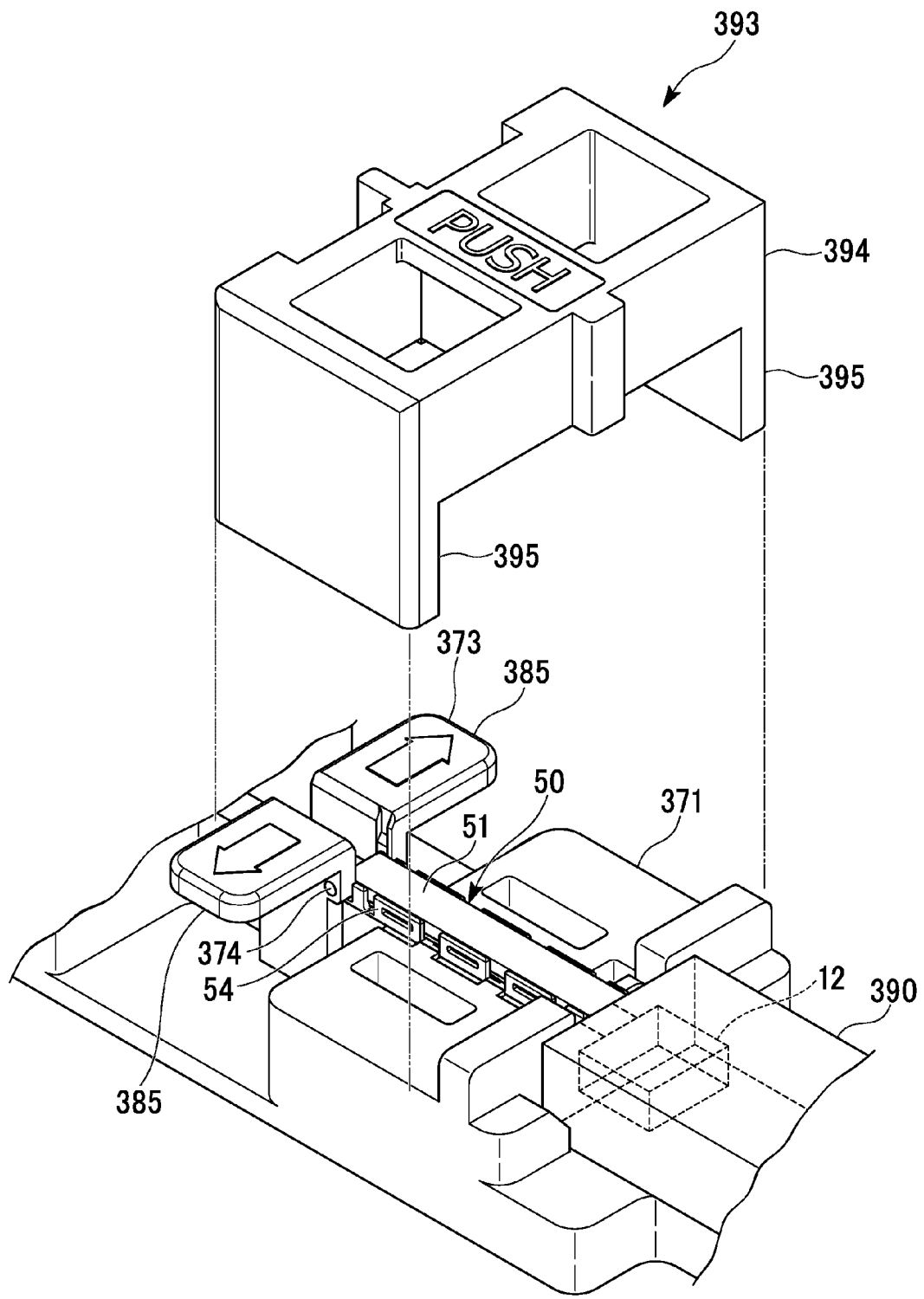
FIG. 71 is a diagram illustrating a usage of the pressing jig shown in FIG. 69.

As shown in FIG. 71, when the first reinforcing member 51 is pressed to pinch the fusion-spliced portion 44 and the bare optical fibers 43 and 46 between the reinforcing members 51 and 54, the pressing jig 393 may be placed on the first reinforcing member 51 and the first reinforcing member 51 may be pressed down through the use of the pressing protuberance portions 396 (see FIG. 70).

Accordingly, it is possible to press the vicinity of both lateral edges of the first reinforcing member 51 at a plurality of points along the length direction of the first reinforcing member 51 and to satisfactorily cause all the engaging protuberance portions 61 to engage with the engaging recessed portions 62.

Since all the engaging protuberance portions 61 can be caused to engage with the engaging recessed portions 62 substantially at the same time by the use of the pressing jig 393, a large sound is generated at the time of causing the engaging protuberance portions 61 to engage with the engaging recessed portions 62, whereby the completion of the assembling of the splice reinforcing portion 50 can be easily recognized by an operator, thereby improving the workability.

The unit in which the splice reinforcing portion 50 is assembled to the rear side of the ferrule 12 is detached from the assembling tool 370.

When the upward movement of the shaft portion 60 is regulated by the protuberance portions 388a, it is possible to easily detach the shaft portion 60 from the bearing portions 374 by deforming the side plate portions 386 in the direction in which both move separately from each other.

According to the assembling tool 370, it is possible to accurately position the first reinforcing member 51 with respect to the second reinforcing member 54 and to easily assemble the splice reinforcing portion 50.

According to the invention, it is possible to treat the assembling tool 370 and the optical fiber connector as an optical fiber connector assembling set. The optical fiber connector assembling set may include a constituent (for example, a pressing jig 393) other than the assembling tool 370 and the optical fiber connector 10.

What is claimed is:

1. An optical fiber connector comprising:
   a ferrule;
   an inserted optical fiber of which one end portion is fixed to the ferrule and of which the other end portion protrudes from the ferrule;
   an external optical fiber of which a front end portion is fusion-spliced to the other end portion of the inserted optical fiber;
   one or more reinforcing members configured to reinforce the fusion-spliced portion of the other end portion of the inserted optical fiber and the front end portion of the external optical fiber; and
   a ferrule boot which covers the surrounding of the other end portion of the inserted optical fiber, the ferrule boot being attached to the ferrule, wherein
   the one or more reinforcing members further secure the ferrule boot to the ferrule, and
   the ferrule comprises a lens located on an extension line of the inserted optical fiber.

2. The optical fiber connector according to claim 1, wherein
   the ferrule includes an optical fiber stop plane, the optical fiber stop plane is located between one end portion of the inserted optical fiber and the lens and on a focal point defined by the lens.

3. The optical fiber connector according to claim 1 further comprising an adhesion layer applied on the inner surface of the reinforcing members, the adhesion layer covers an area where the inserted optical fiber and the external optical fiber come in contact with each other, and adheres to the outer surfaces of the other end portion of the inserted optical fiber and the front end portion of the external optical fiber.

4. The optical fiber connector according to claim 3, wherein the adhesion layer comprises rubber or an elastomer.

5. The optical fiber connector according to claim 3, wherein the one or more reinforcing members comprise a pair of reinforcing members having protuberance portions and recessed portions engaging with each other, and
   wherein the adhesion layer maintains the engaging of the protuberance portions and the recessed portions with each other.

6. A method of assembling an optical fiber connector, comprising the steps of:
   fusion-splicing an other end portion of an inserted optical fiber to a front end portion of an external optical fiber, one end portion of the inserted optical fiber being fixed to a ferrule and the other end portion being protruded from the ferrule, said one end portion including a lens;
   applying one or more reinforcing members to secure the fusion-spliced portion of the other end portion of the inserted optical fiber and the front end portion of the external optical fiber to the ferrule; and
   applying a ferrule boot to cover the surrounding of the other end portion of the inserted optical fiber, the ferrule boot being attached to the ferrule,
   wherein the ferrule boot is secured to the ferrule by the one or more reinforcing members.

7. The method of assembling an optical fiber connector according to claim 6 further comprising applying an adhesion layer on the inner surface of the reinforcing members, the adhesion layer covers an area where the inserted optical fiber and the external optical fiber come in contact with each other, and adheres to the outer surfaces of the other end portion of the inserted optical fiber and the front end portion of the external optical fiber.

8. The method of assembling an optical fiber connector according to claim 7, wherein the adhesion layer comprises rubber or an elastomer.

9. The method of assembling an optical fiber connector according to claim 7, wherein the one or more reinforcing members comprise a pair of reinforcing members having protuberance portions and recessed portions engaging with each other, and
   wherein the adhesion layer maintains the engaging of the protuberance portions and the recessed portions with each other.

10. The method of assembling an optical fiber connector according to claim 6, wherein the one or more reinforcing members comprise a first reinforcing member having a shaft portion and a second reinforcing member,
    wherein the securing of the fusion-spliced portion between the first and second reinforcing members being performed using an assembling tool comprising a reinforcing member holding portion and a bearing portion, the method comprising:

holding the second reinforcing member on the reinforcing member holding portion at a predetermined position, placing the fusion-spliced portion on the second reinforcing member, holding the shaft portion of the first reinforcing member on the bearing portion, and rotating the first reinforcing member toward the second reinforcing member about the shaft portion in the bearing portion until the fusion-spliced portion is pinched between the first reinforcing member and the second reinforcing member.

11. The method of assembling an optical fiber connector according to claim 10 further comprising:

arranging the first reinforcing member having the shaft portion at an end in the length direction of the inserted optical fiber and the external optical fiber;

arranging the second reinforcing member opposed to the first reinforcing member as a pair of reinforcing members; and applying an adhesion layer on the inner surface of the pair of reinforcing members, covering an area where the inserted optical fiber and the external optical fiber come in contact with each other, and adhering to the outer surfaces of the other end portion of the inserted optical fiber and the front end portion of the external optical fiber.

12. The method of assembling an optical fiber connector according to claim 11 further comprising:

interposing the fusion-spliced portion between the pair of reinforcing members to cause the adhesion layer to adhere to the outer circumferential surface of the inserted and external optical fibers in the fusion-spliced portion.

13. An optical fiber connector assembling tool, comprising:

a bearing supporting portion which comprises a reinforcing member holding portion being formed to hold a second reinforcing member at a predetermined position, and a bearing portion being formed to rotatably hold a shaft portion of a first reinforcing member, wherein the bearing portion enables the first reinforcing member to rotationally move toward the second reinforcing member held by the reinforcing member holding portion until the first reinforcing member pinch the fusion-spliced portion, wherein the shaft portion of the first reinforcing member being positioned at an end opposite to a ferrule, the ferrule includes a lens, and the second reinforcing member being opposed to the first reinforcing member, wherein the ferrule being part of an optical fiber connector having an inserted optical fiber of which one end portion is fixed to the ferrule and an other end portion protrudes from the ferrule, and having an external optical fiber of which a front end portion is fusion-spliced to the other end portion of the inserted optical fiber, wherein the first and second reinforcing members pinch and reinforce the fusion-spliced portion of the other end portion of the inserted optical fiber and the front end portion of the external optical fiber.

14. The optical fiber connector assembling tool according to claim 13, further comprising:

a core holding portion that holds the external optical fiber; and a pressing cover that presses the external optical fiber on the core holding portion.

15. The optical fiber connector assembling tool according to claim 13, wherein the shaft portion protrudes to one side and the other side of the first reinforcing member, wherein the bearing supporting portion includes a pair of support members opposed to each other, and wherein the bearing portion is formed in each of the pair of support members and supports the shaft portion protruding on one side and the other side of the first reinforcing member.

16. An optical fiber connector assembling set comprising the optical fiber connector assembling tool and an optical fiber connector according to claim 13.

17. A method of assembling an optical fiber connector using the optical fiber connector assembling tool according to claim 13, comprising: before pinching the fusion-spliced portion between the first and second reinforcing members, holding the second reinforcing member on the reinforcing member holding portion, placing the fusion-spliced portion on the second reinforcing member, holding the shaft portion of the first reinforcing member on the bearing portion, and rotating the first reinforcing member toward the second reinforcing member about the shaft portion in the bearing portion until the fusion-spliced portion is pinched between the first reinforcing member and the second reinforcing member.

* * * * *